(12) United States Patent
Palumbo

(10) Patent No.: US 11,214,394 B2
(45) Date of Patent: Jan. 4, 2022

(54) APPARATUS AND PROCESS FOR PACKAGING A PRODUCT

(71) Applicant: Cryovac, Inc., Duncan, SC (US)

(72) Inventor: Riccardo Palumbo, Arona (IT)

(73) Assignee: Cryovac, LLC, Charlotte, NC (US)

(*) Notice: Subject to any disclaimer, the term of this patent is extended or adjusted under 35 U.S.C. 154(b) by 1091 days.

(21) Appl. No.: 14/783,816

(22) PCT Filed: Apr. 8, 2014

(86) PCT No.: PCT/EP2014/057034
§ 371 (c)(1),
(2) Date: Oct. 9, 2015

(87) PCT Pub. No.: WO2014/166940
PCT Pub. Date: Oct. 16, 2014

(65) Prior Publication Data
US 2016/0068288 A1   Mar. 10, 2016

(30) Foreign Application Priority Data

Apr. 9, 2013 (EP) .................................... 13162952

(51) Int. Cl.
*B65B 7/16* (2006.01)
*B65B 7/28* (2006.01)
(Continued)

(52) U.S. Cl.
CPC ............ *B65B 31/028* (2013.01); *B29C 65/18* (2013.01); *B29C 65/222* (2013.01);
(Continued)

(58) Field of Classification Search
CPC ..... B65B 7/164; B65B 7/2878; B65B 31/025; B65B 31/028; B65B 61/06; B65B 41/12;
(Continued)

(56) References Cited

U.S. PATENT DOCUMENTS 2,025,812 A * 12/1935 Enock ....................... B67B 3/04
53/296
4,030,388 A *  6/1977 Ramsey ................... B26D 1/45
83/214
(Continued)

FOREIGN PATENT DOCUMENTS

EP           0469296 A1 *  2/1992   ......... B29C 65/3656

*Primary Examiner* — Thanh K Truong
*Assistant Examiner* — Patrick B Fry
(74) *Attorney, Agent, or Firm* — Jon M. Isaacson

(57) ABSTRACT

A process for packaging a product (P) arranged in a support (4) comprising unrolling a film (10a), transversely cutting the unrolled portion of film (10a) and preparing cut film sheets (18), moving the cut film sheets (18) to a packaging assembly (8) defining at its inside a packaging chamber (24), progressively moving a number of supports (4) inside the packaging chamber (24) of a packaging assembly (8), keeping the packaging chamber (24) open for a time sufficient for a number of supports (4) and for a corresponding number of film sheets (18) to properly position inside said packaging chamber (24), hermetically closing the packaging chamber (24) with the film sheets held above the respective support (4) and at a distance sufficient to allow gas circulation inside the support (4), optionally causing one or both of: a gas withdrawal from the hermetically closed packaging chamber (24) and gas injection of a gas mixture of controlled composition, heat sealing the film sheet (18) to said support (4), wherein the cutting of the film (10a) into film sheets (18) takes place outside the packaging chamber (24) at a station remote from the location where the film sheets are coupled to the supports. An apparatus (1) for performing the above process is also disclosed.

28 Claims, 21 Drawing Sheets

(51) Int. Cl.
| | |
|---|---|
| *B65B 11/52* | (2006.01) |
| *B65B 31/02* | (2006.01) |
| *B65B 41/12* | (2006.01) |
| *B29C 65/18* | (2006.01) |
| *B29C 65/22* | (2006.01) |
| *B29C 65/30* | (2006.01) |
| *B29C 65/32* | (2006.01) |
| *B29C 65/78* | (2006.01) |
| *B29C 65/00* | (2006.01) |
| *B65B 51/02* | (2006.01) |
| *B65B 51/22* | (2006.01) |
| *B29C 65/08* | (2006.01) |
| *B29C 65/72* | (2006.01) |

(52) U.S. Cl.
CPC ............ *B29C 65/225* (2013.01); *B29C 65/30* (2013.01); *B29C 65/7841* (2013.01); *B29C 65/7847* (2013.01); *B29C 65/7891* (2013.01); *B29C 66/0014* (2013.01); *B29C 66/112* (2013.01); *B29C 66/131* (2013.01); *B29C 66/24244* (2013.01); *B29C 66/53461* (2013.01); *B29C 66/73711* (2013.01); *B29C 66/73713* (2013.01); *B29C 66/83221* (2013.01); *B29C 66/849* (2013.01); *B29C 66/8432* (2013.01); *B29C 66/919* (2013.01); *B29C 66/91421* (2013.01); *B29C 66/91445* (2013.01); *B29C 66/91655* (2013.01); *B65B 7/164* (2013.01); *B65B 11/52* (2013.01); *B65B 41/12* (2013.01); *B65B 51/02* (2013.01); *B65B 51/22* (2013.01); *B29C 65/08* (2013.01); *B29C 65/32* (2013.01); *B29C 65/72* (2013.01); *B29C 65/7897* (2013.01); *B29C 66/00145* (2013.01); *B29C 66/24221* (2013.01); *B29C 66/24245* (2013.01); *B29C 66/71* (2013.01); *B29C 66/72328* (2013.01); *B29C 66/72341* (2013.01); *B29C 66/73715* (2013.01); *B29C 66/8242* (2013.01); *B65B 7/2878* (2013.01)

(58) Field of Classification Search
CPC .. B67B 3/04; B26D 1/045; B65H 5/08; B65H 5/10; B65H 5/222; B65H 35/006; B65H 35/06
USPC ......... 53/290, 296, 298, 389.3, 297; 83/112, 83/152, 153, 159, 160, 732
See application file for complete search history.

(56) References Cited

U.S. PATENT DOCUMENTS

| | | | | |
|---|---|---|---|---|
| 4,065,909 | A * | 1/1978 | Mueller | B65B 7/168 53/420 |
| 4,077,184 | A * | 3/1978 | Kremer, Jr. | B65B 11/52 53/427 |
| 4,461,197 | A * | 7/1984 | Seaman | B65B 15/00 83/112 |
| 4,807,423 | A * | 2/1989 | Schnippering | B65B 41/12 53/296 |
| 4,909,022 | A * | 3/1990 | Kubis | B29C 65/18 53/510 |
| 4,982,555 | A * | 1/1991 | Ingemann | B65B 7/2878 53/405 |
| 5,109,653 | A * | 5/1992 | Kubis | B29C 65/3656 156/380.2 |
| 5,454,214 | A * | 10/1995 | Lancaster | B65B 11/52 53/509 |
| 5,943,844 | A * | 8/1999 | Wilhelm | B65D 77/20 426/396 |
| 6,662,531 | B1 * | 12/2003 | Schwab | B29C 51/02 53/282 |
| 6,684,604 | B2 * | 2/2004 | Luc | B65B 7/01 53/244 |
| 6,990,723 | B1 * | 1/2006 | Hoogland | B29C 45/14008 264/153 |
| 7,409,812 | B2 * | 8/2008 | Gilmore | B25J 15/0052 53/258 |
| 7,900,423 | B2 * | 3/2011 | von Seggern | B65D 81/2076 426/106 |
| 8,146,643 | B2 * | 4/2012 | Kasahara | B65H 35/0033 156/299 |
| 9,469,042 | B2 * | 10/2016 | Gotz | B26D 1/045 |
| 2005/0160888 | A1 * | 7/2005 | Hoogland | B26D 7/1863 83/13 |
| 2006/0045721 | A1 * | 3/2006 | de Koning | B65G 47/91 414/751.1 |
| 2012/0031798 | A1 * | 2/2012 | DesLauriers | B65B 25/001 206/524.1 |
| 2012/0204516 | A1 * | 8/2012 | Palumbo | B65B 11/52 53/403 |
| 2012/0285126 | A1 * | 11/2012 | Vaccari | B65B 31/028 53/510 |

\* cited by examiner

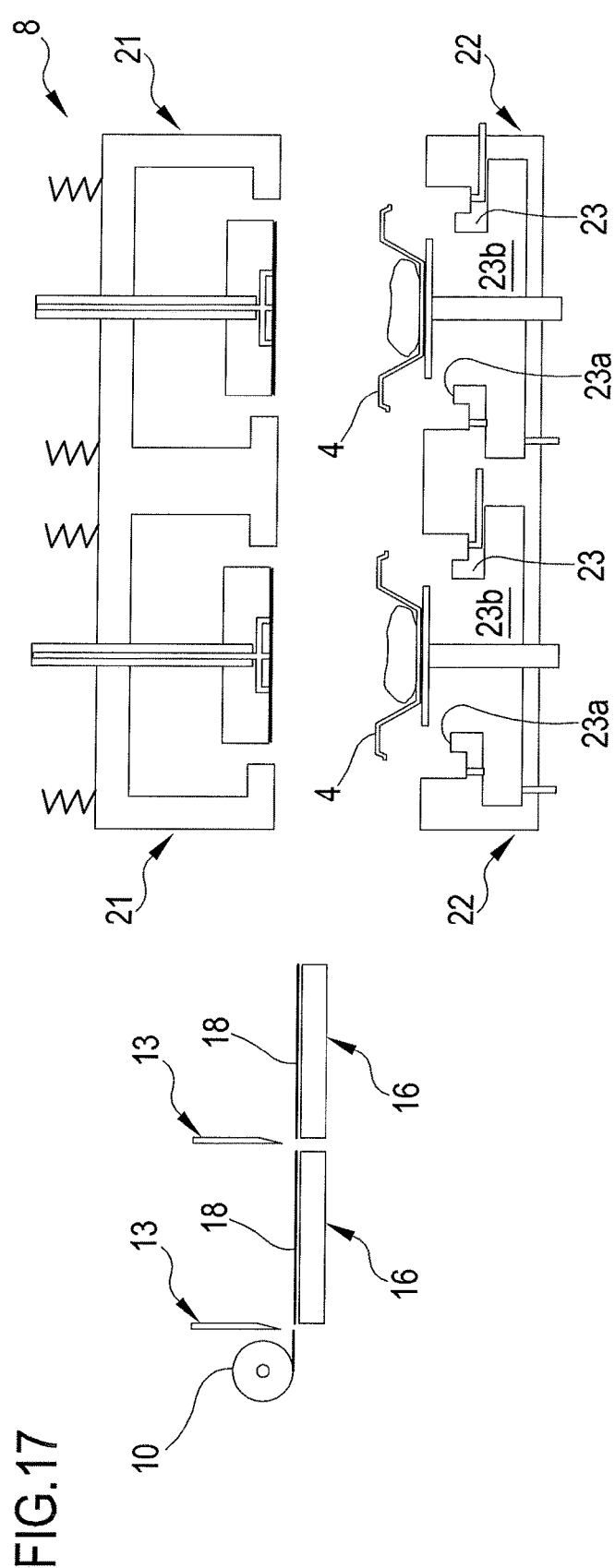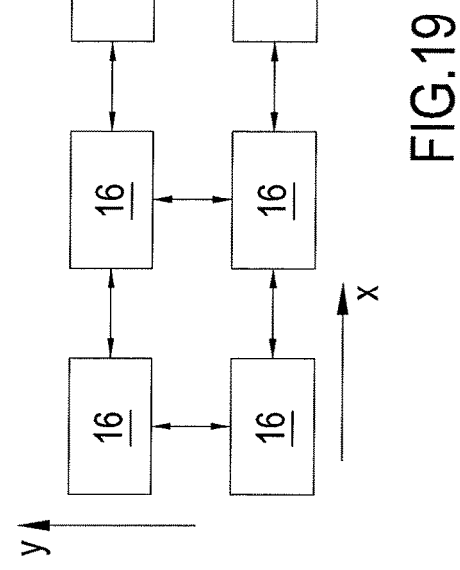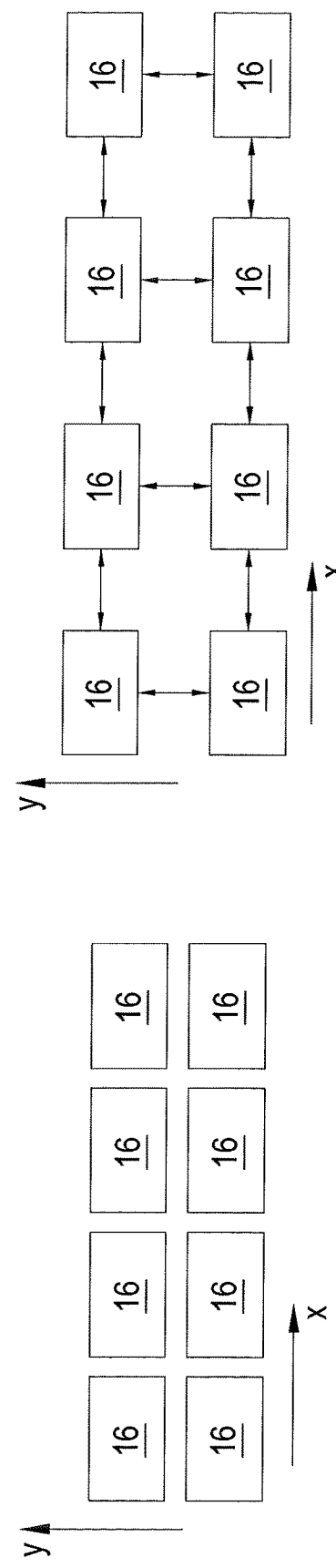

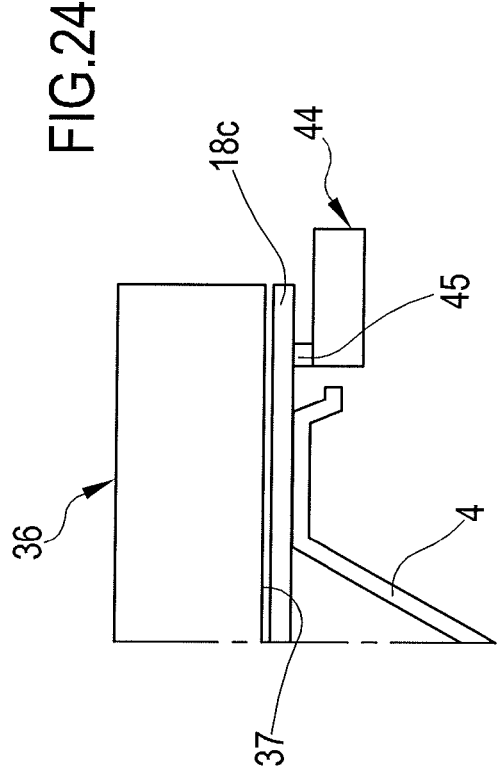
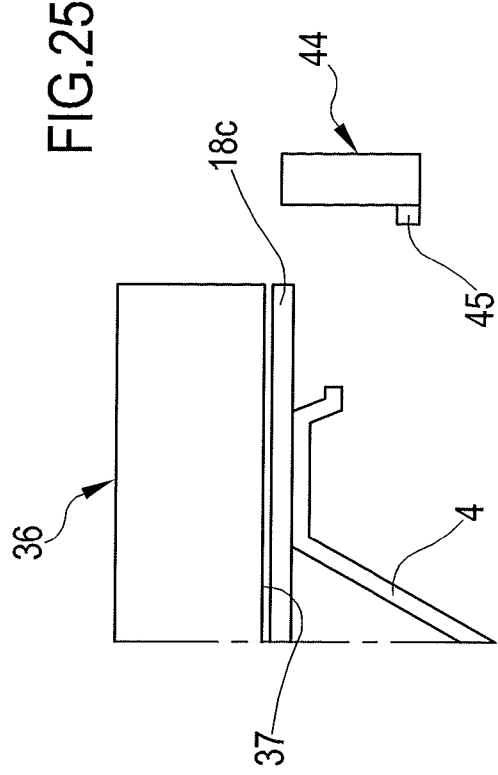
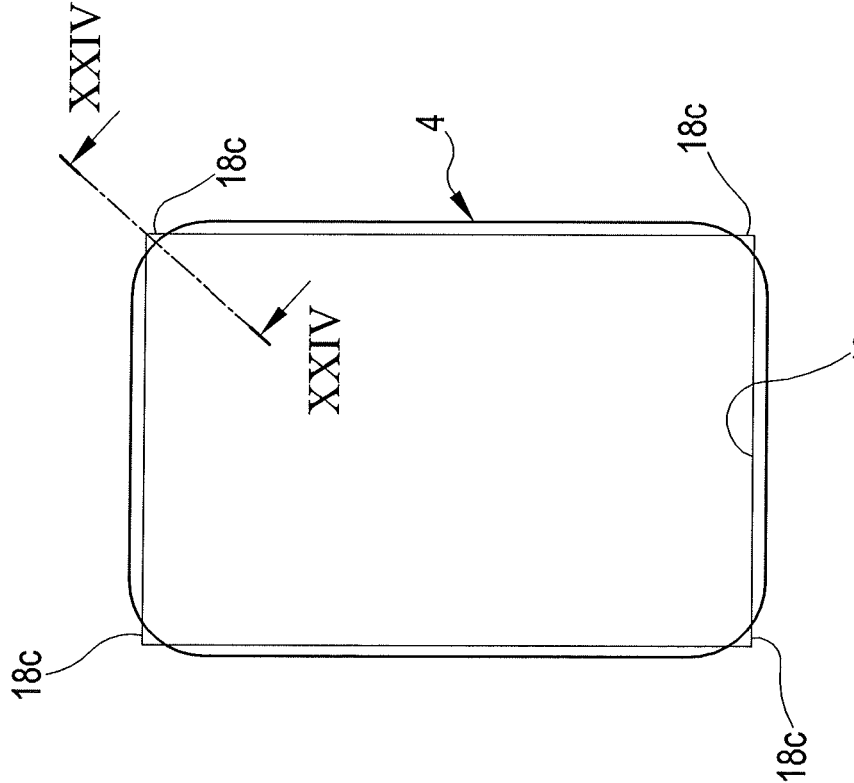

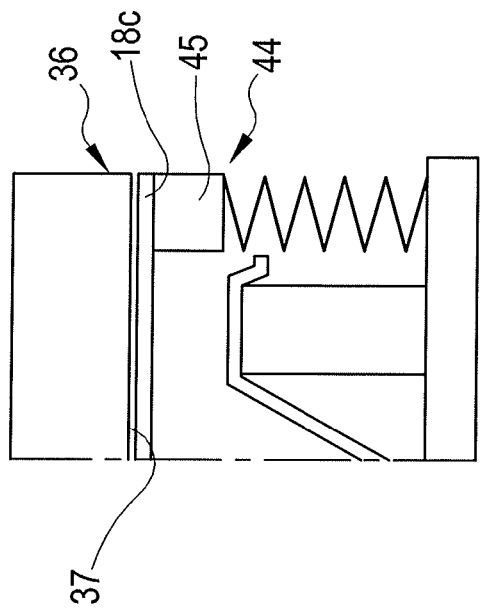
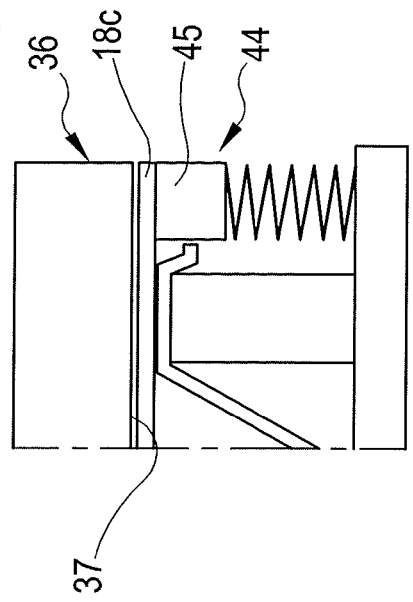
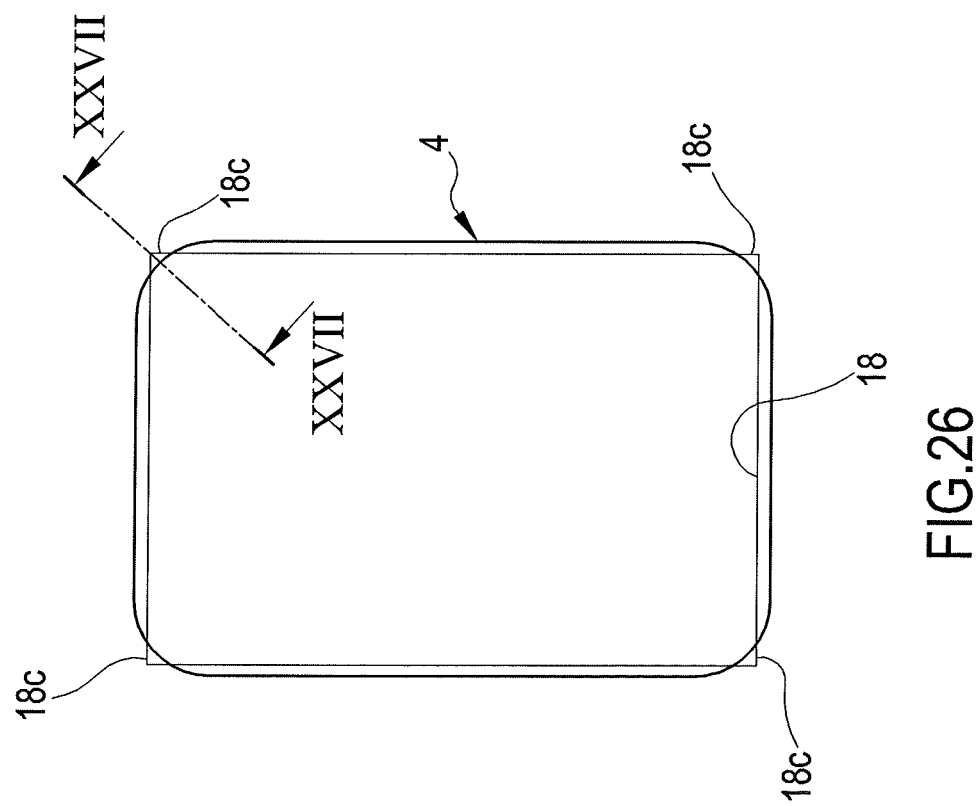

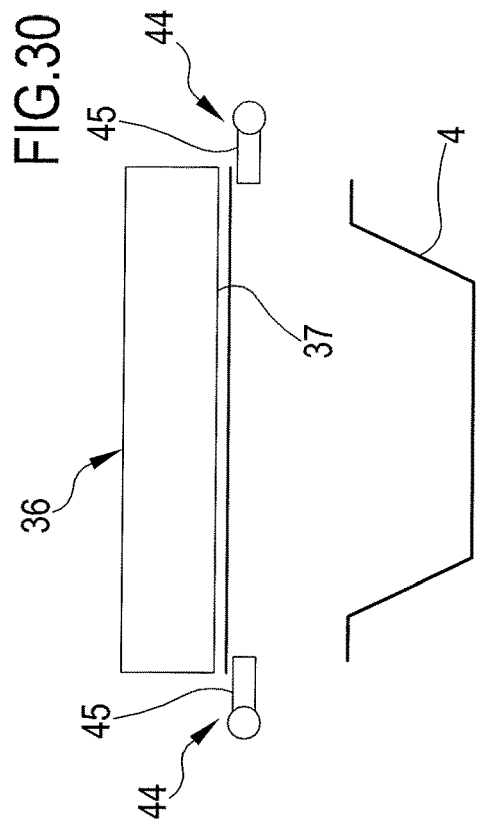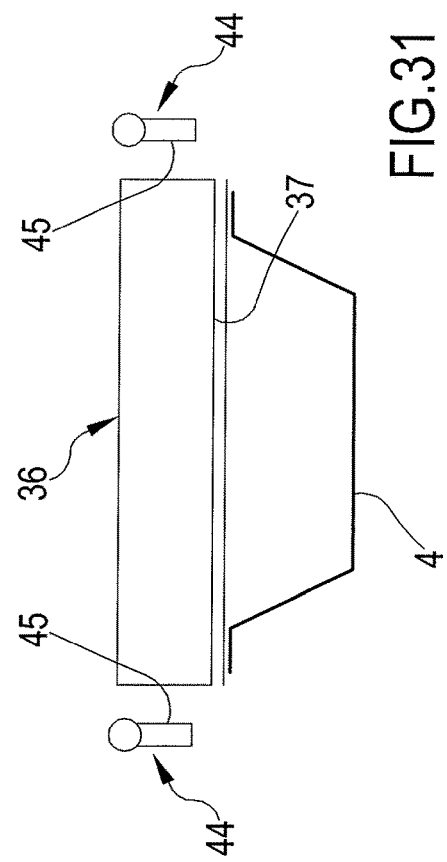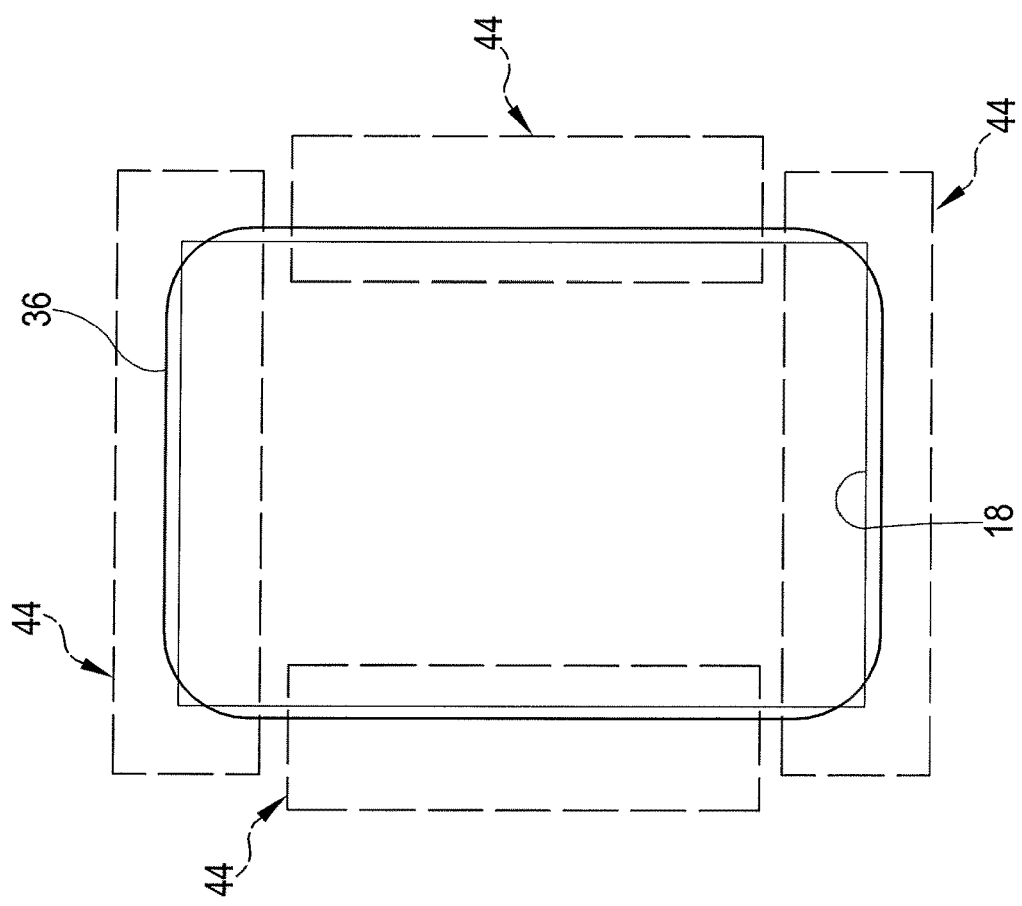

APPARATUS AND PROCESS FOR PACKAGING A PRODUCT

TECHNICAL FIELD

The present invention relates to an apparatus and to a process for packaging of a product. In accordance with certain aspects, the invention relates to an apparatus and process for packaging a product under a controlled atmosphere or under vacuum. In accordance with other aspects the invention relates to an apparatus and process for skin packaging of a product.

BACKGROUND ART

Plastic containers are commonly used for the packaging of food and for a wide variety of other items wherein a plastic lid is bonded to the container e.g. by the application of heat.

One method of bonding the lid to the tray involves use of a laminated plastic lid having a layer of metal foil: a power supply provides an electrical current to a nearby induction coil which induces an electrical current into the metal foil to develop heat which melts portions of the lid and container and fuses the lid to the container lip. For example, EP0469296 discloses an induction sealing assembly using a single turn coil to seal a plastic lid a plastic container. The assembly includes a nest having a recess for holding a container to be sealed, and a movable sealing head for holding a lid or foil membrane and for positioning the lid relative to an opening in the container. Means are provided to secure a portion of the sealing head against a portion of the nest to form an air-tight chamber between a lower portion of the sealing head and an upper portion of the nest. The induction sealing assembly uses a vacuum source and a source of inert gas to flush air from the container prior to sealing. An induction coil mounted in the sealing head induces a heating electrical current in the lid to seal the lid to the container. This solution uses a precut lid: thus the process efficiency is compromised as there must be provision of means for transporting and loading the lead in proper position. Moreover, EP0469296 suggests using a roll stock foil membrane to seal the container. In this case, however, there is no disclosure at all as to how and where the membrane should be cut to form the tray lid.

In order to package products, in particular food products, vacuum packaging have been developed in the past.

Among the known vacuum packaging processes, vacuum skin packaging is commonly employed for packaging food products such as fresh and frozen meat and fish, cheese, processed meat, ready meals and the like. Vacuum skin packaging is described for instance in FR 1 258 357, FR 1 286 018, AU 3 491 504, US RE 30 009, U.S. Pat. Nos. 3,574,642, 3,681,092, 3,713,849, 4,055,672, and 5,346,735.

Vacuum skin packaging is basically a thermoforming process. In particular, the product is typically placed on a rigid or semi-rigid support (such as a tray, a bowl or a cup). The support with the product placed thereon is put in a vacuum chamber, where a film of thermoplastic material, held by vacuum in a position above the product placed on the support, is heated to soften it. The space between the support and the film is then evacuated and finally vacuum above the film is released to cause the film to drape down all around the product and seal to the surface of the support not covered by the product, thus forming a tight skin around the product and on the support.

US 2007/0022717 discloses a machine for gastight packaging an object using a film material. The machine has a lower tool for supporting two trays and an upper tool having cutting devices housed inside the upper tool and facing the lower tool. A film is interposed between the upper tool and the lower tool. The upper and lower tools are first closed the one against the other and then the film is cut to the size of the peripheral rims of the trays by the cutting devices operative inside the upper tool. Sealing tools heat seal the cut regions of the film to the peripheral rim of the tray. A vacuum is situated in the surrounding region of the tray to cause deep-drawing of the film. This reference also mentions that the same device can be used for sealing trays with films that are not deep drawn to form a skin over the product.

US 2005/0257501 discloses a machine for packaging a product arranged in a tray. The machine has a lower tool for supporting the tray and an upper tool with a cutting device. During operation, the film is clamped along an edge surrounding the tray and is deformed by the upper tool in a direction extending away the product. The space surrounding the product is then evacuated, the film and the edge of the tray are sealed and the film is then cut by the cutting device.

As to the machines disclosed by US 2007/0022717 and US 2005/0257501, the film is cut to the size of the tray within the chamber formed by the upper tool and the lower tool, by means of the cutting devices provided on the upper tool. First of all, this disadvantageously requires providing a rather complex and bulky upper tool. Besides, this disadvantageously requires providing an excess film with respect to the size of the support, which excess film is cut from the package and scrapped during or at the end of the packaging process. Indeed, the film is in the form of a continuous sheet wound on a roll (as shown e.g. in FIG. 3 of US 2005/0257501). Therefore, an excess film is required to allow the film to be pulled from the roll and to be held in place above the supported product. Further, in US 2007/0022717 more than one product loaded support (namely two) is packaged at each cycle, so that an excess film is also present between adjacent supports.

WO2011/012652 shows an apparatus for packaging a product in a tray. The machine comprises a first film transfer plate configured for holding a film sheet, heating the film sheet, bringing the film sheet to a position above a tray with the product arranged thereon and air tightly fixing the film sheet to the tray. A second film transfer plate is also present. As for the first film transfer plate also the second film transfer plate is configured for holding a film sheet, heating the film sheet, bringing the film sheet to a position above a tray with the product arranged thereon and air tightly fixing the film sheet to the tray. During a first operating step of the machine, the first film transfer plate holds a first film sheet and heats the first film sheet, while the second film transfer plate releases a second film sheet thereby allowing the second sheet to be drawn into a first tray; and during a second operating step of the machine, the second film transfer plate holds a third film sheet and heats the third film sheet, while the first film transfer plate releases the first film sheet thereby allowing the first film sheet to be drawn into a second tray. The machine further comprises a rotating cylinder suitable for rotating about its axis X, the first film transfer plate and the second film transfer plate being connected to the rotating cylinder so that, when the rotating cylinder rotates about its axis X, the positions of the first film transfer plate and the second film transfer plate are exchanged. A vacuum arrangement allows removing air from within the tray underneath the film sheet (positioned either by the first or by the second film transfer plate) through the at least one hole present in the tray. The film transfer plates are configured to release the film sheet thereby allowing the film sheet to be drawn into the tray while the vacuum arrangement is removing air from within the tray.

Although the above solution improved previously known techniques, it should be noted that the apparatus and method disclosed in WO2011/012652 have been mainly conceived and optimized for skin packaging: in other words there is a need for a solution of maintaining all positive aspects relating to reduction of waste material while at the same time being adapted for packaging of products under controlled atmosphere.

Thus it is an object of the invention conceiving a process and an apparatus which can flexibly operate both for skin packaging and for modified atmosphere packaging and which can be capable of reducing as much as possible consumption of plastic film.

It is a further aim of the invention that of conceiving a process and an apparatus for packaging products using either heat shrinkable films or non heat shrinkable films.

Another object is that of offering a process and an apparatus capable of increasing productivity and of avoiding as possible problems of mis-positioning of the film lid or of the film skin onto the support or tray.

SUMMARY OF THE INVENTION

One or more of the objects specified above are substantially achieved by a process and by an apparatus according to any one of the appended claims Aspect of the invention are here below disclosed.

A 1st aspect concerns an apparatus (1) for packaging a product (P) arranged on a support (4), said support (4) having a base wall (4a) and a side wall (4b), said apparatus (1) comprising:
a packaging assembly (8) configured for tightly fixing one or more film sheets (18) to said one or more supports (4), the packaging assembly (8) including:
    a lower tool (22) defining a prefixed number of seats (23b) for receiving said one or more supports (4), and
    an upper tool (21) facing the lower tool (22) and configured for holding one or more of said film sheets (18),
at least the upper and lower tools (21; 22) cooperating to define a packaging chamber (24);
said packaging assembly (8) being configured to operate at least in a first operating condition, where said packaging chamber (24) is open to receive one or more of said film sheets (18) and, in a second operating condition, where said packaging chamber (24) is, optionally hermetically, closed;
a film supplying assembly (5) configured for supplying a continuous film (10a);
a film cutting assembly (6) active on the continuous film (10a) and configured for cutting film sheets (18) of prefixed length from said continuous film (10a), wherein the film cutting assembly (6) is located outside said packaging chamber (24); and
a control unit (100).

In a 2nd aspect according to the 1st aspect, the apparatus further comprises a inner wall (23) which is part of the lower tool and defines the seats (23b)—in practice the inner wall may define one, two or multiple adjacent seats all housed inside the packaging chamber (249.

In a 3rd aspect according to any one of the preceding aspects, the apparatus has a control unit (100) connected to the packaging assembly (8) and configured for commanding the packaging assembly (8) to pass from the first to the second operating condition and vice-versa.

In a 4th aspect according to any one of the preceding aspects comprising at least one transfer device (7) configured for positioning the cut film sheets (18) inside the packaging chamber (24) and above the respective support (4).

In a 5th aspect according to the preceding aspect, the transfer device (7) includes a backing structure (16) having a flat holding surface (17) adapted for receiving the at least one or more film sheets (18) cut by the cutting assembly (6).

In a 6th aspect according to the preceding aspect the transfer device (7) includes a mechanism (25) active on the packaging assembly (8) and configured for displacing the upper tool (21) between a first position, where the upper tool (21) is positioned in correspondence of the backing structure (16) and configured to pick up from the backing structure (16) the one or more cut film sheets (18), and at least a second position, where the upper tool (21) is aligned to the lower tool (22) and configured to position at least one film sheet (18) above said support (4).

In a 7th aspect according to the 5th or 6th aspect the transfer device (7) includes a mechanism (19) active on the backing structure (16) and configured for relative movement of the backing structure (16) with respect to the packaging assembly (8) between a first position, where the baking structure (16) is positioned at the cutting assembly (6) and at least a second position, where the backing structure (16) is positioned inside said packaging chamber (24) and configured to place at least one film sheet (18) above said support (4).

In a 8th aspect according to any one of the aspects from the 5th to the 7th the control unit (100) is configured for activating the film cutting assembly (6) for cutting, outside the packaging chamber, the continuous film (10a) into the film sheets (10); activating the transfer device (7) and positioning the cut film sheets (18) inside the packaging chamber (24) and above the respective support (4).

In a 9th aspect according to any one of the preceding aspects the control unit (100) is configured for leaving the packaging assembly (8) in the first operating condition a time sufficient for:
    the backing structure of transfer device (7) to position inside the packaging chamber (24) and above the respective support (4) the cut film sheets (10) which have been cut outside the packaging chamber (24), and
    the backing structure of transfer device (7) to then exit from the packaging chamber (24).

The backing structure and the cutting assembly are then controlled by the control unit which is configured to command the backing structure to take again the position at the cutting assembly where the backing structure receives one or more newly cut film sheet(s).

In a 10th aspect according to any one of aspects from the 7th to the 9th the mechanism (19) includes a transfer actuator (47) active on the backing structure (16) and configured for pushing and pulling the backing structure (16) along a path suitable for achieving the displacement between said first and second positions.

In an 11th aspect according to any one of the preceding aspects the apparatus further includes a transport assembly (3) configured for displacing one or more supports (4) along a predefined path to the packaging assembly (8), the transport assembly including a conveyor (46) configured for displacing a prefixed number of supports (4) per time, and wherein the control unit (100) is configured for synchronizing activation of the transfer device (7) with passage of the packaging assembly (8) from the first to the second operating condition.

In an 12th aspect according to the preceding aspect the control unit (100) is configured for:
controlling the conveyor (46) to displace the prefixed number of supports (4) from a region outside the packaging chamber (24), to a region inside the packaging chamber (24) where the support or supports (4) of said prefixed number are in vertical alignment to respective film sheets;
synchronizing the conveyor (46) such that movement of the prefixed number of supports (4) from the region outside the packaging chamber (24) to the region inside the packaging chamber (24) is caused to take place when the packaging chamber (24) is open.

In a 13th aspect according to any one of the preceding aspects the apparatus includes a vacuum arrangement (27) connected to the packaging chamber (24) and configured for removing gas from said packaging chamber (24); optionally wherein the vacuum arrangement (27) comprises at least one vacuum pump (28) and at least one evacuation pipe (29) connecting the inside of said packaging chamber (24) to the vacuum pump (28).

In a 14th aspect according to the preceding aspect, said control unit (100) is further configured to control the vacuum arrangement (27) to withdraw gas from said packaging chamber (24) at least when the packaging assembly (8) is in said second operating condition with said packaging chamber (24) hermetically closed.

In a 15th aspect according to any one of the preceding aspects including a controlled atmosphere arrangement (30) connected to the packaging chamber (24) and configured for injecting a gas stream into said packaging chamber (24).

In a 16th aspect according to the preceding aspect the controlled atmosphere arrangement (30) comprises at least one injection device (31), for instance including a controllable injection valve or a controllable injection pump, and at least one injection pipe (32) connecting the inside of said packaging chamber (24) to the injection device (31).

In a 17th aspect according to any one of the preceding two aspects wherein said control unit (100) is further configured to control said controlled atmosphere arrangement (30) to inject said stream of gas at least when the packaging assembly (8) is in said second operating condition with said packaging chamber (24) hermetically closed.

In a 18th aspect according to any one of the preceding three aspects wherein the controlled atmosphere arrangement (30) is configured to inject gas into the packaging chamber including a quantity of one or more of N2, O2 and CO2 which is different from the quantity of these same gases as present in the atmosphere at 20° C. and sea level (1 atmosphere pressure).

In a 19th aspect according to any one of the preceding aspects from the 12th to the 18th wherein the apparatus includes both the vacuum arrangement (27) and the controlled atmosphere arrangement (30).

In a 20th aspect according to the preceding aspect the control unit (100) is configured to control said controlled atmosphere arrangement (30) to start injecting said stream of gas either after a prefixed delay from activation of said vacuum arrangement (27) or after a prefixed level of vacuum has been reached inside said packaging chamber (24).

In a 21st aspect according to any one of the preceding two aspects said control unit (100) is configured to control said controlled atmosphere arrangement (30) to start injecting said stream of gas while said gas withdrawal from said packaging chamber is still ongoing.

In a 22nd aspect according to any one of the preceding aspects from the 13th to the 21st the control unit is configured to operate the vacuum arrangement (27) for removing gas from said packaging chamber (24) and create in the packaging chamber (24) a vacuum level with pressure comprised between 100 and 300 mbar.

In a 23rd aspect according to any one of the preceding aspects from the 13th to the 22nd the control unit is configured to operate the vacuum arrangement (27) for removing gas from said packaging chamber (24) and create in the packaging chamber (24) a vacuum level with pressure comprised between 150 and 250 mbar.

In a 24th aspect according to any one of the preceding aspects the packaging assembly (8) further comprises:
a main actuator (33) active on at least one of said upper and lower tool (21; 22), the main actuator (33) being controlled by the control unit (100),
the control unit (100) being configured for acting on the main actuator (33) and causing relative movement of the upper and lower tool (21; 22), along a main direction (A5), between said first operating condition, where the upper tool (21) is spaced apart from the lower tool (22) and said packaging chamber (24) is open to receive one or more of said film sheets (18), and said second operating condition, where a closure surface (34) of the upper tool (21) tightly abuts against a closure surface (35) of the lower tool (22) to hermetically close said packaging chamber (24) with respect to an atmosphere outside the apparatus (1).

In a 25th aspect according to any one of the preceding aspects upper tool (21) comprises a film holding plate (36) having a respective active surface (37) configured for receiving the one or more film sheets (18).

In a 26th aspect according to the preceding aspect the apparatus has means (38) for holding the one or more film sheets (18) in correspondence of said active surface (37), said means (38) for holding comprising one or more in the group of:
a vacuum source (39) controlled by the control unit (100), the control unit (100) being configured for activating the vacuum source (39) and causing the film holding plate (36) to receive and hold said one or more film sheets (18) in correspondence of the active surface (37),
mechanical holders associated to the active surface (37),
adhesive portions associated to the active surface (37),
heatable portions associated to the holding plate (36) and controlled by control unit (100) for causing heating of the active surface (37) and thus of the film sheet (18) in order to increase stickiness of the film sheet to the active surface (37),
electric systems associated to the holding plate (36) and controlled by control unit (100) for charging the active surface (37) with a predetermined polarity.

In a 27th aspect according to any one of the preceding two aspects, the packaging assembly includes a heating structure (40) peripherally associated to the film holding plate (36) and having a respective heating surface (41) which extends radially outside with respect to the active surface (37) of the holding plate (36).

In a 28th aspect according to the preceding aspect, the heating structure is configured such that:
at least when the packaging assembly (8) is in said second operating condition, the heating surface (41) of the heating structure (40) faces an end surface (23a) of said inner wall (23) delimiting a respective one of said seats (23b) in the lower tool (22) and the heating structure (40) and film holding plate (36) are relatively movable the one with respect to the other along said main direction (A5) such that the heating surface (41) of the heating structure (40) may selectively be positioned in a position where it does not contact the film sheet and in a position where it contacts the film sheet (18) positioned above a support (4) located in one of said seats (23b).

In a 29th aspect according to any one of the preceding two aspects, wherein the control unit (100) is configured for controlling heating of the heating structure (40) such that the heating surface (41) is brought at least to a first temperature, e.g. in the range between 150° C. and 250° C.

In a 30th aspect according to any one of the preceding aspects from the 25th to the 29th, wherein heating means is integrated in the film holding plate (36) and controlled by the control unit (100).

In a 31st aspect according to the preceding aspect, the control unit (100) is configured for controlling the heating means such that the active surface of the film holding plate (36) is brought at least to a second temperature comprised between 150° C. and 260° C., optionally between 180-240° C., more optionally between 200-220° C.

In a 32nd aspect according to any one of the preceding two aspects, the control unit (100) is configured for independently controlling the heating means and the heating structure (40) and to independently set or allow setting the first and second temperatures.

In a 33rd aspect according to any one of the aspects from the 27th to the 32nd, the heating structure (40) comprises a metallic body embedding at least one resistive and/or inductive element connected to a power supply and to the control unit (100) which is configured for controlling the power supply to supply current to the resistive or inductive element such as to keep the temperature of the heating surface (41) within a prefixed range around said first temperature. In practice a thermostat is present and is associated to both the heating structure and the control unit such that the control unit feeds current to resistive and/or inductive element when the temperature follows below a set temperature.

In a 34th aspect according to any one of the aspects from the 27th to the 33rd, the heating structure (40) includes a metallic wire directly carried by the heating surface (41) of the heating structure (40), the metallic wire being connected to a power supply and to the control unit (100) which is configured for controlling the power supply to supply current to the metallic wire during discrete time intervals (e.g. shorter than 10 seconds) followed by time intervals where no current supply to the metallic wire takes place.

In a 35th aspect according to the preceding aspect the control unit (100) is configured for controlling the power supply to supply current to the metallic wire when the step of sealing of the film sheet (18) to the support (4) needs to take place.

In a 36th aspect according to any one of the aspects from the 27th to the 35th the heating structure (40) includes a printed circuit formed onto said heating surface (41) of the heating structure (40), the printed circuit being connected to a power supply and to the control unit (100) which is configured for controlling the power supply to supply current to the printed circuit during discrete time intervals (e.g. shorter than 10 seconds) followed by time intervals where no current supply to printed circuit takes place exclusively.

In a 37th aspect according to the preceding aspect the control unit (100) is configured for controlling the power supply to supply current to the printed circuit when the step of sealing of the film sheet (18) to the support (4) needs to take place.

In a 38th aspect according to any one of the preceding aspects from the 25th to the 37th the film holding plate (36) is rigidly coupled to the upper tool (21) and mounted to this latter such as the film holding plate (36) is not relatively movable with respect to the upper tool (21) at least along said main direction (A5).

In a 39th aspect according to any one of the preceding aspects from the 25th to the 38th the film holding plate (36) is rigidly coupled to the upper tool (21) and mounted to this latter such as the active surface (37) is flush to the bottom surface of the lower tool (21).

In a 40th aspect according to any one of the preceding two aspects said active surface of the holding plate is sufficiently sized to overlap, optionally completely overlap, an end surface (23a) of said inner wall (23) delimiting a respective one of said seats (23b) in the lower tool (22).

In a 41st aspect according to any one of the preceding aspects the packaging assembly (8) further comprises at least a side wall (42) movably associated to one of the upper tool (21) or lower tool (22), wherein:

the side wall (42) has a front surface (43a) configured for abutting against an abutment surface (43b) of the other of said upper tool (21) or lower tool (22), the side wall (42) is mounted to the packaging assembly such that when the packaging assembly moves from said first to said second operating conditions, the side wall (42) correspondingly moves from a first position, where the side wall front surface (43a) is spaced from said abutment surface (43b) so that the packaging chamber (24) is left open to receive one or more of said film sheets (18), to a second position, where the side wall front surface (43a) tightly closes against said abutment surface (43b) such that said packaging chamber (24) is hermetically closed with respect to an atmosphere outside the apparatus (1).

In a 42nd aspect according to the preceding aspect, wherein the control unit (100) after the packaging assembly has reached the second operating condition is configured for acting on the main actuator (33) and causing a further relative movement of the upper and lower tool (21; 22), along main direction (A5) such that the film sheet held in position by the holder plate (36) is pressed against rim (4c) of support (4).

In 43rd aspect according to the preceding aspect wherein the further relative movement causes a retraction of the side wall (42) against the reaction of a contrast element.

In a 44th aspect according to the preceding aspect wherein the contrast element comprises one or more elastic elements (80).

The apparatus of any one of the preceding claims wherein the lower tool (22) is provided with multiple seats (23b) each for hosting a corresponding support (4) and wherein the upper tool (21) is provided with a corresponding plurality of holding plates (36) each for holding a respective film sheet (18).

In a 44th aspect according to any one of the preceding aspects the apparatus comprises:

a plurality of distinct backing structures (16), each comprising a flat holding surface (17) adapted for receiving one respective of said film sheets (18), each of the backing structures (16) being movable between at least the cutting assembly, to pick up the respective film sheet (18), and the inside of the chamber (24), to position the cut film sheet (18) in correspondence of the respective upper tool (21) holding plate (36).

In 45th aspect according to the preceding aspect the apparatus comprises:
- a transfer actuator (47) active on the backing structures (16) for allowing movement of the backing structures (16) and thus of cut film sheets (18) from the cutting assembly (6) to inside of the packaging chamber (24), the transfer actuator (47) being controlled by the control unit (100) such that to increase a mutually spacing among the backing structures (16) before, when or subsequent to moving the backing structures (16) from the cutting assembly (6) to the inside the packaging chamber (24).

In 46th aspect according to the preceding aspects for each of said seats (23b), the packaging assembly (8) comprises: a number of pusher elements (44) adapted to move from a release position, where active portions (45) of the pusher elements (44) are spaced from the active surface (37) of the holding plate (36), to an engage position, where active portions (45) of the pusher elements (44) press the cut film sheet (18) border portions against said active surface (37) of the holding plate (36).

In a 47th aspect according to the preceding aspect said pusher element or elements (44) include one selected in the group of:
- finger shaped stoppers pivotally mounted to the upper tool (21) and active in correspondence of corners of said seats,
- finger shaped stoppers mounted to the lower tool (22), configured to be vertically moved, and active in correspondence of corners of said seats,
- oscillating bars pivotally mounted to the upper tool (21) and active in correspondence of side borders of said seats,
- oscillating bars mounted to the lower tool (22), configured to be vertically moved, and active in correspondence of side borders of said seats.

In a 48th aspect according to any one of the preceding two aspects the apparatus includes at least one pusher actuator active on said pusher elements (44) under the control of said control unit (100) which is configured to activate the said pusher actuator and move the pusher elements (44) from said release to said engage position and viceversa.

In a 49th aspect according to any one of the preceding aspects the apparatus has a frame (2) carrying:
- the transport assembly (3),
- the packaging assembly (8),
- the film supplying assembly (5), which comprises a film roll supported by a roll holder connected to said frame,
- the film cutting assembly (6), which comprises at least one blade (14) movably by said frame (2) and active in a position located between said packaging assembly (8) and said film supply assembly (5).

In a 50th aspect according to the preceding aspect, the control unit (100) is configured for execution of the following cycle:
- commanding the transport assembly (3) to displace said support (4) said packaging chamber (24);
- commanding the film cutting assembly (6) to cut at least one film sheet (18),
- commanding the transfer device (7) to position the cut film sheet (18) inside the packaging chamber (24) and above the respective support (4),
- commanding the upper tool (21) to hold the cut film sheet (18) above, and at a distance from, said support (4),
- commanding the packaging assembly (8) to pass from the first to the second operating condition,
- commanding the packaging assembly (8) to tightly fix the film sheet (18) to said support (4).

In a 51st aspect according to the preceding aspect the control unit (100) is configured for commanding—after the packaging assembly (8) has passed from the first to the second operating condition—the vacuum arrangement (27) to remove air from within said hermetically closed packaging chamber (24).

In a 52nd aspect according to any one of the preceding two aspects the control unit (100) is configured for commanding—after the packaging assembly (8) has passed from the first to the second operating condition—the controlled atmosphere arrangement (30) to inject a gas or a gas mixture in the packaging chamber (24).

In a 53th aspect according to any one of the preceding aspects the trays or supports used by the apparatus is made of a single layer or, preferably, of a multi-layer polymeric material having the features disclosed in the following section of the specification identified as "Trays and supports".

In a 54th aspect according to any one of the preceding aspects the film 10a applied to the tray or support 4 to form a lid onto the tray (e.g. for MAP—modified atmosphere packaging) or a skin associated to the tray and matching the contour of the product is made of a flexible multi-layer material comprising at least a first outer heat-sealable layer, an optional gas barrier layer and a second outer heat-resistant layer. The film has the features disclosed in the following section of the specification identified as "The film or film material".

In a 55th aspect according to any one of the preceding aspects, the control unit (100) comprises a digital processor (CPU) with memory (or memories), an analogical type circuit, or a combination of one or more digital processing units with one or more analogical processing circuits.

In a 56th aspect according to the preceding aspect the control unit (100) comprises one or more CPUs, wherein one or more programs are stored in an appropriate memory of the CPU or connected to the CPU.

In a 57th aspect according to the preceding aspect the program or programs contain instructions which, when executed by the control unit, cause the control unit (100) to execute the steps described and/or claimed in connection with the control unit.

In a 58th aspect according to any one of the preceding three aspects the control unit (100) acts on and controls the transport assembly (3), the film cutting assembly (6), the transfer device (7), the packaging assembly (8) and particularly the upper and/or lower tools (21, 22), the vacuum arrangement (27) if present, the controlled atmosphere arrangement (30) if present.

In a 59th aspect according to the preceding four aspects the control unit (100) is configured for controlling execution of the following cycle:
- commanding the transport assembly (3) to displace said support along the predefined path into said packaging chamber (24) so that each support (4) to be packaged is housed in the respective seat (23b);
- commanding the film cutting assembly (6) to cut at least one film sheet (18) exactly sized at least to cover the mouth of the support (4) delimited by said rim (4c) and at least part or all the top surface of the rim,
- commanding the transfer device (7) to position the cut film sheet (18) inside the packaging chamber (24) and above the respective support (4), commanding the upper tool (21) to hold the cut film sheet (18) above and at a distance from said support (4), commanding the packaging assembly (8) to pass from the first to the second operating condition so as to hermetically close the packaging chamber (24), commanding the vacuum arrangement (27) if present to remove air from within said hermetically closed packaging chamber, and/or commanding the controlled atmosphere arrangement (30) if present to inject a gas or a gas mixture in the packaging chamber, commanding the packaging assembly (8) to tightly fix the film sheet (18) to said support (4), commanding the packaging assembly (8) from the second to the first operating condition.

In a 60th aspect according to the preceding aspect the control unit is configured for commanding the transport assembly (3) to move the support (4) with the tightly fixed film sheet (18) out of the packaging chamber (24).

In a 61st aspect according to the preceding two aspects the control unit is configured for commanding to repeat the above cycle.

In a 62nd aspect according to any one of the preceding aspects the control unit may also be configured for controlling the apparatus (1) in order to execute any one of the packaging processes described below or claimed in the appended claims.

A 63rd aspect concerns a process of packaging a product (P) arranged on a support (4), said support (4) having a base wall (4a) and a side wall (4b), said process optionally using an apparatus (1) according to any one of the preceding claims, the process comprising the following steps:

unrolling a film (10a) from roll (10),
transversely cutting the unrolled portion of film (10a) and preparing cut film sheets (18),
moving the cut film sheets (18) to a packaging assembly (8) defining at its inside a packaging chamber (24),
progressively moving a number of supports (4) inside the packaging chamber (24) of a packaging assembly (8),
keeping the packaging chamber (24) open for a time sufficient for a number of supports (4) and for a corresponding number of film sheets (18) to properly position inside said packaging chamber (24),
hermetically closing the packaging chamber (24) with the film sheets held above the respective support (4) and at a distance sufficient to allow gas circulation inside the support (4),
heat sealing the film sheet (18) to said support (4),
opening the hermetically closed packaging chamber (24),
moving the support (4) with the tightly fixed film sheet (18) out of the packaging chamber (24),
wherein the cutting of the film (10a) into film sheets (18) takes place outside the packaging chamber (24) at a station remote from the location where the film sheets are coupled to the supports.

In a 64th aspect according to the preceding aspect the process comprises the step of causing a gas withdrawal from the hermetically closed packaging chamber (24) before the heat sealing step.

In a 65th aspect according to the preceding two aspects the process comprises the step of gas injection of a gas mixture of controlled composition into the hermetically closed packaging chamber (24) before the heat sealing step.

In a 66th aspect according to any one of the preceding three aspects wherein the support (4) comprises and horizontal rim (4c) radially emerging from said side wall (4b).

In a 67th aspect according to any one of the preceding four aspects the film sheet (18) is cut to a size identical to that of the outer border of the rim (4c) or to a size radially smaller than the outer edge of rim (4c) but sufficient to tightly close the mouth of the tray (4) and sealingly engage the rim (4c) top surface.

In a 68th aspect according to any one of the preceding five aspects the process comprises the steps of withdrawing gas from the hermetically closed packaging chamber (24) until a pressure comprised between 100 and 300 mbar, optionally between 150 and 250 mbar, is reached inside said packaging chamber (24) and then—while the film sheet (18) is kept at a distance from a support mouth—injecting a modified atmosphere gas injected into the packaging chamber (24).

In a 69th aspect according to the preceding aspect wherein injecting of said stream of gas for creating a modified atmosphere is while gas withdrawal is still ongoing so as to shorten the time for creating the modified atmosphere.

In a 70th aspect according to any one of the preceding two aspects wherein after the step of gas withdrawing or of gas injecting the process includes a step of uniformly heating the film sheet (18) in case the film sheet is not heat shrinkable or heating at least a peripheral portion (18b) of the film sheet (18) in case the film is heat shrinkable and then approaching the film sheet (18) to the support (4) and tightly bonding it to the support rim (4c).

In a 71st aspect according to any one of the preceding aspects from the 63rd to the 70th the trays or supports used in the process are made of a single layer or, preferably, of a multi-layer polymeric material having the features disclosed in the following section of the specification identified as "Trays and supports".

In a 72nd aspect according to any one of the preceding aspects from the 63rd to the 71st the film 10a applied to the tray or support 4 to form a lid onto the tray (e.g. for MAP—modified atmosphere packaging) or a skin associated to the tray and matching the contour of the product is made of a flexible multi-layer material comprising at least a first outer heat-sealable layer, an optional gas barrier layer and a second outer heat-resistant layer. The film has the features disclosed in the following section of the specification identified as "The film or film material".

BRIEF DESCRIPTION OF THE DRAWINGS

The present invention will become clearer by reading the following detailed description, given by way of example and not of limitation, to be read with reference to the accompanying drawings, wherein:

FIG. 17 is a schematic side view of a transport device and of a packaging assembly which may be used in any one of the embodiments described or claimed when multiple supports or trays are contemporaneously packaged.

FIGS. 18 and 19 are schematic plan views showing the relative position of a plurality of backing structures of a transfer device of the apparatus of e.g. FIG. 17. In particular FIG. 18 shows the backing structures outside the packaging chamber of the apparatus, while FIG. 19 shows the backing structures when positioned inside the packaging chamber.

FIG. 23 is a schematic plan view showing a support and a film sheet in overlapping relationship in correspondence of the packaging assembly.

FIGS. 24 and 25 are views taken according to plane XXIV of FIG. 23 and show a particular of the packaging apparatus relating to pusher elements acting on the corners of the film sheet, in accordance with certain aspects of the invention.

FIG. 26 is another schematic plan view showing a support and a film sheet in overlapping relationship in correspondence of the packaging assembly.

FIGS. 27 and 28 are views taken according to plane XXVII of FIG. 26 and show a particular of the packaging apparatus relating to a variant of pusher elements acting on the corners of the film sheet, in accordance with certain aspects of the invention.

FIG. 29 is further schematic plan view showing a support and a film sheet in overlapping relationship in correspondence of the packaging assembly.

FIGS. 30 and 31 are side views showing a particular of the packaging apparatus relating to a further variant of pusher elements acting along the sides of the film sheet, in accordance with certain aspects of the invention.

DEFINITIONS AND CONVENTIONS

Figure 1:
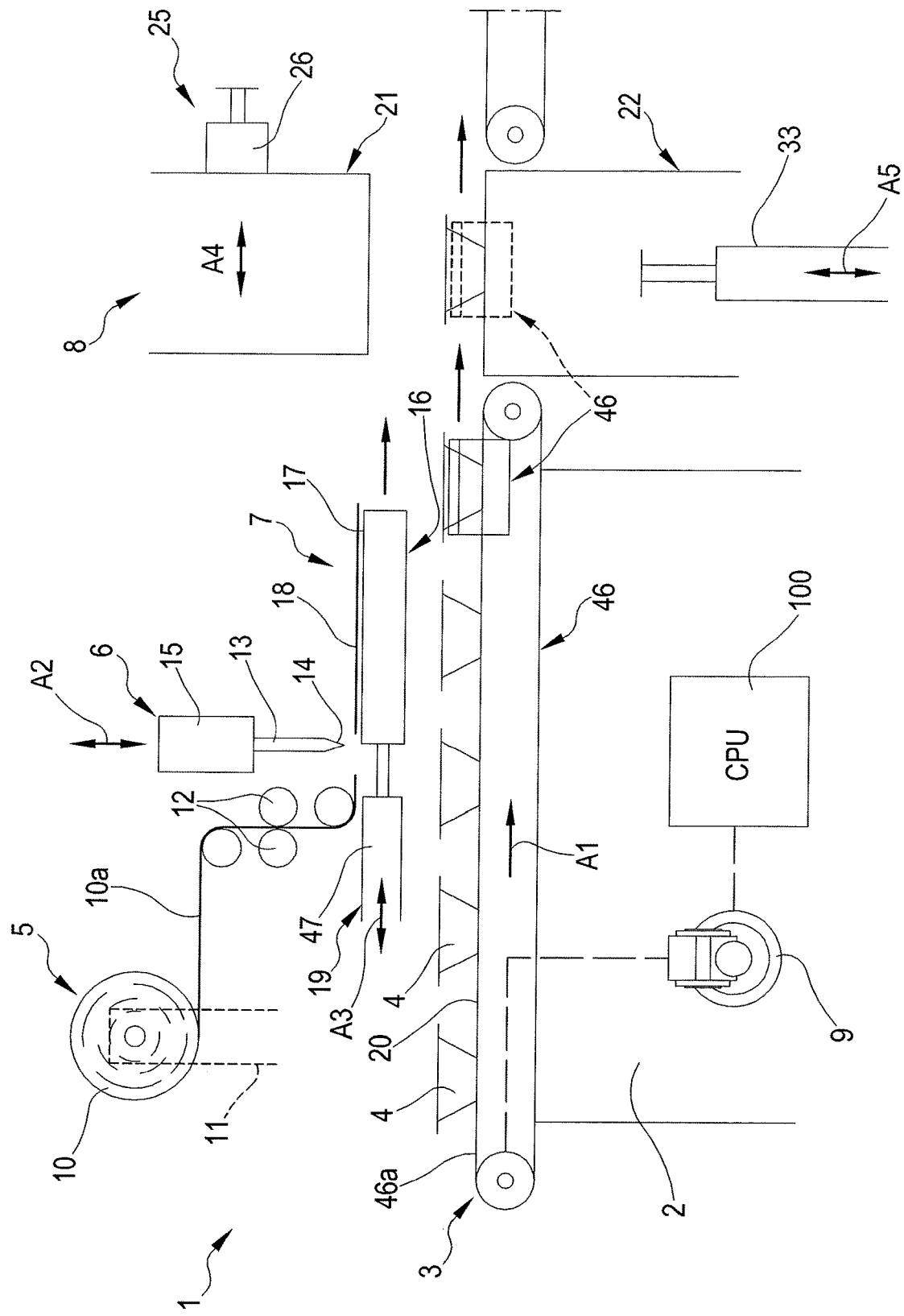
FIG. 1 is a schematic side view layout of an apparatus according to aspects of the invention. The layout of the apparatus of FIG. 1 may be present in all embodiments described herein.

It should be noted that in the present detailed description corresponding parts shown in the various figures are indicated with the same reference numeral through the figures. Note that the figures are not in scale and thus the parts and components shown therein are schematic representations.

In the following description and claims the apparatus and process refer to packaging of a product inside a support: the product may be a food product or not.

As used herein support 4 means a container of the type having a base wall 4a, a side wall 4b and optionally a top rim 4c radially emerging from the side wall 4b; also note for the purpose of the present description tray and support have the same meaning and are interchangeably used. The tray or supports 4 may have a rectangular shape or any other suitable shape, such as round, square, elliptical etc. Trays may be manufactured by thermoforming or injection molding.

The Trays or Supports

The trays or supports 4 described and claimed herein may be made of a single layer or, preferably, of a multi-layer polymeric material.

In case of a single layer material suitable polymers are for instance polystyrene, polypropylene, polyesters, high density polyethylene, poly(lactic acid), PVC and the like, either foamed or solid.

Preferably the tray 4 is provided with gas barrier properties. As used herein such term refers to a film or sheet of material which has an oxygen transmission rate of less than 200 cm3/m2-day-bar, less than 150 cm3/m2-day-bar, less than 100 cm3/m2-day-bar as measured according to ASTM D-3985 at 23° C. and 0% relative humidity.

Suitable materials for gas barrier monolayer thermoplastic trays 4 are for instance polyesters, polyamides and the like.

In case the tray 4 is made of a multi-layer material, suitable polymers are for instance ethylene homo- and co-polymers, propylene homo- and co-polymers, polyamides, polystyrene, polyesters, poly(lactic acid), PVC and the like. Part of the multi-layer material can be solid and part can be foamed.

For example, the tray 4 may comprises at least one layer of a foamed polymeric material chosen from the group consisting of polystyrene, polypropylene, polyesters and the like.

The multi-layer material may be produced either by co-extrusion of all the layers using co-extrusion techniques or by glue- or heat-lamination of, for instance, a rigid foamed or solid substrate with a thin film, usually called "liner".

The thin film may be laminated either on the side of the tray 4 in contact with the product P or on the side facing away from the product P or on both sides. In the latter case the films laminated on the two sides of the tray 4 may be the same or different. A layer of an oxygen barrier material, for instance (ethylene-co-vinyl alcohol) copolymer, is optionally present to increase the shelf-life of the packaged product P.

Gas barrier polymers that may be employed for the gas barrier layer are PVDC, EVOH, polyamides, polyesters and blends thereof. The thickness of the gas barrier layer will be set in order to provide the tray with an oxygen transmission rate suitable for the specific packaged product.

The tray may also comprise a heat sealable layer. Generally, the heat-sealable layer will be selected among the polyolefins, such as ethylene homo- or co-polymers, propylene homo- or co-polymers, ethylene/vinyl acetate copolymers, ionomers, and the homo- and co-polyesters, e.g. PETG, a glycol-modified polyethylene terephthalate.

Additional layers, such as adhesive layers, to better adhere the gas-barrier layer to the adjacent layers, may be present in the gas barrier material for the tray and are preferably present depending in particular on the specific resins used for the gas barrier layer.

In case of a multilayer material used to form the tray 4, part of this structure may be foamed and part may be un-foamed. For instance, the tray 4 may comprise (from the outermost layer to the innermost food-contact layer) one or more structural layers, typically of a material such as foam polystyrene, foam polyester or foam polypropylene, or a cast sheet of e.g. polypropylene, polystyrene, poly(vinyl chloride), polyester or cardboard; a gas barrier layer and a heat-sealable layer.

The tray 4 may be obtained from a sheet of foamed polymeric material having a film comprising at least one oxygen barrier layer and at least one surface sealing layer laminated onto the side facing the packaged product, so that the surface sealing layer of the film is the food contact layer the tray. A second film, either barrier or non-barrier, may be laminated on the outer surface of the tray.

Specific tray 4 formulations are used for food products which require heating in conventional or microwave oven before consumption. The surface of the container in contact with the product, i.e. the surface involved in the formation of the seal with the lidding film, comprises a polyester resin. For instance the container can be made of a cardboard coated with a polyester or it can be integrally made of a polyester resin. Examples of suitable containers for the package of the invention are CPET, APET or APET/CPET containers. Such container can be either foamed or not-foamed.

Trays 4 used for lidding or skin applications containing foamed parts, have a total thickness lower than 8 mm, and for instance may be comprised between 0.5 mm and 7.0 mm and more frequently between 1.0 mm and 6.0 mm.

In case of rigid tray not containing foamed parts, the total thickness of the single-layer or multi-layer thermoplastic material is preferably lower than 2 mm, and for instance may be comprised between 0.1 mm and 1.2 mm and more frequently between 0.2 mm and 1.0 mm.

The Film or Film Material

The film or film material 10a described and claimed herein may be applied to the tray or support 4 to form a lid onto the tray (e.g. for MAP—modified atmosphere packaging) or a skin associated to the tray and matching the contour of the product.

The film for skin applications may be made of a flexible multi-layer material comprising at least a first outer heat-sealable layer, an optional gas barrier layer and a second outer heat-resistant layer. The outer heat-sealable layer may comprise a polymer capable of welding to the inner surface of the supports carrying the products to be packaged, such as for instance ethylene homo- or co-polymers, like LDPE, ethylene/alpha-olefin copolymers, ethylene/acrylic acid copolymers, ethylene/methacrylic acid copolymers, and ethylene/vinyl acetate copolymers, ionomers, co-polyesters, e.g. PETG. The optional gas barrier layer preferably comprises oxygen impermeable resins like PVDC, EVOH, polyamides and blends of EVOH and polyamides. The outer heat-resistant layer may be made of ethylene homo- or copolymers, ethylene/cyclic-olefin copolymers, such as ethylene/norbornene copolymers, propylene homo- or co-polymers, ionomers, (co)polyesters, (co)polyamides. The film may also comprise other layers such as adhesive layers or bulk layers to increase thickness of the film and improve its abuse and deep drawn properties. Particularly used bulk layers are ionomers, ethylene/vinyl acetate copolymers, polyamides and polyesters. In all the film layers, the polymer components may contain appropriate amounts of additives normally included in such compositions. Some of these additives are preferably included in the outer layers or in one of the outer layers, while some others are preferably added to inner layers. These additives include slip and anti-block agents such as talc, waxes, silica, and the like, antioxidants, stabilizers, plasticizers, fillers, pigments and dyes, cross-linking inhibitors, cross-linking enhancers, UV absorbers, odour absorbers, oxygen scavengers, bactericides, antistatic agents and the like additives known to those skilled in the art of packaging films.

One or more layers of the film can be cross-linked to improve the strength of the film and/or its heat resistance. Cross-linking may be achieved by using chemical additives or by subjecting the film layers to an energetic radiation treatment. The films for skin packaging are typically manufactured in order to show low shrink when heated during the packaging cycle. Those films usually shrink less than 15% at 160° C., more frequently lower than 10%, even more frequently lower than 8% in both the longitudinal and transversal direction (ASTM D2732). The films usually have a thickness comprised between 20 microns and 200 microns, more frequently between 40 and 180 microns and even more frequently between 50 microns and 150 microns.

The skin packages are usually "easy-to-open", i.e. they are easily openable by manually pulling apart the two webs, normally starting from a point like a corner of the package where the upper web has purposely not been sealed to the support. To achieve this feature, either the film or the tray can be provided with a suitable composition, allowing easy opening of the package, as known in the art. Typically, the sealant composition and/or the composition of the adjacent layer of the tray and/or the film are adjusted in order to achieve the easy opening feature.

Various mechanisms can occur while opening an easy-to-open package.

In the first one ("peelable easy opening") the package is opened by separating the film and the tray at the seal interface.

In the second mechanism ("adhesive failure") the opening of the package is achieved through an initial breakage through the thickness of one of the sealing layers followed by delamination of this layer from the underlying support or film.

The third system is based on the "cohesive failure" mechanism: the easy opening feature is achieved by internal rupture of a seal layer that, during opening of the package, breaks along a plane parallel to the layer itself.

Specific blends are known in the art to obtain such opening mechanisms, ensure the peeling of the film from the tray surface, such as those described in EP1084186.

On the other hand, in case the film 10a is used for creating a lid on the tray or support 4, the film material may be obtained by co-extrusion or lamination processes. Lid films may have a symmetrical or asymmetrical structure and can be monolayer or multilayer.

The multilayer films have at least 2, more frequently at least 5, even more frequently at least 7 layers.

The total thickness of the film may vary frequently from 3 to 100 micron, in particular from 5 to 50 micron, even more frequently from 10 to 30 micron.

The films may be optionally cross-linked. Cross-linking may be carried out by irradiation with high energy electrons at a suitable dosage level as known in the art. The lid films described above may be heat shrinkable or heat-set. The heat shrinkable films typically show free shrink value at 120° C. measured according to ASTM D2732 in the range of from 2 to 80%, more frequently from 5 to 60%, even more frequently from 10 to 40% in both the longitudinal and transverse direction. The heat-set films usually have free shrink values lower than 10% at 120° C., preferably lower than 5% in both the longitudinal and transversal direction (ASTM D 2732). Lid films usually comprise at least a heat sealable layer and an outer skin layer, which is generally made up of heat resistant polymers or polyolefin. The sealing layer typically comprises a heat-sealable polyolefin which in turn comprises a single polyolefin or a blend of two or more polyolefins such as polyethylene or polypropylene or a blend thereof. The sealing layer can be further provided with antifog properties by incorporating one or more antifog additives into its composition or by coating or spraying one or more antifog additives onto the surface of the sealing layer by technical means well known in the art. The sealing layer may further comprise one or more plasticisers. The skin layer may comprises polyesters, polyamides or polyolefin. In some structures, a blend of polyamide and polyester can advantageously be used for the skin layer. In some cases, the lid films comprise a barrier layer. Barrier films typically have an OTR (evaluated at 23° C. and 0% R.H.

according to ASTM D-3985) below 100 cm$^3$/(m$^2$·day·atm) and more frequently below 80 cm$^3$/(m$^2$·day·atm). The barrier layer is usually made of a thermoplastic resin selected among a saponified or hydrolyzed product of ethylene-vinyl acetate copolymer (EVOH), an amorphous polyamide and a vinyl-vinylidene chloride and their admixtures. Some materials comprise an EVOH barrier layer, sandwiched between two polyamide layers. The skin layer typically comprises polyesters, polyamides or polyolefin.

In some packaging applications, the lid films do not comprise any barrier layer. Such films usually comprise one or more polyolefin are herein defined.

Non-barrier films typically have an OTR (evaluated at 23° C. and 0% R.H. according to ASTM D-3985) from 100 cm$^3$/(m$^2$·day·atm) up to 10000 cm$^3$/(m$^2$·day·atm), more typically up to 6000 cm$^3$/(m$^2$·day·atm).

Peculiar compositions polyester-based are those used for tray lidding of ready-meals packages. For these films, the polyester resins can make up at least 50%, 60%, 70%, 80%, 90% by weight of the film. These films are typically used in combination with polyester-based supports.

For instance the container can be made of a cardboard coated with a polyester or it can be integrally made of a polyester resin. Examples of suitable containers for the package are CPET, APET or APET/CPET containers, either foamed or not-foamed.

Usually, biaxially oriented PET are used as the lid film due to its high thermal stability at standard food heating/cooking temperatures. Often biaxially oriented polyester films are heat-set, i.e. non-heat-shrinkable. To improve the heat-sealability of the PET lidding film to the container a heat-sealable layer of a lower melting material is usually provided on the film. The heat-sealable layer may be coextruded with the PET base layer (as disclosed in EP-A-1,529,797 and WO2007/093495) or it may be solvent- or extrusion-coated over the base film (as disclosed in U.S. Pat. No. 2,762,720 and EP-A-1,252,008).

Particularly in the case of fresh red meat packages, twin lidding film comprising an inner, oxygen-permeable, and an outer, oxygen-impermeable, lidding film are advantageously used. The combination of these two films significantly prevents the meat discoloration also when the packaged meat extends upwardly with respect to the height of the tray walls, which is the most critical situation in barrier packaging of fresh meat.

These films are described for example in EP1848635 and EP0690012, the disclosures of which are herein incorporated by reference.

The lid film can be monolayer. Typical composition of monolayer films comprise polyesters as herein defined and their blends or polyolefins as herein defined and their blends.

In all the film layers herein described, the polymer components may contain appropriate amounts of additives normally included in such compositions. Some of these additives are preferably included in the outer layers or in one of the outer layers, while some others are preferably added to inner layers. These additives include slip and anti-block agents such as talc, waxes, silica, and the like, antioxidants, stabilizers, plasticizers, fillers, pigments and dyes, cross-linking inhibitors, cross-linking enhancers, UV absorbers, odor absorbers, oxygen scavengers, bactericides, antistatic agents, anti-fog agents or compositions, and the like additives known to those skilled in the art of packaging films.

The films suitable for lidding application can advantageously be perforated, in order to allow the packaged food to breath.

Those films may be perforated by using different technologies available in the art, through laser or mechanical means such as rolls provided with several needles.

The number of perforations per unit area of the film and their dimensions affect the gas permeability of the film.

Microperforated films are usually characterized by OTR value (evaluated at 23° C. and 0% R.H. according to ASTM D-3985) from 2500 cm$^3$/(m$^2$·day·atm) up to 1000000 cm$^3$/(m$^2$·day·atm).

Macroperforated films are usually characterized by OTR (evaluated at 23° C. and 0% R.H. according to ASTM D-3985) higher than 1000000 cm$^3$/(m$^2$·day·atm).

Furthermore, the films herein described for lidding applications can be formulated to provide strong or peelable sealing onto the support. A method of measuring the force of a peelable seal, herein referred to as "peel force" is described in ASTM F-88-00. Acceptable peel force values fare in the range from 100 g/25 mm to 850 g/25 mm, from 150 g/25 mm to 800 g/25 mm, from 200 g/25 mm to 700 g/25 mm.

The desired seal strength is achieved specifically designing the tray and the lid formulations.

In general, one or more layers of the lid film can be printed, in order to provide useful information to the consumer, a pleasing image and/or trademark or other advertising information to enhance the retail sale of the packaged product.

The film may be printed by any suitable method, such as rotary screen, gravure or flexographic techniques mas known in the art.

Definitions and Conventions Concerning Materials

PVDC is any vinylidene chloride copolymers wherein a major amount of the copolymer comprises vinylidene chloride and a minor amount of the copolymer comprises one or more unsaturated monomers copolymerisable therewith, typically vinyl chloride, and alkyl acrylates or methacrylates (e.g. methyl acrylate or methacrylate) and the blends thereof in different proportions. Generally a PVDC barrier layer will contain plasticisers and/or stabilizers as known in the art.

As used herein, the term EVOH includes saponified or hydrolyzed ethylene-vinyl acetate copolymers, and refers to ethylene/vinyl alcohol copolymers having an ethylene comonomer content preferably comprised from about 28 to about 48 mole %, more preferably, from about 32 to about 44 mole % ethylene, and even more preferably, and a saponification degree of at least 85%, preferably at least 90%.

The term "polyamides" as used herein is intended to refer to both homo- and co- or ter-polyamides. This term specifically includes aliphatic polyamides or co-polyamides, e.g., polyamide 6, polyamide 11, polyamide 12, polyamide 66, polyamide 69, polyamide 610, polyamide 612, copolyamide 6/9, copolyamide 6/10, copolyamide 6/12, copolyamide 6/66, copolyamide 6/69, aromatic and partially aromatic polyamides or co-polyamides, such as polyamide 6I, polyamide 6I/6T, polyamide MXD6, polyamide MXD6/MXDI, and blends thereof.

As used herein, the term "copolymer" refers to a polymer derived from two or more types of monomers, and includes terpolymers. Ethylene homopolymers include high density polyethylene (HDPE) and low density polyethylene (LDPE). Ethylene copolymers include ethylene/alpha-olefin copolymers and ethylene/unsaturated ester copolymers. Ethylene/alpha-olefin copolymers generally include copolymers of ethylene and one or more comonomers selected from alpha-olefins having from 3 to 20 carbon atoms, such as 1-butene, 1-pentene, 1-hexene, 1-octene, 4-methyl-1-pentene and the like.

Ethylene/alpha-olefin copolymers generally have a density in the range of from about 0.86 to about 0.94 g/cm3. The term linear low density polyethylene (LLDPE) is generally understood to include that group of ethylene/alpha-olefin copolymers which fall into the density range of about 0.915 to about 0.94 g/cm3 and particularly about 0.915 to about 0.925 g/cm3. Sometimes linear polyethylene in the density range from about 0.926 to about 0.94 g/cm3 is referred to as linear medium density polyethylene (LMDPE). Lower density ethylene/alpha-olefin copolymers may be referred to as very low density polyethylene (VLDPE) and ultra-low density polyethylene (ULDPE). Ethylene/alpha-olefin copolymers may be obtained by either heterogeneous or homogeneous polymerization processes.

Another useful ethylene copolymer is an ethylene/unsaturated ester copolymer, which is the copolymer of ethylene and one or more unsaturated ester monomers. Useful unsaturated esters include vinyl esters of aliphatic carboxylic acids, where the esters have from 4 to 12 carbon atoms, such as vinyl acetate, and alkyl esters of acrylic or methacrylic acid, where the esters have from 4 to 12 carbon atoms.

Ionomers are copolymers of an ethylene and an unsaturated monocarboxylic acid having the carboxylic acid neutralized by a metal ion, such as zinc or, preferably, sodium.

Useful propylene copolymers include propylene/ethylene copolymers, which are copolymers of propylene and ethylene having a majority weight percent content of propylene, and propylene/ethylene/butene terpolymers, which are copolymers of propylene, ethylene and 1-butene.

As used herein, the term "polyolefin" refers to any polymerized olefin, which can be linear, branched, cyclic, aliphatic, aromatic, substituted, or unsubstituted. More specifically, included in the term polyolefin are homo-polymers of olefin, co-polymers of olefin, co-polymers of an olefin and an non-olefinic co-monomer co-polymerizable with the olefin, such as vinyl monomers, modified polymers thereof, and the like. Specific examples include polyethylene homopolymer, polypropylene homo-polymer, polybutene homopolymer, ethylene-alpha-olefin co-polymer, propylene-alpha-olefin co-polymer, butene-alpha-olefin co-polymer, ethylene-unsaturated ester co-polymer, ethylene-unsaturated acid co-polymer, (e.g. ethylene-ethyl acrylate co-polymer, ethylene-butyl acrylate co-polymer, ethylene-methyl acrylate co-polymer, ethylene-acrylic acid co-polymer, and ethylene-methacrylic acid co-polymer), ethylene-vinyl acetate copolymer, ionomer resin, polymethylpentene, etc.

The term "polyester" is used herein to refer to both homo- and co-polyesters, wherein homo-polyesters are defined as polymers obtained from the condensation of one dicarboxylic acid with one diol and co-polyesters are defined as polymers obtained from the condensation of one or more dicarboxylic acids with one or more diols. Suitable polyester resins are, for instance, polyesters of ethylene glycol and terephthalic acid, i.e. poly(ethylene terephthalate) (PET). Preference is given to polyesters which contain ethylene units and include, based on the dicarboxylate units, at least 90 mol %, more preferably at least 95 mol %, of terephthalate units. The remaining monomer units are selected from other dicarboxylic acids or diols. Suitable other aromatic dicarboxylic acids are preferably isophthalic acid, phthalic acid, 2,5-, 2,6- or 2,7-naphthalenedicarboxylic acid. Of the cycloaliphatic dicarboxylic acids, mention should be made of cyclohexanedicarboxylic acids (in particular cyclohexane-1,4-dicarboxylic acid). Of the aliphatic dicarboxylic acids, the (C3-Ci9)alkanedioic acids are particularly suitable, in particular succinic acid, sebacic acid, adipic acid, azelaic acid, suberic acid or pimelic acid. Suitable diols are, for example aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol, optionally heteroatom-containing diols having one or more rings.

Co-polyester resins derived from one or more dicarboxylic acid(s) or their lower alkyl (up to 14 carbon atoms) diesters with one or more glycol(s), particularly an aliphatic or cycloaliphatic glycol may also be used as the polyester resins for the base film. Suitable dicarboxylic acids include aromatic dicarboxylic acids such as terephthalic acid, isophthalic acid, phthalic acid, or 2,5-, 2,6- or 2,7-naphthalenedicarboxylic acid, and aliphatic dicarboxylic acids such as succinic acid, sebacic acid, adipic acid, azelaic acid, suberic acid or pimelic acid. Suitable glycol(s) include aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol. Examples of such copolyesters are (i) copolyesters of azelaic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol; (iv) co-polyesters of ethylene glycol, terephthalic acid and isophthalic acid. Suitable amorphous co-polyesters are those derived from an aliphatic diol and a cycloaliphatic diol with one or more, dicarboxylic acid(s), preferably an aromatic dicarboxylic acid. Typical amorphous copolyesters include co-polyesters of terephthalic acid with an aliphatic diol and a cycloaliphatic diol, especially ethylene glycol and 1,4-cyclohexanedimethanol.

DETAILED DESCRIPTION

First Embodiment of the Apparatus 1

FIGS. 1-8 show an apparatus 1 for packaging of a product P arranged on a support or tray 4 according to an embodiment of the present invention. The apparatus 1 is adapted for modified atmosphere packaging, where a plastic film, such as film sheet 18 described below, is applied to the top rim 4c of a support or tray 4 after a modified gas atmosphere has been created inside the support 4, and/or for vacuum skin packaging of the product P, where a thin film of plastic material, such as film sheet 18 described below, is draped down on the product and intimately adheres to a top rim and to the inner surface of the support as well as to the product surface thus leaving a minimum, if any, amount of air within the packaging. The apparatus 1 may also be used in case a film sheet applied to a tray or support and neither vacuum nor modified atmosphere is created.

The apparatus 1 comprises a frame 2, a transport assembly 3 for displacing the support or tray 4, a film supplying assembly 5, a film cutting assembly 6, a transfer device 7 and a packaging assembly 8.

The tray 4 shown in the enclosed figures presents a base wall 4a, a side wall 4b emerging from the base wall and delimiting a space where a product P can be housed, and a top rim 4c radially protruding from the side wall 4b: in the example shown the top rim 4c has a horizontal flat portion defining an optimal sealing surface for tightly fixing a plastic film.

The frame 2 defines a base body of the apparatus 1 and serves to carry and support various parts of the apparatus 1 as herein described.

The transport assembly 3 comprises a displacement plane 20 (which may be a physical plane where the trays or support are lying and slide or an ideal plane along which the trays are guided e.g. by means of railways or guides). The plane 20 is defined on a top area of the frame and a conveyor 46 is arranged in correspondence of the sliding plane 20. In the example shown, the transport assembly 3 is carried by, e.g. fixed to, the frame 2 so that the sliding plane 20 is substantially horizontal and the conveyor 46 moves the trays or supports 4 according to the horizontal direction indicated by the arrow A1 shown in FIG. 1. The transport assembly 3 arranged on the frame 2 is configured for displacing the support or tray 4 along a predefined path from a loading station, where supports or trays 4 which may already be filled with the respective product(s) P are positioned, to the packaging assembly 8 where a film sheet 18 is tightly fixed to each support or tray 4, as it will be explained here below in detail. The conveyor 46 displaces the trays, e.g. a prefixed number of tray per time, inside the packaging chamber in proper position for receiving the cut film sheets. For instance, a control unit 100 (which will be further described herein after) may control the conveyor 46 to displace a prefixed number of trays or supports 4 per time from a region outside the packaging assembly, to a region inside the packaging assembly where the tray or trays are in vertical alignment to the film sheets. The conveyor may for instance include a first transfer device 46a (such as the belt shown in FIG. 1) configured for bringing the trays in close proximity to the packaging assembly and a second transfer device 46b adapted to pick one or more of said trays and bring them into the packaging station. The second transfer device may for instance include arms acting on the sides of the trays or supports such as to pick the supports from the first transfer device, bring them into the packaging station and then return to the first transfer devise to pick a new set of trays or supports 4. Alternatively, the conveyor 46 may include pushers (e.g. in the form of bars extending transverse to said direction A1) acting on the trays and pushing the trays inside the packaging assembly. The pushers may be moved by chains or belts and may be moved into the packaging assembly to properly position a number of trays, and then be retracted from the packaging assembly, once the trays have reached their proper position inside this latter. According to a further alternative, the conveyor 46 may include housings (e.g. in the form of plates provided with cavities for receiving a number of trays) which are moved along said direction A1 and which are moving inside the packaging station together with the supports or trays 4: according to this last alternative the housings are properly shaped in order to be hosted inside the packaging station during the application of the film 10a to the tray or support 4.

Note that the products P may be positioned on the support or tray 4 either upstream the loading station or in any location between the loading station and the packaging assembly 8. The transport assembly 3 further comprises a motor 9, e.g. a stepping motor unit, for operating the conveyor belt 46 with step-by-step movement.

The film supply assembly 5 may comprise a film roll 10 which supplies a continuous film 10a. The film supplying assembly 5 may further comprise an arm 11 (represented in dashed lines in FIG. 1) fixed to the frame 2 and suitable for supporting the roll 10. Further, the film supplying assembly 5 may comprise film punching devices (not show as per se known) configured essentially to provide the correct profile to the film edges to match, when transversally cut in the cutting assembly 6, the shape of the tray 4 mouth with rounded corners. The punching devices may also help to keep an unrolled portion of film pulled from the film roll 10 aligned according to a prefixed direction. The film supplying assembly 5 also comprises pinch rollers 12 and/or other means for pulling the film from the roll 10 and properly position it in correspondence of the film cutting assembly 6 (for instance said means may comprise pincers acting on the side of the film and/or pincers acting on the front edge of the film and configured to pull the film).

The film 10a rolled on the film roll 10 may be made as disclosed above depending upon the specific need.

The film cutting assembly 6 comprises a cutting device 13 with a blade 14 and a blade piston 15. This piston 15 may be replaced by any other kind of electric, pneumatic or hydraulic linear actuator. The blade piston 15 is preferably fixed to the frame 2 and is connected to the cutting device 13 so as to push and pull it in a direction transverse to the unrolled portion of the film 10a, as indicated by the double arrow A2 shown in FIG. 1.

The apparatus packaging assembly 8 is configured for tightly fixing the film sheets 18 to said supports 4; the packaging assembly 8 includes a lower tool 22 and an upper tool 21. The lower tool 22 has a number of inner walls 23 defining a prefixed number of seats 23b. In a embodiment the lower tool 22 is provided with multiple seats 23b each for hosting a corresponding support 4; in this case the upper tool 21 is provided with a corresponding plurality of holding plates 36 each for holding a respective film sheet 18.

Each of seats 23b is configured for receiving one support 4. For instance in the example of FIGS. 2-8 the seat 23b is peripherally delimited by inner wall 23 and the support or tray 4 is received within the seat 23b such that the top rim 4c may rest above the end surface 23a of the inner wall 23. The upper tool 21 faces the lower tool 22 and is configured for holding one or more of said film sheets 18: in the example shown in FIGS. 2-8 the upper tool 21 is configured for holding one cut film sheet 18. As shown in FIGS. 2-8 the upper and lower tools 21, 22 cooperate to define a packaging chamber 24: in a first operating condition of the packaging assembly 8—shown in FIGS. 2 and 3,8—the upper and lower tools 21 and 22 are space apart and the packaging chamber 24 is open thereby allowing one or more of said film sheets 18 to move from the cutting assembly 6 to the inside of the packaging chamber 24, as it will be further detailed herein below. In a second operating condition of the packaging assembly 8—shown in FIGS. 4-7 the packaging chamber 24 is preferably hermetically closed with respect to an atmosphere outside the apparatus 1.

Note that by hermetically closed it is meant that the packaging chamber 24 cannot freely communicate with the atmosphere outside the same chamber as gas may be supplied or withdrawn from the chamber only via supply or discharge channels under the control of the apparatus 1.

The above mentioned transfer device 7 is configured for positioning the cut film sheets 18 inside the packaging chamber 24 and above the respective support 4. The transfer device 7 includes a backing structure 16 having a flat holding surface 17 adapted for receiving the at least one or more film sheets 18 cut by blade 14: FIG. 1 shows that the blade 14 has cut the continuous film 10a and one film sheet 18 is positioned in correspondence of the flat holding surface 17. The backing structure 16 may hold the cut film sheet 18 using one or more of:

a vacuum system connected to one or more channels present in the backing structure and leading to apertures located one holding surface 17, mechanical holders, such as pincers, clamps or the like, adhesive systems, for instance comprising adhesive portions associated to the holding surface 17, heating systems, for instance comprising heatable portions (controlled by control unit 100) associated to the backing structure causing heating of the holding surface 16 and thus of the film sheet 18 in order to increase stickiness of the film sheet to the holding surface 17, electric systems, for instance the holding surface may be charged with a polarity different from that typical of the plastic sheet 18. In this case the control unit may be connected to a voltage generator and may control the electric charging of surface 17.

Figure 2:
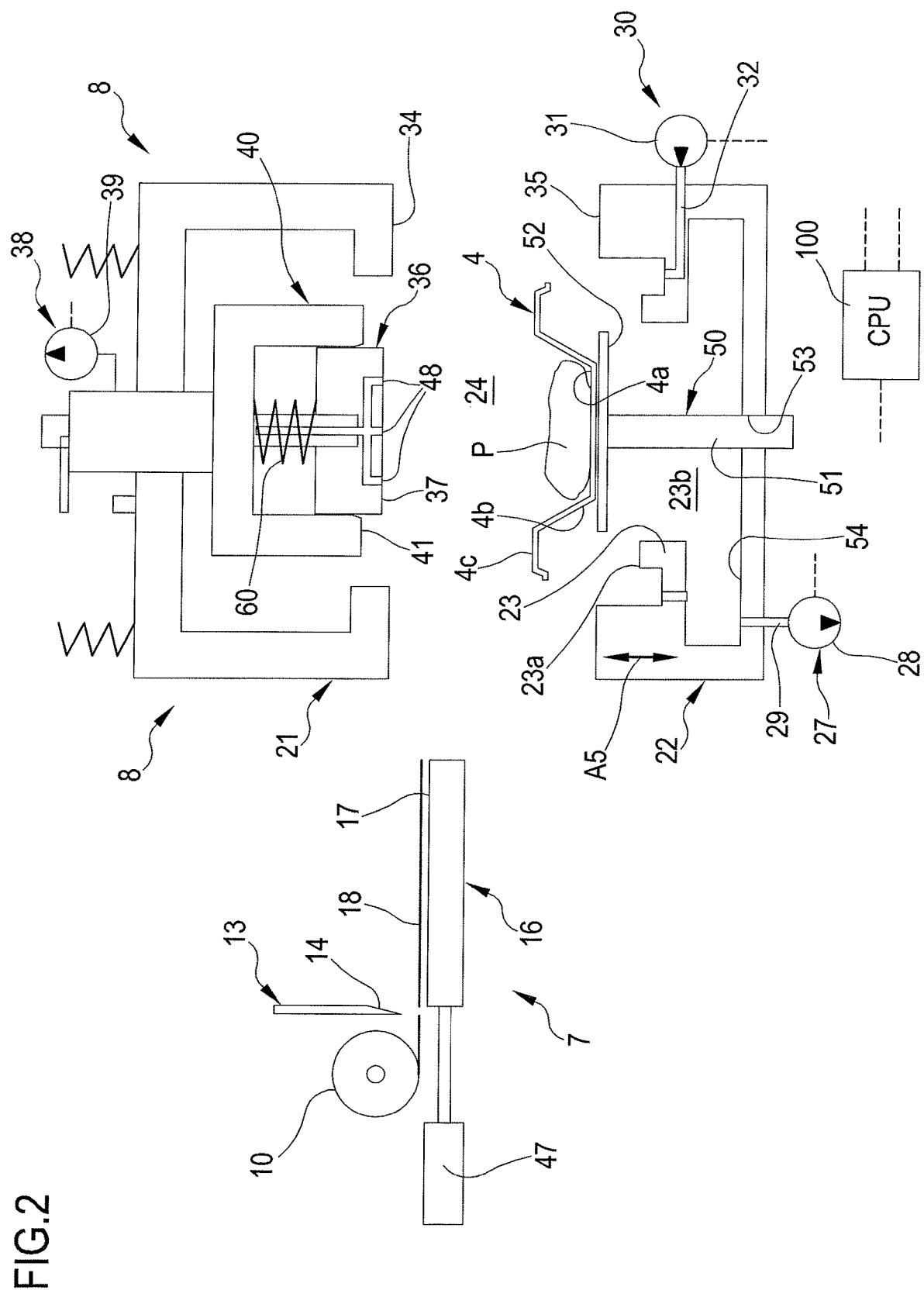
FIGS. 2-8 are schematic side views relating to a first embodiment of a packaging apparatus according to aspects of the invention. In these figures consecutive phases of a packaging process operated by the apparatus of the first embodiment are shown. The apparatus and process according to these figures are intended to form a modified atmosphere packaging.
Figure 3:
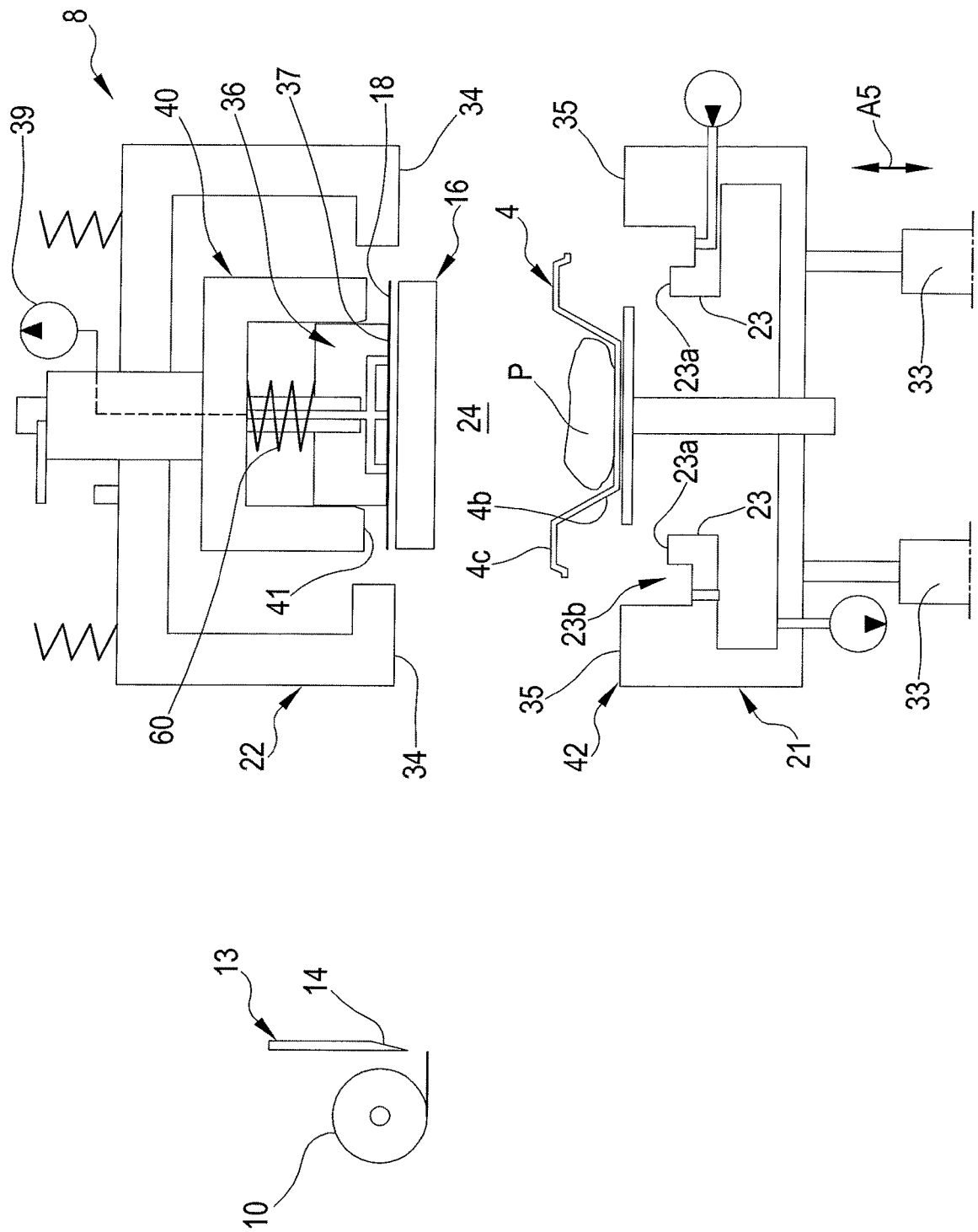

The transfer device 7 also includes a mechanism 19, e.g. carried by frame 2, active on the backing structure 16 and configured for relatively moving the backing structure 16 with respect to the packaging assembly 8 between a first position, shown in FIG. 2, where the baking structure 16 is positioned by the cutting device e.g. immediately downstream the blade 14 with respect to the movement imposed to film 10*a*, and at least a second position, where the backing structure 16 is positioned inside a packaging chamber 24. In the examples shown in the enclosed figures, the mechanism 19 includes a transfer actuator 47 active on the backing structure 16 and configured for pushing and pulling the backing structure 16 along a path suitable for achieving the displacement between said first and second positions: for example, the mechanism and transfer actuator may displace the backing structure along a direction parallel to said horizontal direction A1 as indicated by double arrow A3 in FIG. 1. The transfer actuator 47 stroke is such that the backing structure positions at least one film sheet 18 above said support 4 inside the chamber 24, just in front of a central portion of the upper tool 21, as shown in FIG. 3. Although the transfer actuator 47 shown e.g. in FIG. 1 is a piston, it may be replaced by any other kind of electric, pneumatic or hydraulic linear actuator.

To summarize, the control unit 100 is configured for activating the film cutting assembly 6 for cutting, outside the packaging chamber, the continuous film 10*a* into the cut film sheet(s) 10 and for then activating the transfer device 7 for positioning the cut film sheet(s) 18 inside the packaging chamber 24 and above the respective support 4: the film sheets will then be further processed as disclosed below. Advantageously, the control unit 100 may be further configured for synchronizing activation of the transfer device 7 with passage of the packaging assembly 8 from the first to the second operating condition, such as to optimize timing of the process. In any case the control unit 100 is configured for leaving the packaging assembly 8 in the first operating condition a time sufficient for the backing structure 16 of transfer device to position inside the packaging chamber 24 an above the respective support 4 the cut film sheet(s) 10 which have/has been cut outside the packaging chamber 24 by the cutting assembly. The time shall also be sufficient for the backing structure to exit from packaging chamber 24, which can then be closed again under the control of unit 100. The backing structure and the cutting assembly are then controlled by the control unit which is configured to command the backing structure to take again the position at the cutting assembly where the backing structure receives one or more newly cut film sheet(s). The backing structures serves both film sheet support during cutting at the cutting station and as support during transportation of the cut film sheets inside the packaging chamber. As an alternative, instead of moving the backing structure 16, the upper tool 21 may be mobile with respect to frame 2 and be configured to pick the cut film sheets 18 from the area immediately downstream the cutting device 13. In this case the transfer device 7 would include a mechanism 25, e.g. carried by frame 2, active on the packaging assembly 8 and configured for displacing the upper tool 21 between a first position, where the upper tool 21 is positioned in correspondence of the backing structure 16 and configured to pick up from the backing structure 16 the one or more cut film sheets 18, and at least a second position, where the upper tool 21 is aligned to the lower tool 22 and configured to position at least one film sheet 18 above said support 4. In order to achiever the above movement the mechanism may displace the upper tool 21 along any suitable path: for example in the attached FIG. 1 it is schematically shown that the mechanism 25 may include a transfer actuator 26 configured for pushing and pulling the upper tool 21 along a direction parallel to said horizontal direction A1 as indicated by double arrow A4 in FIG. 1. As an alternative the mechanism 29 may cause rotation of the upper tool around a pivoting axis; as a further alternative the mechanism 29 may cause both a pivoting movement and a translational displacement in order to move the upper tool from said respective first and second positions. The transfer actuator 26 may be in the form of a piston: it may be replaced by any other kind of electric, pneumatic or hydraulic linear actuator. In FIG. 1 the apparatus 1 includes both the mechanism 19 and the mechanism 25 described above.

The apparatus 1 also includes at least one control unit 100 which is connected to the transport assembly 3, to the film supplying assembly 5, to the film cutting assembly 6, to the transfer device 7 and to the packaging assembly 8. The control unit 100, which is schematically represented in FIG. 1 is configured for activating the transfer device 7 so as to animate motion of the backing structure 16 or of the upper tool 21, as the case may be, in the positions described above. The control unit 100 is also configured for synchronizing activation of the transfer device 7 with passage of the packaging assembly 8 from the first to the second operating condition so that the movement of the backing structure 16 is caused to take place when the packaging chamber 24 is open while the packaging chamber 24 is closed only once the backing structure 16 has transferred the cut film sheet 18 to the upper tool 21 and has left the packaging chamber 24. The control unit may also be configured for synchronizing the conveyor 46 such that movement of a prefixed number of trays or supports 4 from a region outside the packaging chamber 24 to a region inside the packaging chamber 24 is caused to take place when the packaging chamber 24 is open while the packaging chamber 24 is closed only once said prefixed number of trays or supports 4 is in proper position relative to the upper tool 21.

The apparatus 1 may also comprise a vacuum arrangement 27 connected to the packaging chamber 24 and configured for removing gas from inside said packaging chamber; the vacuum arrangement comprises at least one vacuum pump 28 and at least one evacuation pipe 29 connecting the inside of said chamber 24 to the vacuum pump; the control unit 100 controls the vacuum pump 28 to withdraw gas from said packaging chamber 24 at least when the packaging assembly is in said second operating condition, i.e. with said packaging chamber hermetically closed.

The apparatus 1 may also or may alternatively include a controlled atmosphere arrangement 30 connected to the packaging chamber 24 and configured for injecting a gas stream into said packaging chamber; the controlled atmosphere arrangement comprises at least one injection device including an injection pump and/or one injection valve 31 acting on at least one injection pipe 32 connecting the inside of said chamber to the a source of gas (not shown) which may be located remotely from the apparatus 1; the control unit 100 may be configured to control opening and closing of the injection valve (or activation of the injection pump) 31 to inject said stream of gas at least when the packaging assembly 8 is in said second operating condition, i.e. with said packaging chamber 24 hermetically closed.

The control unit 100 may also be configured to control the composition of the modified atmosphere generated inside the chamber 24. For instance the control unit 100 may regulate the composition of the gas stream injected into the packaging chamber. The gas mixtures injected into the packaging chamber to generate a modified atmosphere may vary depending upon the nature of product P. In general modified atmosphere mixtures include a volumetric quantity of one or more of $N_2$, $O_2$ and $CO_2$ which is different from the quantity of these same gases as present in the atmosphere at 20° C. and sea level (1 atmosphere pressure). If product P is a produce such as meat, poultry, fish, cheese, bakery or pasta the following gas mixtures may be used (quantities are expressed in volume percentages at 20° C., 1 atm of pressure):

| | |
|---|---|
| Red meats, Poultry skinless: | $O_2$ = 70%, $CO_2$ = 30% |
| Poultry with skin on, Cheese, Pasta, Bakery products: | $CO_2$ = 50%, $N_2$ = 50% |
| Fish | $CO_2$ = 70%, $N_2$ = 30% or |
| | $CO_2$ = 40%, $N_2$ = 30%, $O_2$% = 30 |
| Processed meat | $CO_2$ = 30%, $N_2$ = 70% |

According to one aspect the control unit 100 may be configured to control said injection pump or said injection valve 31 to start injecting said stream of gas either after a prefixed delay from activation of said vacuum pump 28 or after a prefixed level of vacuum has been reached inside said packaging chamber 24. In a further aspect the control unit 100 may cause the start of the injecting of said stream of gas for creating a modified atmosphere while said vacuum pump 28 is still active so as to shorten the time for creating the modified atmosphere. Moreover as it is preferable to avoid having very strong vacuum in the packaging chamber 24 and at the same time it is desirable to ensure a proper atmosphere inside the chamber it is advantageous stopping the vacuum pump after opening the gas injection. In this way pressure inside the chamber never goes below a desired value. During the overlap the gas injected is mixed with residual air and continuing to pull vacuum the mix air-modified atmosphere continues to be removed so that the amount of initial air is decreased.

According to a further aspect, it is noted that the control unit 100 is configured to control said injection pump 31 such that
gas flow is not injected at a too high speed which may damage the firm holding of the cut film by the upper tool. Control unit 100 may control gas injection at a gas pressure set below a limit to prevent film detachment from or film mis-positioning in correspondence of upper tool 21 (injection pressure is kept between 1.3 and 4.0 bar optionally or between 1.5 and 3.0 bars).

Note that in the examples shown the evacuation pipe 29 and the injection pipe 32 communicate with a lower portion of the packaging chamber which is separated from an upper portion of the packaging chamber due to the presence of said inner wall or walls 23 which define a sort of separation septum. In order to allow proper circulation of gas within the entire packaging chamber the upper and lower portions of packaging chamber 8 are fluidly connected by apertures or channels located in proximity or at the inner wall 23. These apertures or channels (see e.g. FIGS. 3-5) are positioned such as not to be occluded by the tray walls when the tray is positioned in the seats 23b.

Although the apparatus 1 may have one or both the vacuum arrangement 27 and the controlled atmosphere arrangement 30, it is to be understood that the control unit 100 of the apparatus 1 may also be configured to tightly engage the film sheets 18 to the trays without activating the vacuum arrangement or the controlled atmosphere arrangement and thus leaving the normal environment atmosphere within the tray. This may be for instance the case for non perishable products. In a more simple version the apparatus 1 may be designed without vacuum arrangement and without modified atmosphere arrangement.

Entering now into a more detailed description of the packaging assembly 8, it should be noted that this latter further comprises a main actuator 33 active on at least one of said upper and lower tool 21, 22: in the example of FIGS. 2-8, the first actuator 33 is carried by frame 2 and acts onto the lower tool 22 under the control of control unit 100; in practice the main actuator 33 may include a piston (the piston may be replaced by any other kind of electric, pneumatic or hydraulic linear actuator) configured for lifting and lowering the lower tool 22 along a direction transverse to said horizontal direction A1: in the example of FIGS. 1-8 the lower tool can be vertically lifted and lowered by main actuator 33 as indicated by the double arrow A5 shown in FIG. 1. The control unit 100 is configured for acting on the main actuator 33 and causing movement of lower tool 22, along the prefixed main direction indicated by arrow A5, between said first operating condition (FIGS. 2 and 3), where the upper tool 21 is spaced apart from the lower tool 22 and said packaging chamber 24 is open to receive one or more of said film sheets 18, and said second operating condition (FIG. 4), where a closure surface 34 of the upper tool 21 tightly abuts against a closure surface 35 of the lower tool 22 to hermetically close said packaging chamber 24 with respect to an atmosphere outside the apparatus; at said closure surfaces 34 and 35 a gasket or other element for facilitating a gas tight closure may be positioned. As above mentioned, the control unit synchronizes opening and closure of the packaging chamber with movement of the backing structure 16.

Once the chamber 24 has been closed, and after operation of the vacuum and/or controlled atmosphere arrangement, the control unit is configured to act on main actuator 33 to impose a further vertical movement to the lower tool and thus also to the upper tool as this latter abuts now against the lower tool (FIG. 6) such that the film sheet 18 is brought into contact with the rim 4c of tray 4. Note that elastic elements 55 may be interposed between the upper tool and the frame (such as one or more compression springs and/or one or more pneumatic actuators) to elastically push the upper tool against the lower tool.

Also note that at each seat 23b operates at least one inner element 50, which in the apparatus of FIGS. 1-8 includes a stem 51 and a terminal plate 52, configured for supporting at least the base 4a the tray or support 4. The inner element is movable relative to the lower tool 22 at least along the main direction of double arrow A5 direction: in the embodiment shown (see e.g. FIG. 9) the stem 51 may slide through an opening 53 on the bottom 54 of the lower tool 22 in order to allow relative movement between said inner element 50 and lower tool 22. Note that the inner element may be controlled by a respective actuator (not shown) or it may be directly carried by frame 2. In the examples shown case where the lower tool is mobile up and down as above described, the inner element 50 may remain vertically fixed at least until the terminal plate reaches bottom 54 of the lower tool (see FIGS. 4-7).

Going in further detail the upper tool 21 has at least one holding plate 36 having a respective active surface 37 configured for receiving the one or more film sheets 18 and means 38 for holding the one or more film sheets 18 in correspondence of said active surface 37. The means 38 for holding may comprise a vacuum source 39, e.g. in the form of a pump, controlled by the control unit 100 and connected to a plurality of suction holes 48 present in correspondence of the active surface 37: the control unit 100 may be configured for activating the vacuum source 39 and causing the film holding plate 36 to receive and hold said one or more film sheets 18 in correspondence of the active surface 37. In particular, the control unit 100 may be configured for coordinating activation of vacuum source 39 with proper positioning of the cut film sheet 18 by the backing plate 16: for instance the control unit 100 may activate the vacuum source 39 and cause the film holding plate 36 to receive and hold said one or more film sheets 18 in correspondence of the active surface 37, when the backing structure 16 carrying the cut film 18 is properly positioned within the packaging chamber underneath the holding plate 36. Note that in addition or in alternative to vacuum source 39 the means for holding 38 may include one or more of the following:

- mechanical holders, such as pincers, clamps or the like,
- adhesive systems, for instance comprising adhesive portions associated to the active surface 37,
- heating systems, for instance comprising heatable portions—controlled by control unit 100—associated to the holding plate for causing heating of the active surface 37 and thus of the film sheet 18 in order to increase stickiness of the film sheet to the active surface 37,
- electric systems, for instance the active surface 37 may be charged with a polarity different from that typical of the plastic sheet 18. In this case the control unit may be connected to a voltage generator and may control the electric charging of surface 37.

As it will be further disclosed herein below when describing the operation of the apparatus 1, the control unit may be configured to create a vacuum in the packaging chamber 24 (by controlling the vacuum pump 28 to withdraw gas from said packaging chamber 24) until a pressure comprised between 100 and 300 mbar, optionally between 150 and 250 mbar, is reached. This pressure level is sufficiently low but not too low so that detachment of the film sheet from the holding plate 36 is avoided as the control unit also creates a pressure level in correspondence of the suction holes 48, by acting on vacuum source 39, below the pressure level in the packaging chamber.

Figure 4:
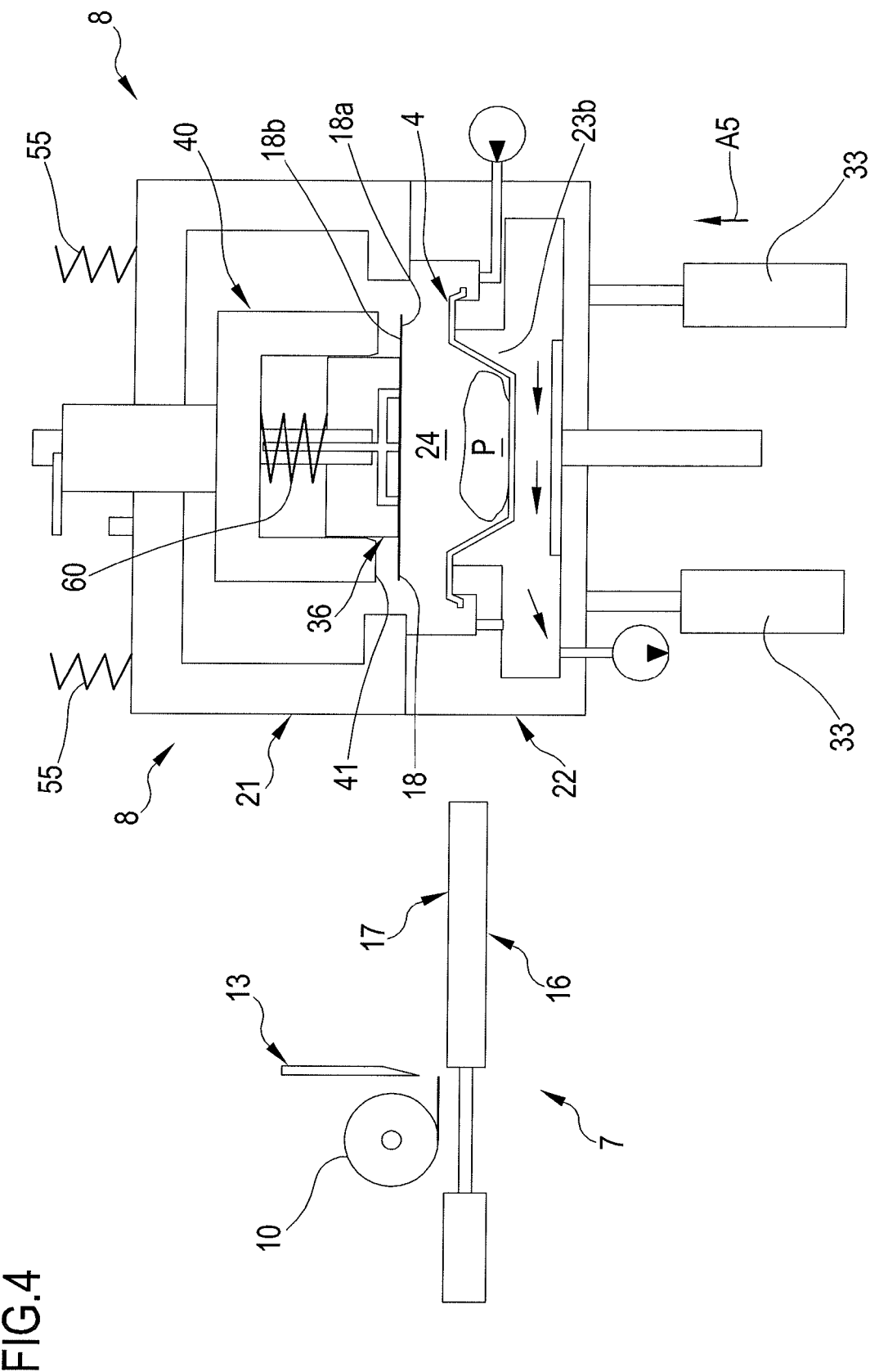
Figure 5:
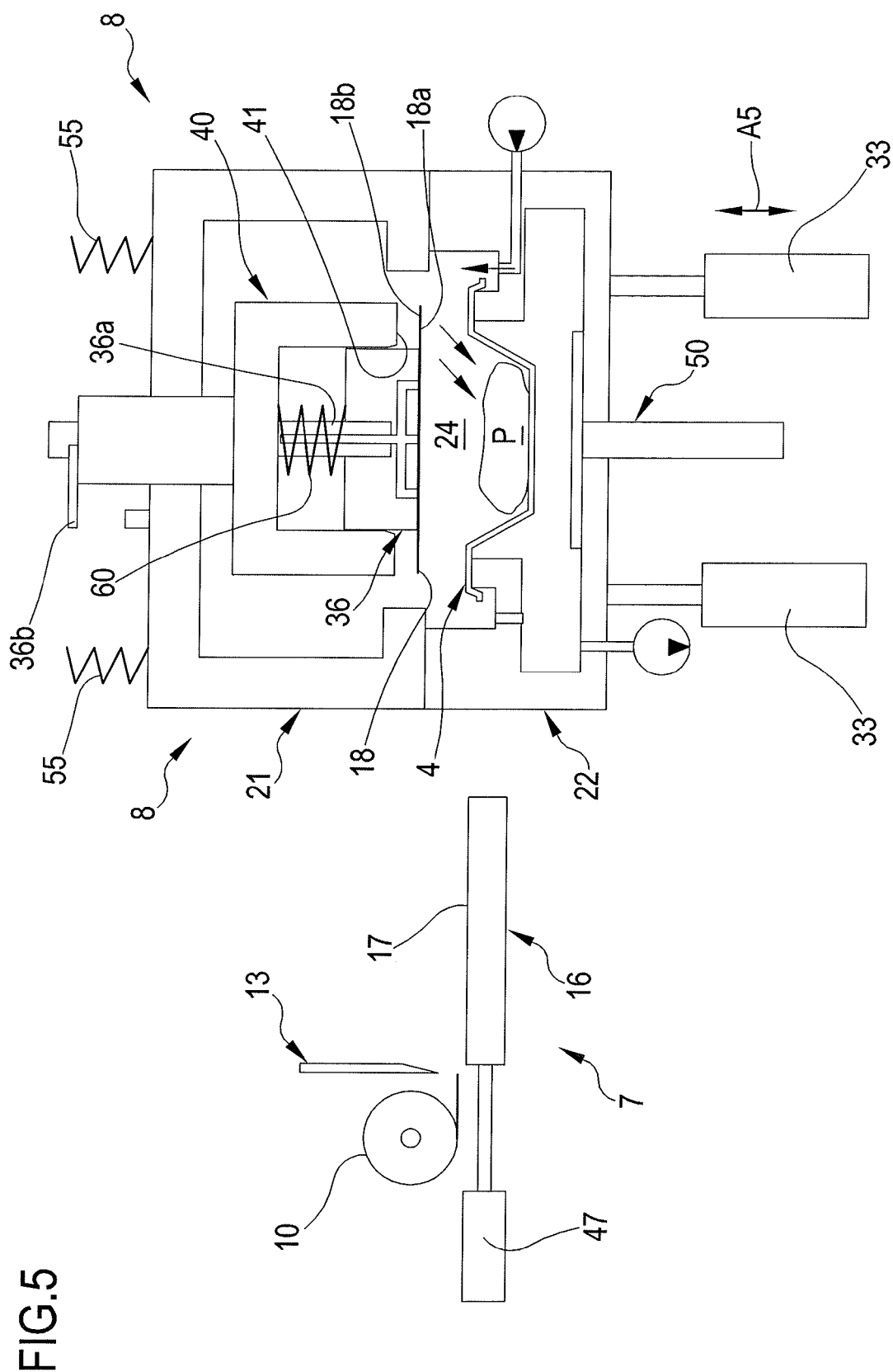
Figure 6:
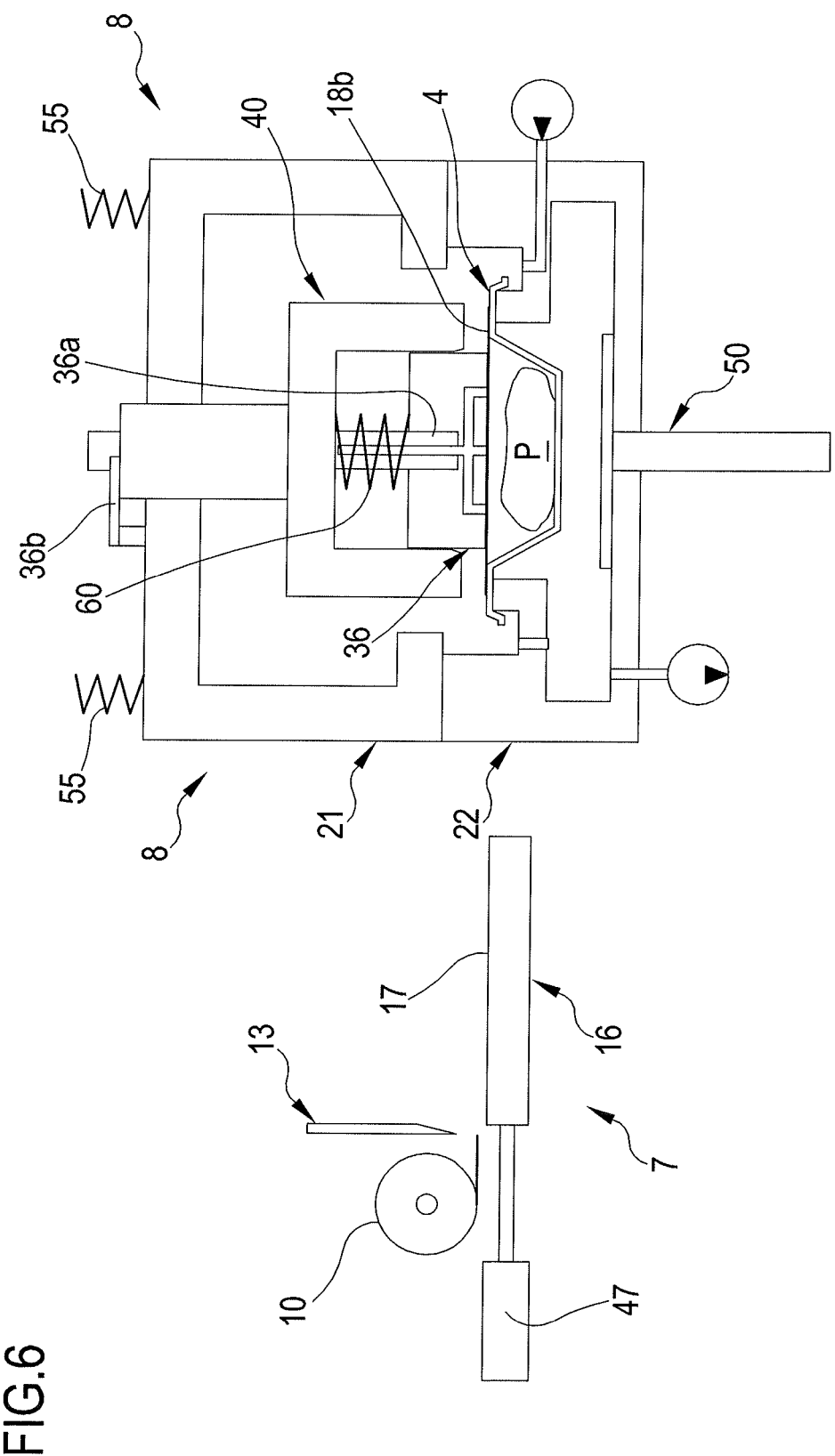

As shown in FIGS. 2-8 the packaging assembly 8 has a heating structure 40 peripherally associated to the film holding plate 36 and having a respective heating surface 41 which extends radially outside with respect to the active surface 37 of the holding plate 36. In practice the holding plate 36 is sized to cover only a central portion 18*a* of the cut film sheet 18 while the heating surface 41 of the heating structure 40 is designed to heat a peripheral portion 18*b* of the cut film sheet 18 surrounding said central portion. The packaging assembly 8 and particularly the heating structure 40 is positioned and configured such that at least when the packaging assembly 8 is in said second operating condition, the heating surface 41 of the heating structure 40 faces the end surface 23*a* of said inner wall 23 delimiting one of said seats 23*b* in the lower tool 22. Note that in the example of FIGS. 2-8 the heating structure 40 and film holding plate 36 are initially positioned such that heating surface 41 is retracted with respect to active surface 37 (FIGS. 2-6); on the other hand, also the heating structure 40 and the holding plate 36 are relatively movable the one with respect to the other along said main (vertical) direction represented by double arrow A5. More in detail the holding plate 36 is terminally carried by a shaft 36*a* slidably coupled relative to the heating structure 40 and having an abutting portion 36*b* designed to cooperate with the upper tool and with the heating structure as it will be here below explained. An elastic element 60 (which may be e.g. a spring or a pneumatic actuator) may be interposed between the holding plate and the heating structure: the elastic element 60 allows the positioning of the holding plate 36 as shown in FIGS. 4-6 since the elastic element 60 tends to push the holding plate downwards (the downward stroke of the holding plate 36 relative to the heating structure 40 is limited by abutting portion 36*a* interfering with the heating structure 40). The control unit 100 is connected to the heating structure 40 and configured for controlling heating of the heating structure 40 such that the heating surface 41 is brought at least to a first temperature (selected based on the materials used for the film sheet 18 and the tray 7 to be adequate for sealing at least the peripheral portion of the cut film sheet to the tray rim).

Note that according to a variant, heating means may be integrated in the film holding plate 36 which may be configured to heat the active surface 37 such a way to bring it at least to a second temperature. The heating means can be connected with the control unit 100 and the control unit be configured for controlling the heating means such that the active surface 37 of the film holding plate 36 is brought at least to said second temperature. Depending upon the circumstances the first and second temperatures may be equal or different. Advantageously, the control unit 100 is configured for independently controlling the heating means and the heating structure 40 and to independently set the first and second temperatures. In this way, the control unit 100 may allow an operator to properly set the temperature of the heated parts of the upper tool 21 (active surface 37 and heating surface 41): the management of these temperatures by the control unit 100 allows improve the bond between film sheet 18 and support or tray 7. In particular: the control unit 100 may be configured to control the first and second temperatures as follows:

- in case of shrinkable films 10 being used, then the control unit may only cause heating of the heating surface 41, optionally only when this latter is pressed against the rim 4*c* of tray 4,
- in case of non heat shrinkable films 10 being used, then the control unit may cause heating of the entire film sheet with the first and second temperatures being e.g. equal,
- in case of skin packaging then the control unit may cause heating of the entire film sheet, e.g. with the second temperature being higher than the first temperature.

Figure 21:
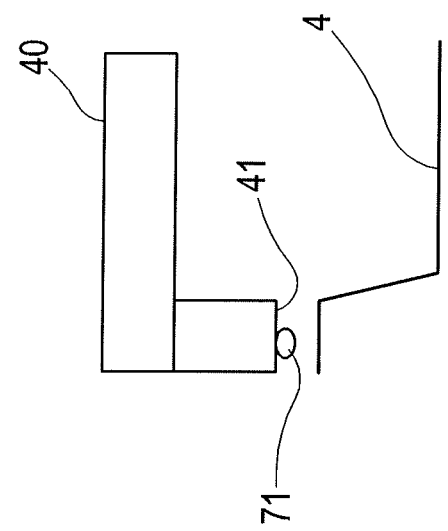
FIGS. 20-22 show a particular relating to heating means associated to the holding plate of the apparatus according to aspects of the invention.
Figure 20:
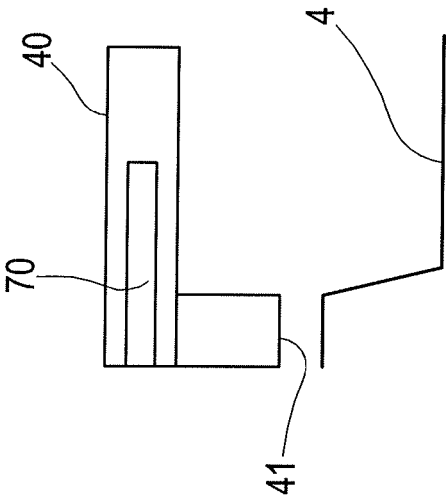
Figure 22:
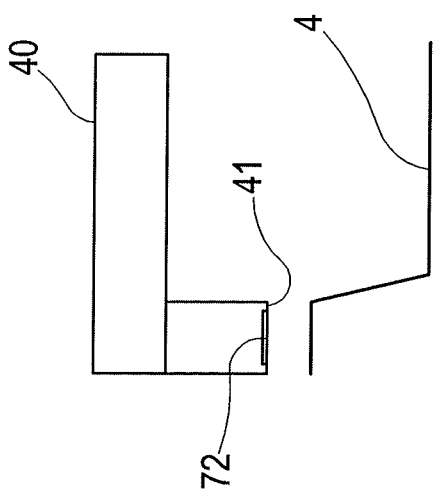

Under a constructional point of view, as shown in FIGS. 20-22, the heating structure 40 may include a metallic body embedding at least one resistive and/or inductive element 70 connected to a power supply; in this case the control unit 100 is configured for controlling the power supply to continuously supply current to the resistive or inductive element 70 such as to keep the temperature of the heating surface 41 within a prefixed range around said first temperature.

In addition to or independently of the latter, the heating structure 40 may include at least one metallic wire 71 directly carried by the heating surface 41 of the heating structure 40; the metallic wire is connected to a power supply and to the control unit 100 which is configured for controlling the power supply to supply current to the metallic wire during discrete time intervals. In practice the thermal inertia of wire 71 is so small that the control unit may be programmed cause the power supply to provide current for short time intervals, e.g. when sealing of the film sheet 18 to the support needs to take place. During the rest of the cycle described above, the power supply does not feed current to wire 71 which is basically at ambient temperature. This is useful when dealing with shrinkable films.

Alternatively or in addition of the latters, the heating structure 40 may include a printed circuit 72 formed onto said heating surface 41 of the heating structure 40; the printed circuit is connected to a power supply and to the control unit 100 which is configured for controlling the power supply to supply current to the printed circuit for short time intervals, e.g. when sealing of the film sheet 18 to the support needs to take place. During the rest of the cycle described above, the power supply does not feed current to wire 71 which is basically at ambient temperature. This is useful when dealing with shrinkable films.

As to the heating means which may be associated to the holding plate 36, also the heating means may include at least one resistive and/or inductive element embedded in the body of the holding plate and connected to a power supply; in this case the control unit 100 is configured for controlling the power supply to supply current to the resistive or inductive element such as to keep the temperature of the active surface 37 of the holding plate 36 within a prefixed range around said second temperature.

In addition to or independently of the latter, the holding plate may include at least one metallic wire directly carried by the active surface 37 of the holding plate 36 and connected to a power supply and to the control unit 100 which is configured for controlling the power supply to supply current to the metallic wire during discrete time intervals. In practice the thermal inertia of wire is so small that the control unit may be programmed to cause the power supply to provide current for short time. During the rest of the cycle described above, the power supply does not feed current to wire which is basically at ambient temperature.

Alternatively or in addition of the latters, the heating means may include a printed circuit formed onto said active surface 37 of the holding plate 36 and connected to a power supply and to the control unit 100 which is configured for controlling the power supply to supply current to the printed circuit for short time intervals. During the rest of the cycle described above, the power supply does not feed current to printed which is basically at ambient temperature.

Note that, when the film is heat shrinkable, using the heating means may serve to tension the central portion of the film 18, after having fixed the film perimeter to the rim 4*c*.

Figure 7:
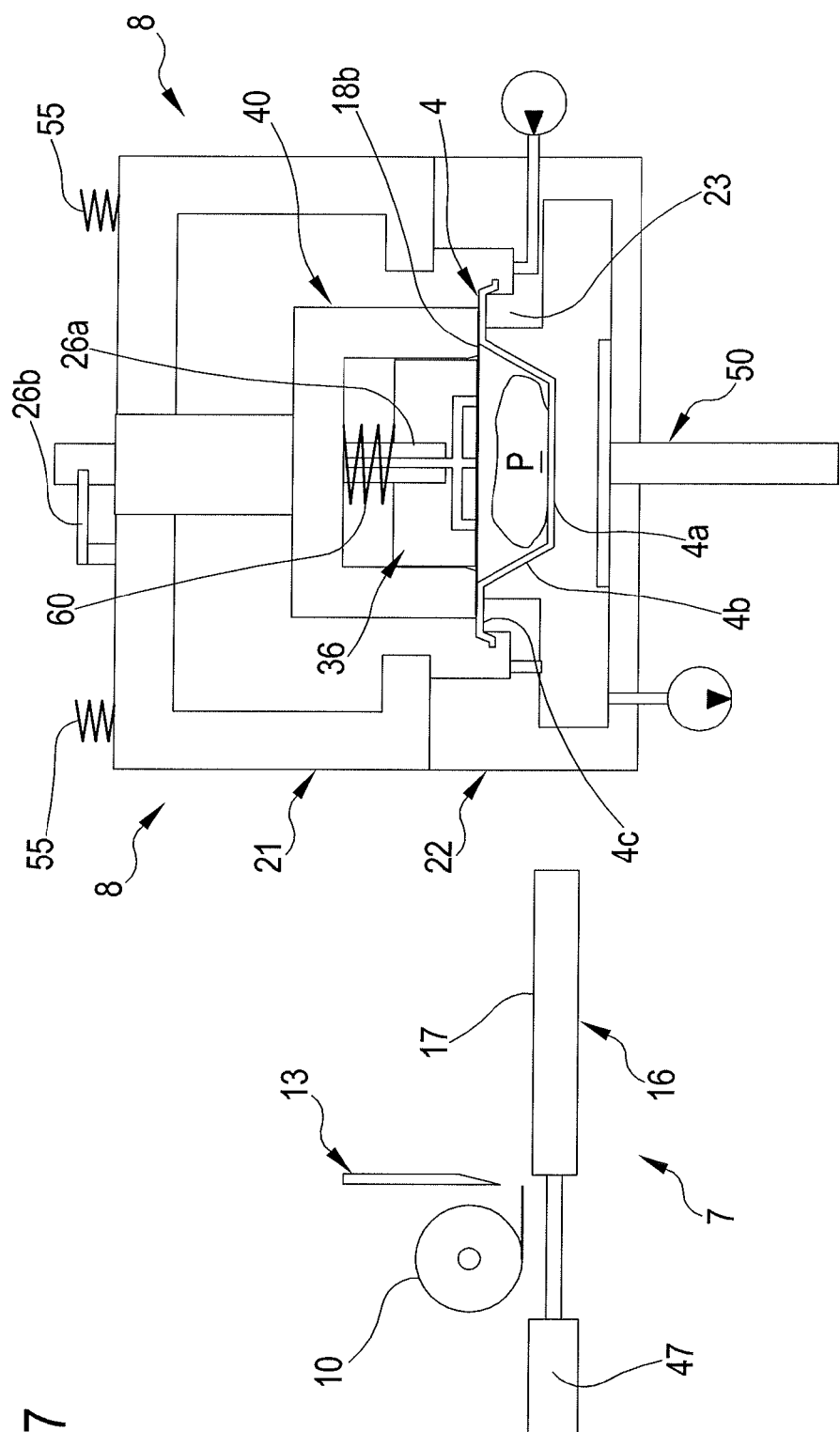
Figure 8:
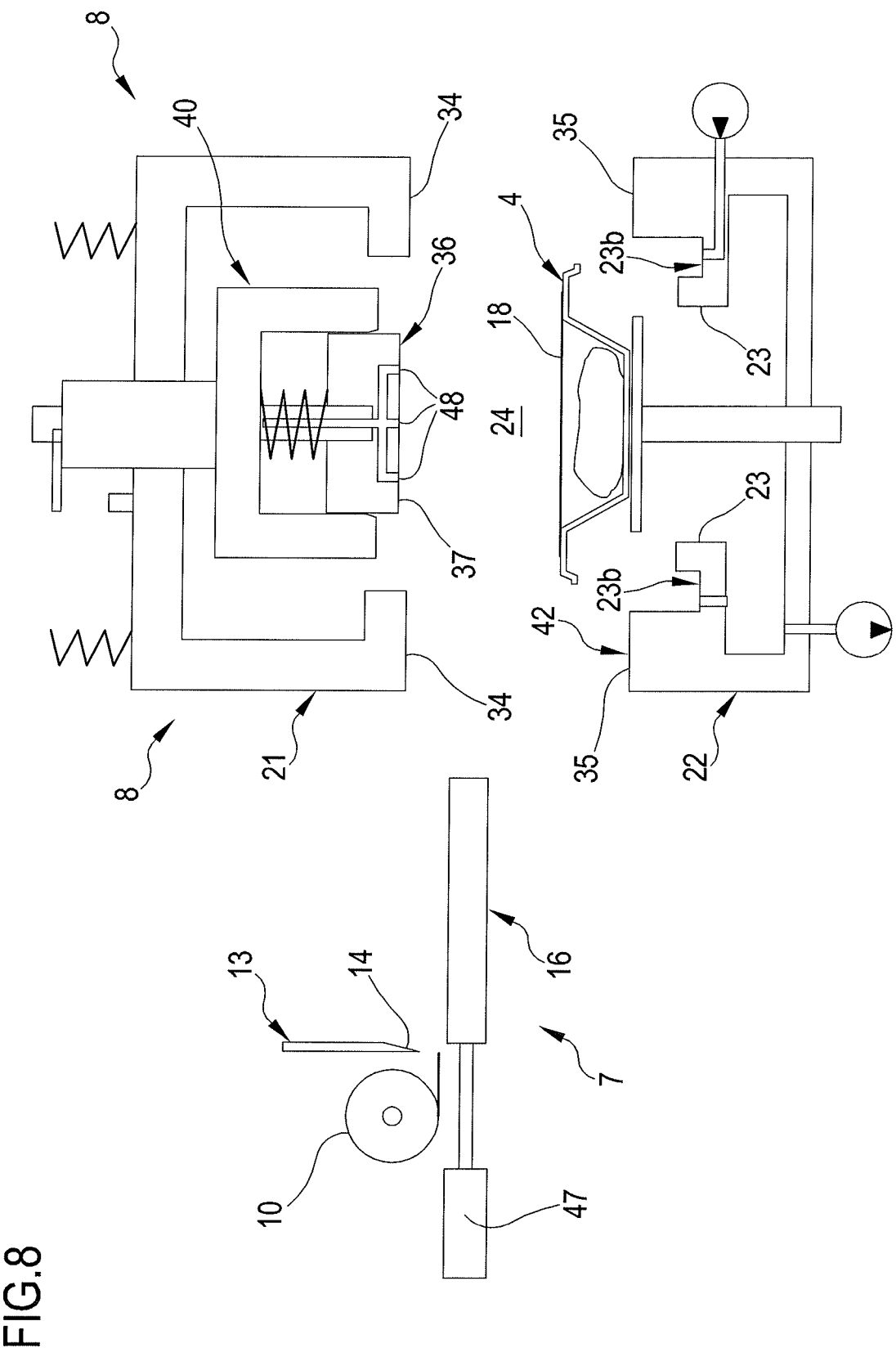

As a further variant an ultrasound generator may be used in place of or in addition to the heating structure and/or heating means; the ultrasound generator—if present—is configured to convey pressure energy (in the form of high frequency acoustic waves) in correspondence of the area occupied by the peripheral surface 18*b* of the film sheet 18 and by the rim 4*c* of support 4. The control unit may be programmed to control the ultrasound generator to cause emission of acoustic waves at least when the film sheet and the tray 4 are brought in mutual contact as shown in FIG. 7.

As another variant a generator of electromagnetic waves may be used in place of or in addition to the heating structure and/or heating means; the electromagnetic generator—if present—is configured to focus electromagnetic energy (in the form of high frequency electromagnetic waves) in correspondence of the area occupied by the peripheral surface 18*b* of the film sheet 18 and by the rim 4*c* of support 4. The control unit may be programmed to control the generator to cause emission of electromagnetic waves at least when the film sheet and the tray 4 are brought in mutual contact as shown in FIG. 7.

After the above structural description of the first embodiment of apparatus 1 here below operation of the first embodiment is disclosed. The operation takes place under control of control unit 100 and achieves a process of packaging a product in a tray. In this case the described process allows packaging under modified atmosphere. In any case the apparatus 1 is also capable of making a skin packaging of the product. Moreover, the apparatus 1 may be used for applying a lid to a tray and thus packaging in normal ambient atmosphere.

The trays are progressively moved to the packaging assembly 8 by transport assembly 3. At the same time the pinch rolls allow unrolling of film from roll 10 and the cutting assembly prepares the cut film sheets in number and size corresponding exactly to the trays to be closed. In practice the film sheets may be cut to a size copying that of the outer border of the rim 4*c* or they may be cut to a size radially smaller than the outer edge of rim 4*c* but sufficient to tightly close the mouth of the tray 4 and sealingly engage the rim 4*c* top surface.

In the apparatus 1 of FIGS. 2-8 the packaging assembly includes, as described above, a main actuator 33. The main actuator is in the example shown carried by frame 2 and acts on lower tool 22 under the control of control unit 100 for lifting and lowering the lower along main direction A5, which is basically a vertical direction. In practice after the transfer device 7 has moved the cut film sheet 18 into the packaging chamber 24 and the holding plate 36 has received the cut film sheet (see FIGS. 2 and 3), the control unit 100 controls the main actuator 33 to close the packaging chamber 24 (FIG. 4) by lifting the lower tool 22 such that inner wall 33 intercepts the support 4 which is lifted and separated from inner element 50. Also note that during the phases depicted in FIGS. 2-4 the abutting portion 36*b* interferes with a part integral with the heating structure so that the elastic bias exerted by element 60 may cause only a limited relative downward stroke of the holding plate relative to the heating structure. At this point, the packaging chamber is hermetically closed and film sheet is hold by holding plate 36 at a certain distance from the mouth of the tray or support 4: as shown in FIG. 4 the vacuum arrangement is activated and a certain degree of vacuum created. Then, immediately after or during vacuum creation, the controlled atmosphere arrangement is actuated (FIG. 5) and a controlled atmosphere created inside the packaging chamber. In certain variants only the vacuum arrangement or only the controlled atmosphere arrangement may be actuated. Note that in case one wants to operate the apparatus 1 to simply apply a lid to a tray 4, then the vacuum arrangement and the modified atmosphere arrangement may not be activated. A further vertical movement imposed onto the lower tool 22 by main actuator 33 wins the reaction of the elastic elements 55 (see FIG. 6) and brings the film sheet hold by holding plate in contact to the rim 4*c* of the support 4. In this position the upper tool 21 interferes with the abutment portion 36b: in the example of FIGS. 2-8 a protrusion 21a fixed to the upper tool touches the abutting portion 36b so that further vertical movement of the lower tool would cause vertical movement of the upper tool, of the abutting portion 36b and thus of the holding plate 36. The control unit 10 is then configured to operate the main actuator 33 to further lift the lower tool 22, winning the reaction of elastic element 60 and thus causing the holding plate 36 to lift and the active surface 37 and heating surface 41 to perfectly align (FIG. 7). At this point, when the heating surface 41 of the heating structure 40 contacts the peripheral portion 18b of the film sheet 18 positioned above a support 4, the control unit 100 causes heating of the heating structure 40 such that the heating surface 41 at least partially fuses plastic material of the peripheral portion of the film sheet 18 and/or of the rim 4c thereby sealing the cut film sheet to the tray. Then the control unit lowers the lower tool 22, and thus the packaging chamber 24 may be opened to allow the tray to proceed downstream the packaging assembly. The cycle may then be repeated.

Second Embodiment of the Apparatus 1

Figure 9:
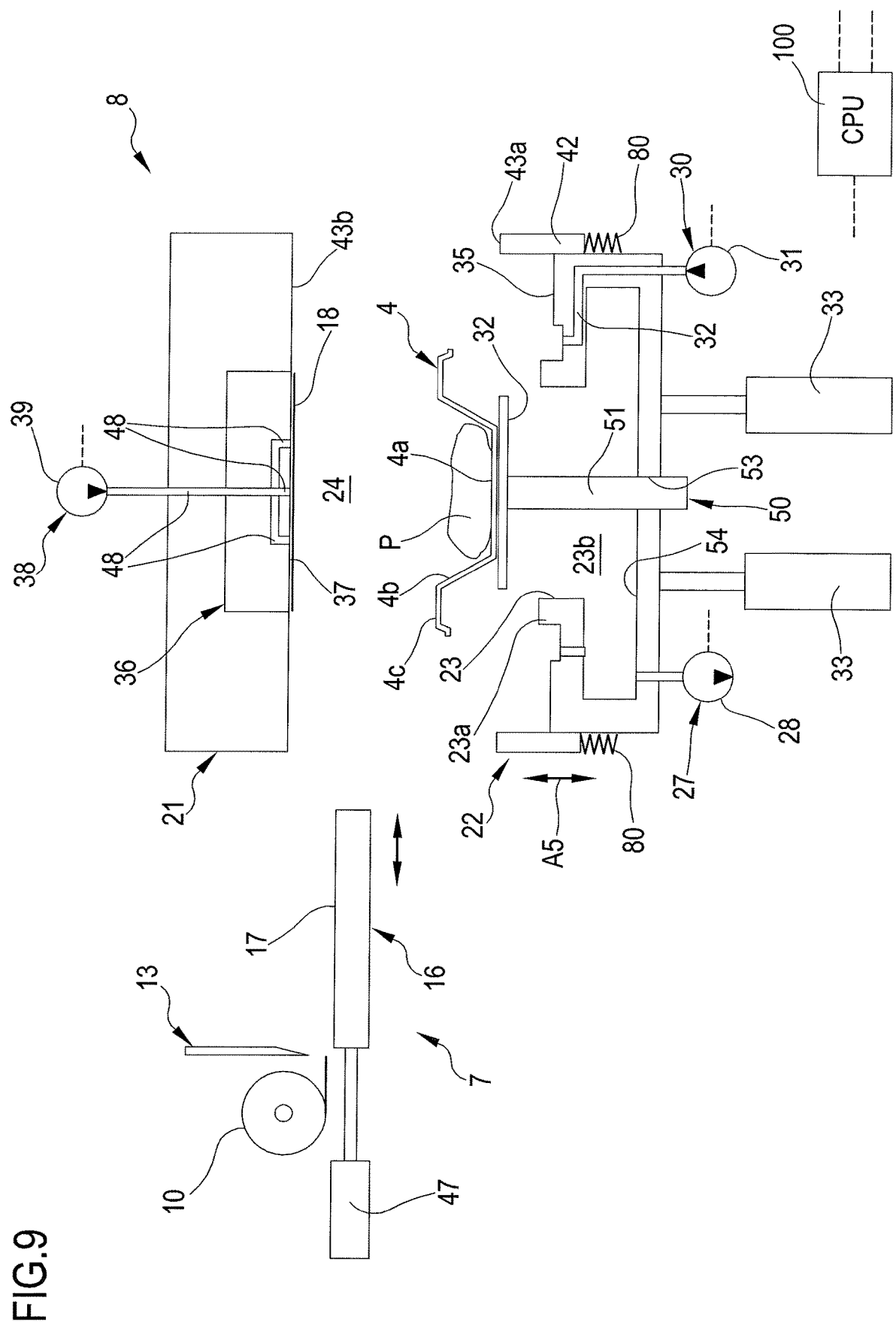
FIG. 9-11 are schematic side views relating to a second embodiment of a packaging apparatus according to aspects of the invention. In these figures consecutive phases of a packaging process operated by the apparatus of the second embodiment are shown. The apparatus and process according to these figures are intended to form a modified atmosphere packaging.
Figure 10:
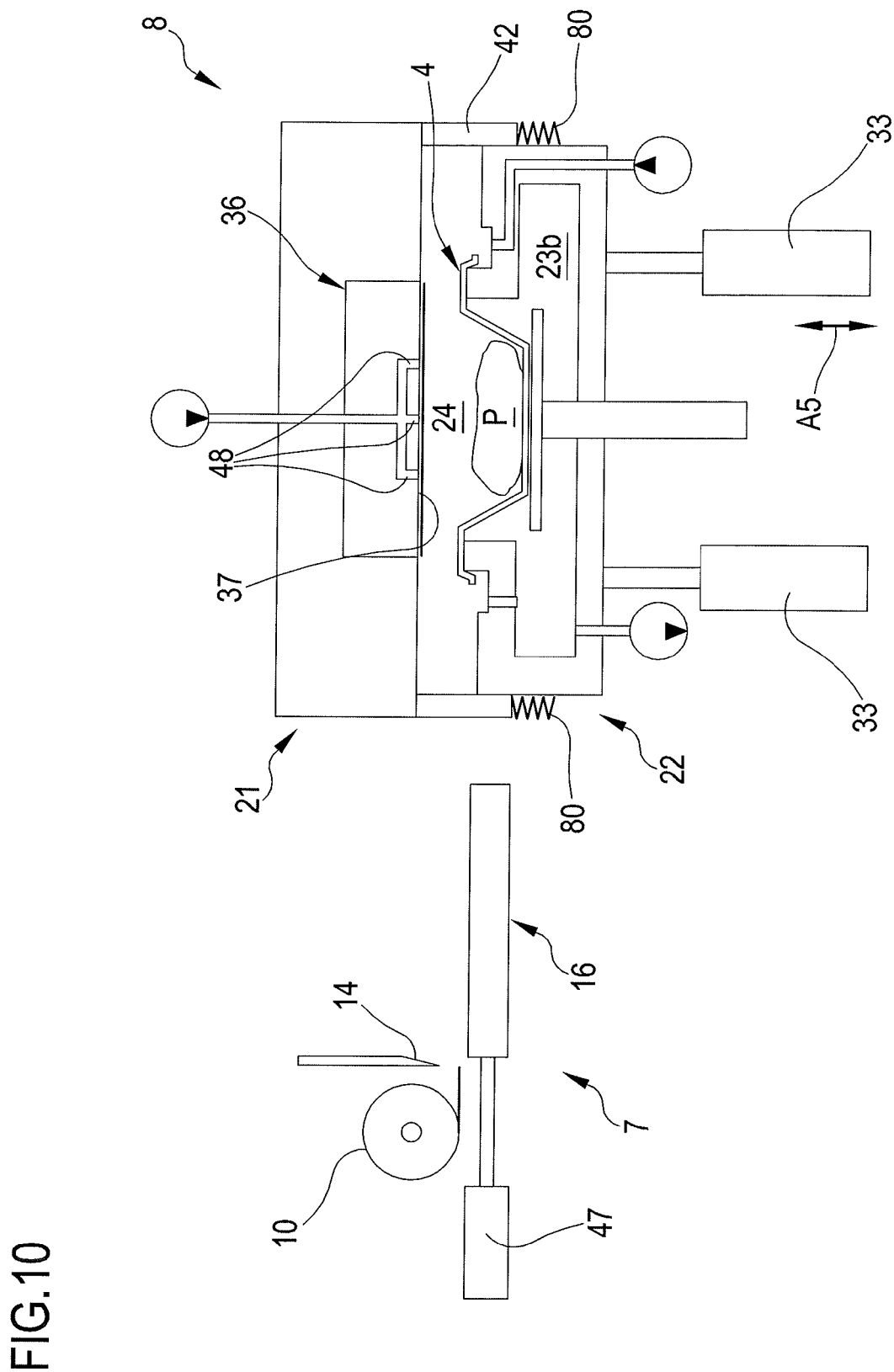
Figure 11:
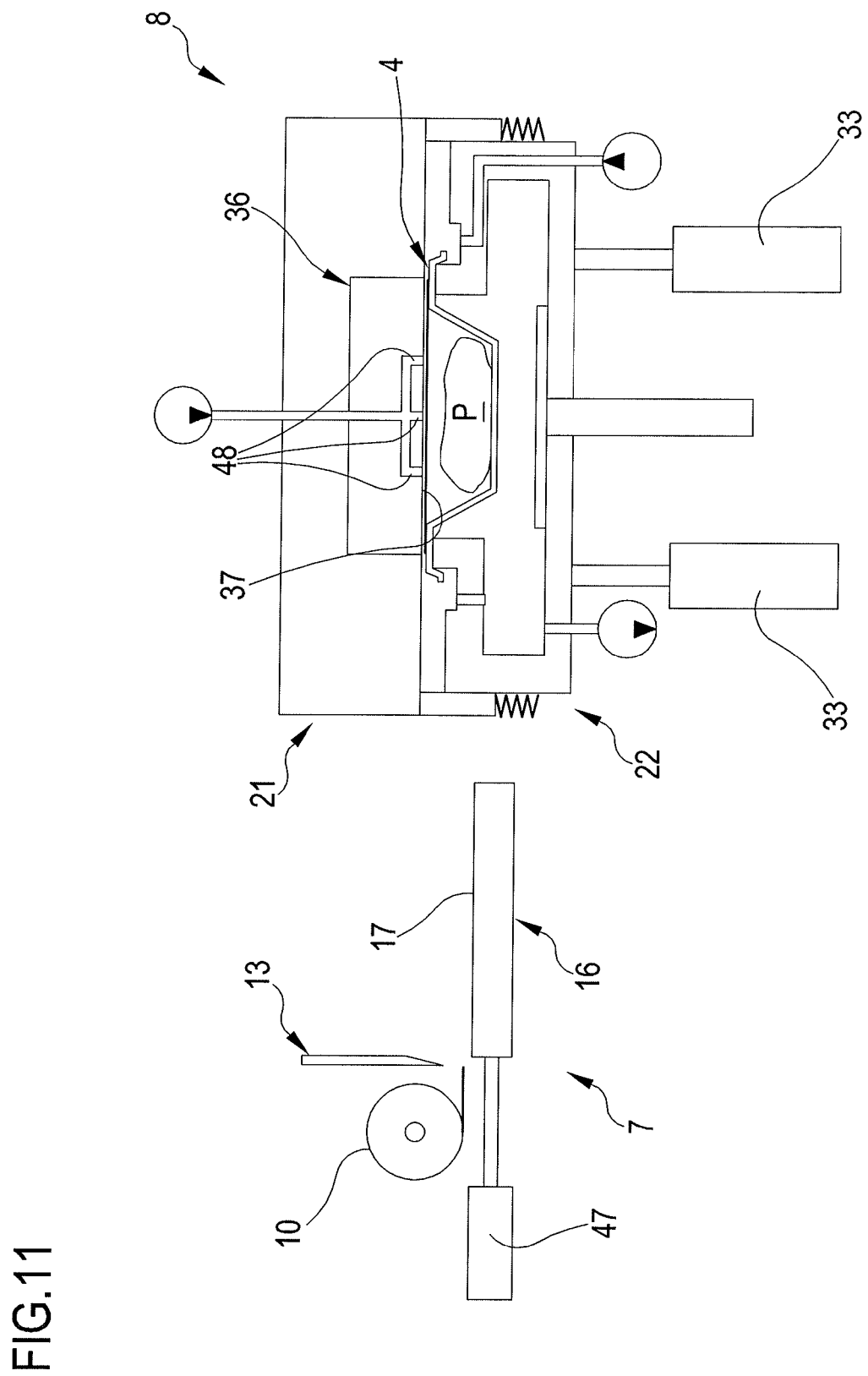
Figure 12:
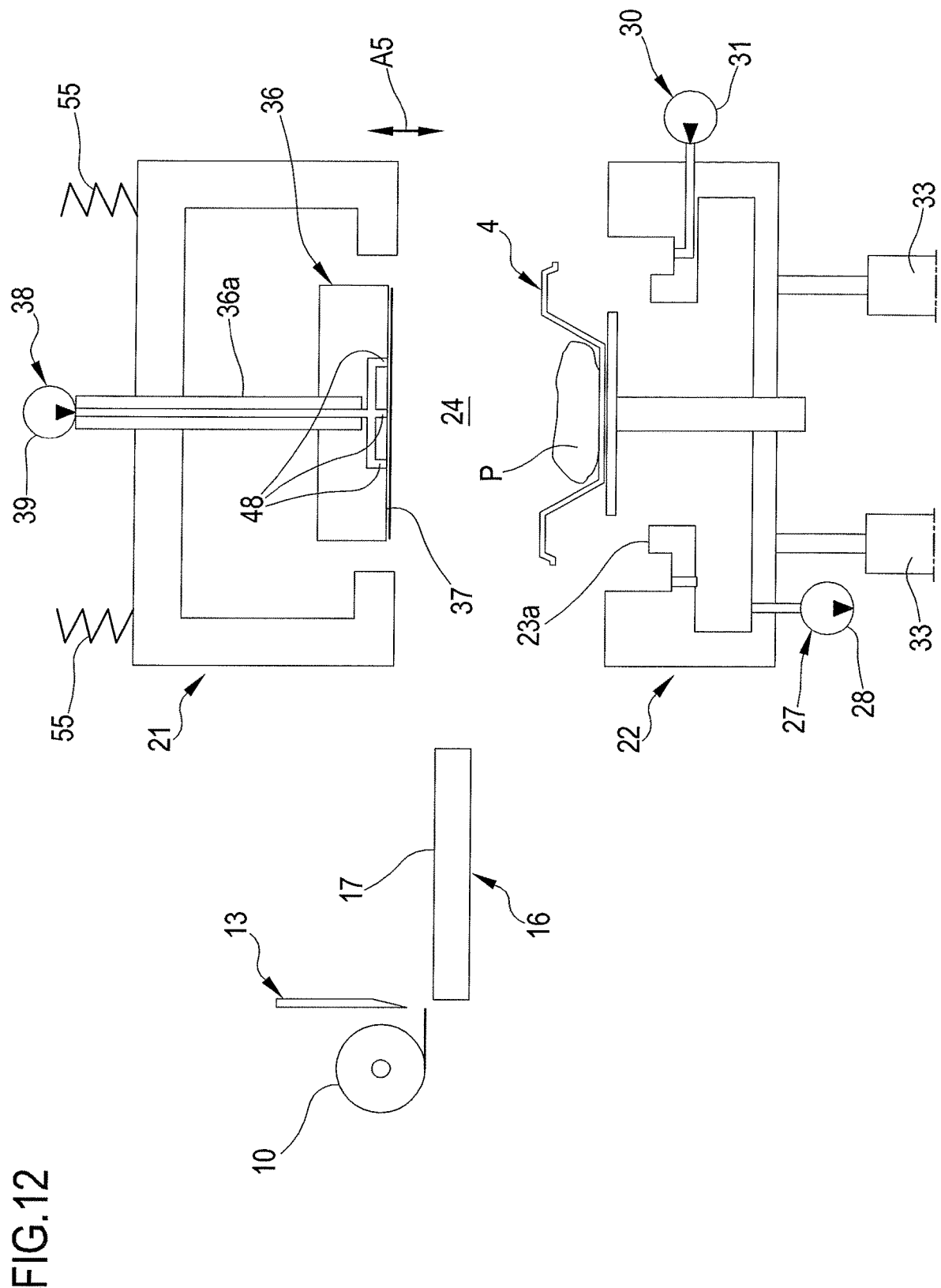
FIG. 12-16 are schematic side views relating to a third embodiment of a packaging apparatus according to aspects of the invention. In these figures consecutive phases of a packaging process operated by the apparatus of the third embodiment are shown. The apparatus and process according to these figures are intended to form a skin packaging.

In FIGS. 9-12 a second embodiment of apparatus 1 is shown. The general structure of FIG. 1 may also apply to this second embodiment. For sake of conciseness only the aspects and components of this second embodiment differing from those of the first embodiment will be described; the remaining aspects and components are the same as in the first embodiment and have been identified with same reference numerals. The differences with respect to the first embodiment concern the packaging assembly: in the case of FIGS. 9-11 the packaging assembly 8 comprises at least a side wall 42 movably associated to one of the upper tool 21 or lower tool 22. In the example illustrated in FIG. 9, the side wall 42 is associated to lower tool 22 and tightly slides along direction A5 (e.g. vertically) in correspondence of the lateral surface of the lower tool. The side wall may be a single side wall or may be formed by a plurality of side walls, each one acting on a respective side of the lower tool 22 and normally pushed upwards by the action of a respective elastic element 80 (such as e.g. a spring or a pneumatic actuator). In the case of FIGS. 9-11 the main actuator 33 carried by frame 102 acts onto the lower tool 22 under the control of control unit 100 and vertically lifts and lowers the lower tool as indicated by the double arrow A5. The control unit 100 is configured for moving lower tool 22 between said first operating condition, where the upper tool 21 is spaced apart from the lower tool 22 and the side wall 42 is at a distance from the lower surface of the upper tool (FIG. 9 with packaging chamber open), and said second operating condition, where the surface 43a of the side wall 42 tightly abuts against abutment surface, e.g. lower surface, 43b of the upper tool (FIG. 10 with packaging chamber 24 closed with respect to an atmosphere outside the apparatus).

As above mentioned, the control unit 100 synchronizes opening and closure of the packaging chamber with movement of the backing structure 16 of transfer device 7 which is structured and operates as in embodiment 1.

In the second condition shown in FIG. 10, the packaging chamber is hermetically closed but the film sheet is maintained at a distance from the rim 4c so that the vacuum arrangement and/or the controlled atmosphere arrangement may be operated as described for embodiment 1. The control unit may then operate the main actuator 33 to cause a further upward movement of the lower tool such that the film sheet held in position by the holder plate 36 is pressed against rim 4c of support 4. This further stroke of the lower tool causes a retraction (i.e. a downward movement) of the side wall(s) 42 winning the reaction of element(s) 80. Thanks to the presence of the side wall(s) 42, the upper tool may present a completely flat lower surface as shown in FIGS. 9-11.

Also note that, in a manner similar to embodiment 1, at each seat 23b operates at least one inner element 50, which includes a stem 51 and a terminal plate 52, configured for supporting at least the base 4a the tray or support 4. The inner element is movable relative to the lower tool 22 at least along the direction of double arrow A5 direction: the stem 51 may slide through an opening 53 on the bottom 54 of the lower tool 22 in order to allow relative movement between said inner element 50 and lower tool 22. Note that the inner element may be controlled by a respective actuator (not shown) or it may be directly carried by frame 2. In the examples shown case where the lower tool is mobile up and down as above described, the inner element 50 may remain vertically fixed at least until the terminal plate reaches bottom 54 of the lower tool (see FIG. 11).

Going in further detail the upper tool 21 has at least one holding plate 36 having a respective active surface 37 which is flush to the bottom surface of the lower tool and which is sufficiently sized to contain the entire film sheet 18. In other words, the holding plate covers the entire radial span of the end surface 23a and thus also of rim 4c. The holding plate 36 is rigidly coupled to the upper tool 21 such that the film holding plate 36 is not relatively movable with respect to the upper tool 21 at least along a direction A5 transverse to the horizontal direction A1. The means 38 for holding may comprise a vacuum source 39, e.g. in the form of a pump, controlled by the control unit 100 and connected to a plurality of suction holes 48 present in correspondence of the active surface 37. Note that in addition or in alternative to vacuum source 39 the means for holding 38 may include one or more of the following:

mechanical holders, such as pincers, clamps or the like,
adhesive systems, for instance comprising adhesive portions associated to the active surface 37,
heating systems, for instance comprising heatable portions associated to the holding plate for causing heating of the active surface 37 and thus of the film sheet 18 in order to increase stickiness of the film sheet to the active surface 37,
electrostatic systems, for instance the active surface 37 may be charged with a polarity different from that typical of the plastic sheet 18.

The control unit 100 may be configured for controlling the means 38, e.g. for activating the vacuum source 39, and causing the film holding plate 36 to receive and hold said one or more film sheets 18 in correspondence of the active surface 37. In particular, the control unit 100 may be configured for coordinating activation of the means 38, e.g. the vacuum source 39, with proper positioning of the cut film sheet 18 by the backing plate 16: for instance the control unit 100 may activate the means 38, e.g. the vacuum source 39, and cause the film holding plate 36 to receive and hold said one or more film sheets 18 in correspondence of the active surface 37, when the backing structure 16 carrying the cut film 18 is properly positioned within the packaging chamber underneath the holding plate 36. Heating means may be integrated in the film holding plate 36 which may be configured to heat the active surface 37. The heating means can be connected with the control unit 100 and the control unit be configured for controlling the heating means such that the active surface 37 of the film holding plate 36 is brought to the desired temperature. The heating means may be of the type described for embodiment 1. The control unit may control the heating means to generate a first temperature in the peripheral portion of the surface 37 and a second temperature in the central portion of the surface 37. The first and second temperature. In particular, the control unit 100 may be configured to control the first and second temperatures as follows:

in case of shrinkable films 10 being used, then the control unit may only cause heating of the peripheral portion of the active surface 37, optionally only when this latter is pressed against the rim 4c of tray 4, in case of non heat shrinkable films 10 being used, then the control unit may cause heating of the entire surface 37 and thus of the entire film sheet with the first and second temperatures being e.g. equal, in case of skin packaging then the control unit may cause heating of the entire active surface 37 and thus of the entire film sheet, e.g. with the second temperature being higher than the first temperature.

After the above structural description of the second embodiment of apparatus 1 here below operation of the second embodiment is disclosed. The operation takes place under control of control unit 100 and achieves an alternative process of packaging a product in a tray. In this case the described process allows packaging under modified atmosphere. In any case the apparatus 1 is also capable of making a skin packaging of the product. The apparatus may also be used for applying a lid to a tray with normal ambient atmosphere.

After the transfer device 7 has moved the cut film sheet 18 into the packaging chamber 24 and the holding plate 36 has received the cut film sheet (see FIG. 9), the control unit 100 controls the main actuator 31 to close the packaging chamber 24 (FIG. 10) by lifting the lower tool 22 such that inner wall 33 intercepts the support 4 and the side wall 42 abuts against the upper tool 21. At this point the packaging chamber is hermetically closed by the side walls acting against lower surface 43b of the upper tool 21 and film sheet 4 is hold by holding plate 36 at a certain distance from the mouth of the tray or support 4: the vacuum arrangement may be activated and a certain degree of vacuum created. Then, immediately after or during vacuum creation, the controlled atmosphere arrangement may be actuated and a controlled atmosphere created inside the packaging chamber. A further vertical movement imposed onto the lower tool by main actuator 33 wins the reaction of the elastic element 80 and allows the holding plate 36 to bring the cut film sheet into contact with the rim 4c; the control unit 100 causes heating of the heating means and sealing of the peripheral portion of the cut film sheet to the tray rim. Then the control unit lowers the lower unit, and thus the packaging chamber 24 may be opened to allow the tray to proceed downstream the packaging assembly. The cycle may then be repeated.

Third Embodiment of the Apparatus 1

In FIGS. 12-16 a third embodiment of apparatus 1 is shown. For sake of conciseness only the aspects and components of this second embodiment differing from those of the first embodiment will be described; the remaining aspects and components are the same as in the first embodiment and have been identified with same reference numerals. The differences with respect to the first embodiment concern the packaging assembly: in the case of FIGS. 12-16 the upper tool 21 has at least one holding plate 36 having a respective active surface 37: the holding plate 36 is terminally carried by shaft 36a and covers the entire radial span of the end surface 23a and thus also of rim 4c. The holding plate shaft is coupled to the upper tool 21 to allow at least movement along direction of double arrow A5 as it will be explained herein below. The means 38 for holding may comprise a vacuum source 39, e.g. in the form of a pump, controlled by the control unit 100 and connected to a plurality of suction holes 48 present in correspondence of the active surface 37. Note that in addition or in alternative to vacuum source 39 the means for holding 38 may include one or more of the following:

mechanical holders, such as pincers, clamps or the like, adhesive systems, for instance comprising adhesive portions associated to the active surface 37, heating systems, for instance comprising heatable portions associated to the holding plate for causing heating of the active surface 37 and thus of the film sheet 18 in order to increase stickiness of the film sheet to the active surface 37, electrostatic systems, for instance the active surface 37 may be charged with a polarity different from that typical of the plastic sheet 18.

The control unit 100 may be configured for activating the means 28, e.g. vacuum source 39, and causing the film holding plate 36 to receive and hold said one or more film sheets 18 in correspondence of the active surface 37. In particular, the control unit 100 may be configured for coordinating activation of the means 28, e.g. of vacuum source 39, with proper positioning of the cut film sheet 18 by the backing plate 16: for instance the control unit 100 may activate the means 28, e.g. vacuum source 39, and cause the film holding plate 36 to receive and hold said one or more film sheets 18 in correspondence of the active surface 37, when the backing structure 16 carrying the cut film 18 is properly positioned within the packaging chamber underneath the holding plate 36. Heating means may be integrated in the film holding plate 36 which may be configured to heat the active surface 37. No heating structure 40 analogous to that of embodiment 1 is present in embodiment 3. The heating means can be connected with the control unit 100 and the control unit be configured for controlling the heating means such that the active surface 37 of the film holding plate 36 is brought to the desired temperature. The heating means may be of the type described for embodiment 2.

After the above structural description of the third embodiment of apparatus 1 here below operation of the third embodiment is disclosed. The operation takes place under control of control unit 100 and achieves a process of packaging a product in a tray. In this case the described process allows a skin packaging of the product. In any case the apparatus 1 is also capable of making a packaging under modified atmosphere. Furthermore, the apparatus may be used to apply a film lid with normal ambient atmosphere remaining in the tray or support 4.

Figure 13:
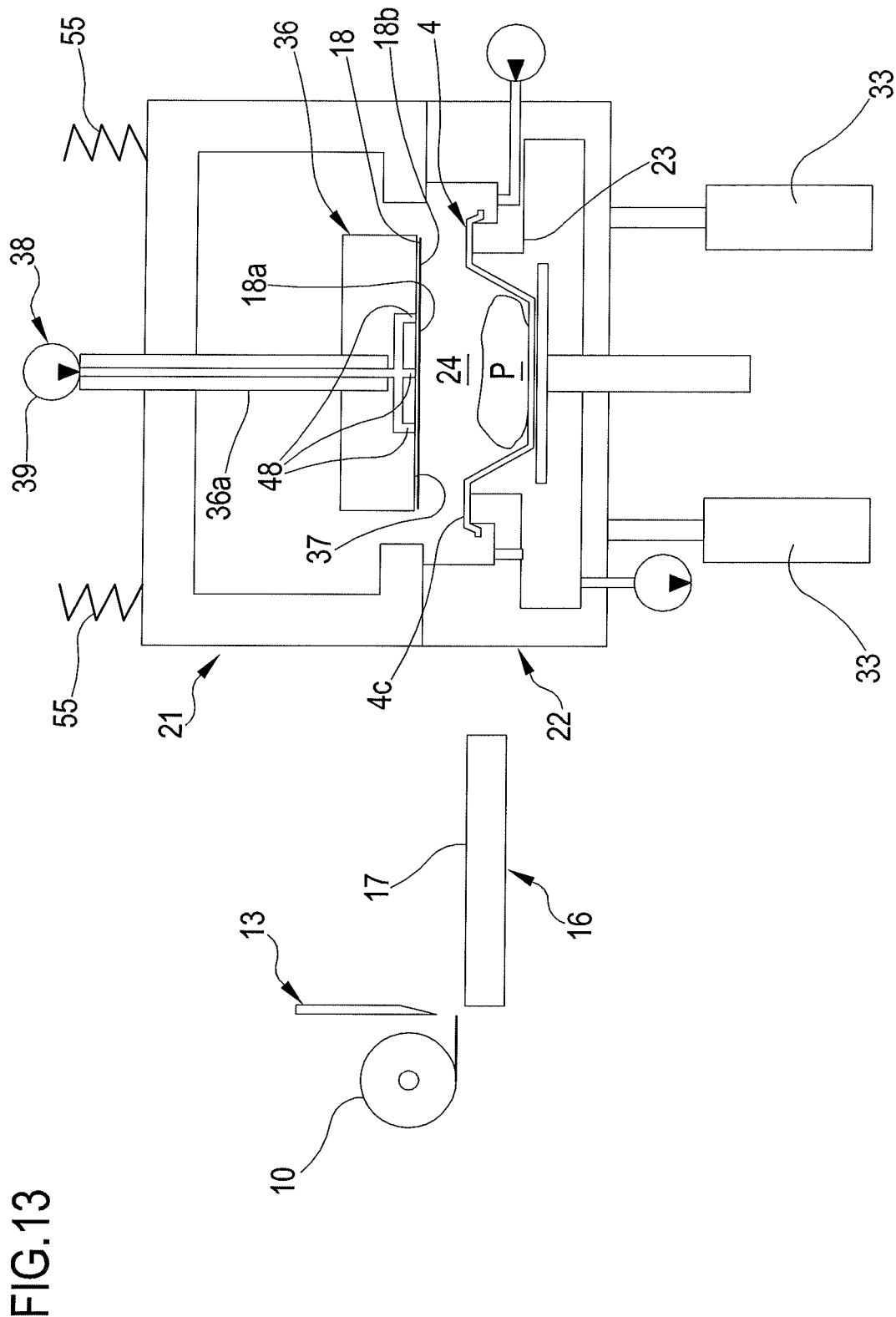
Figure 14:
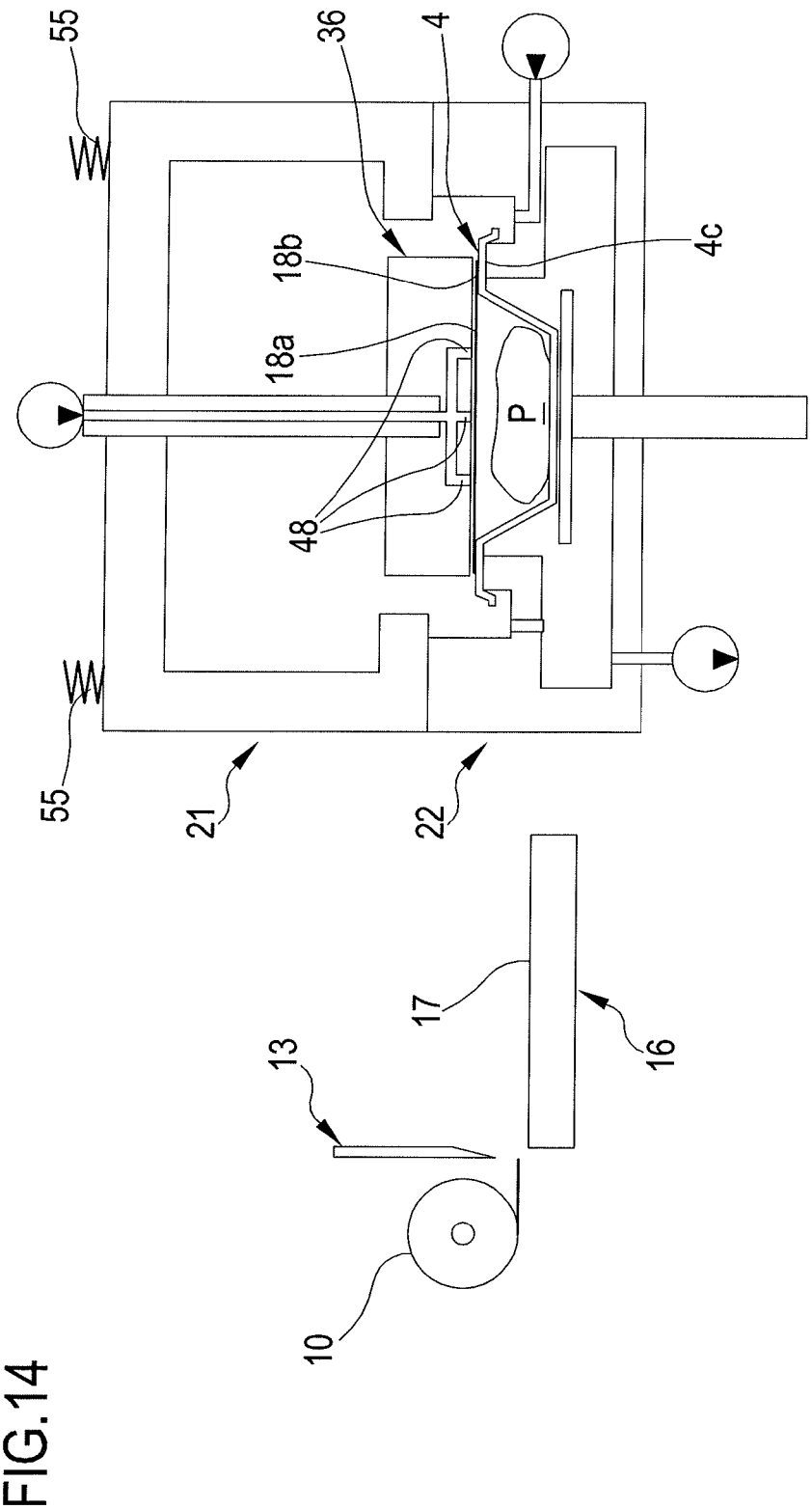
Figure 15:
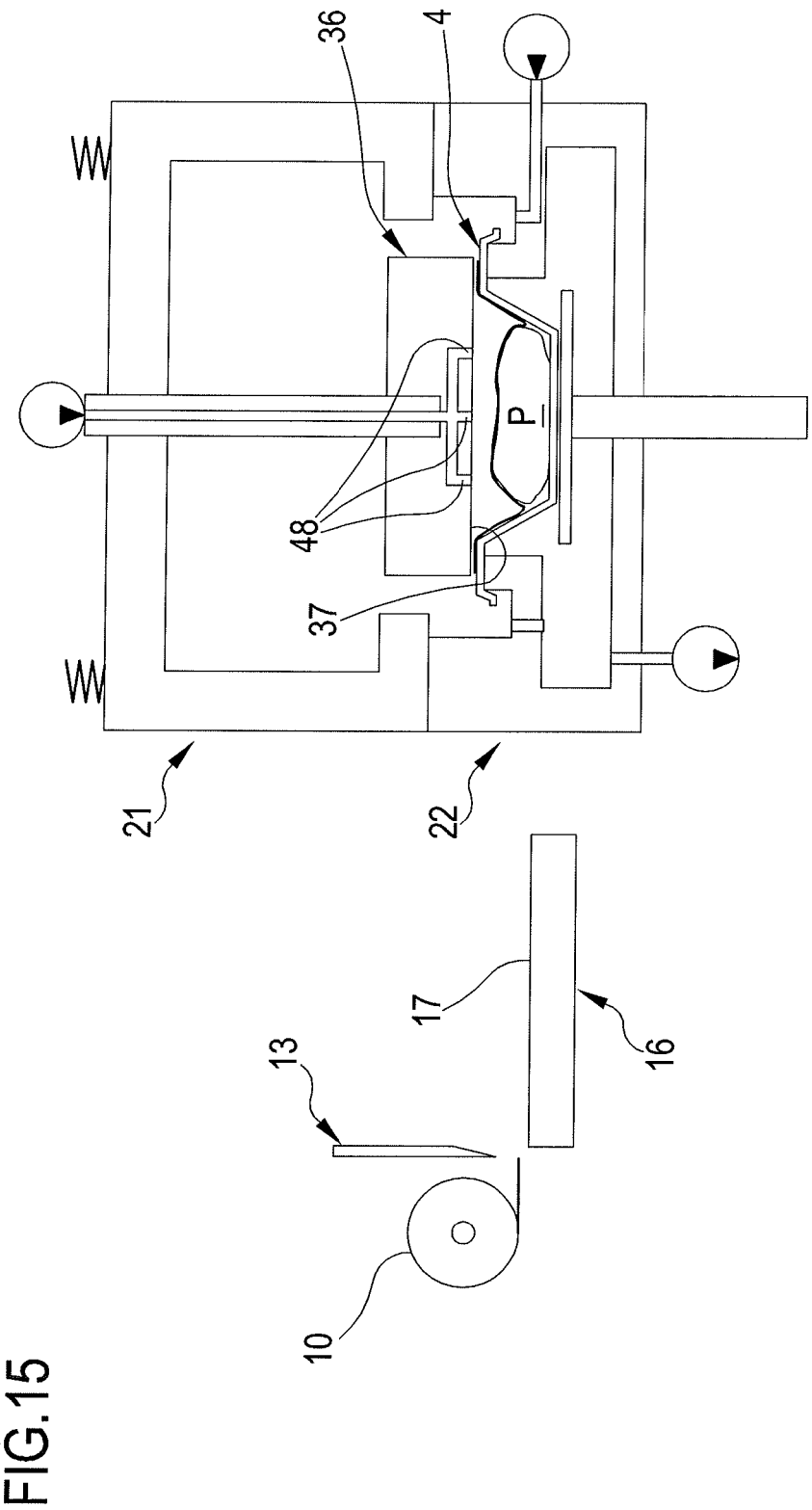
Figure 16:
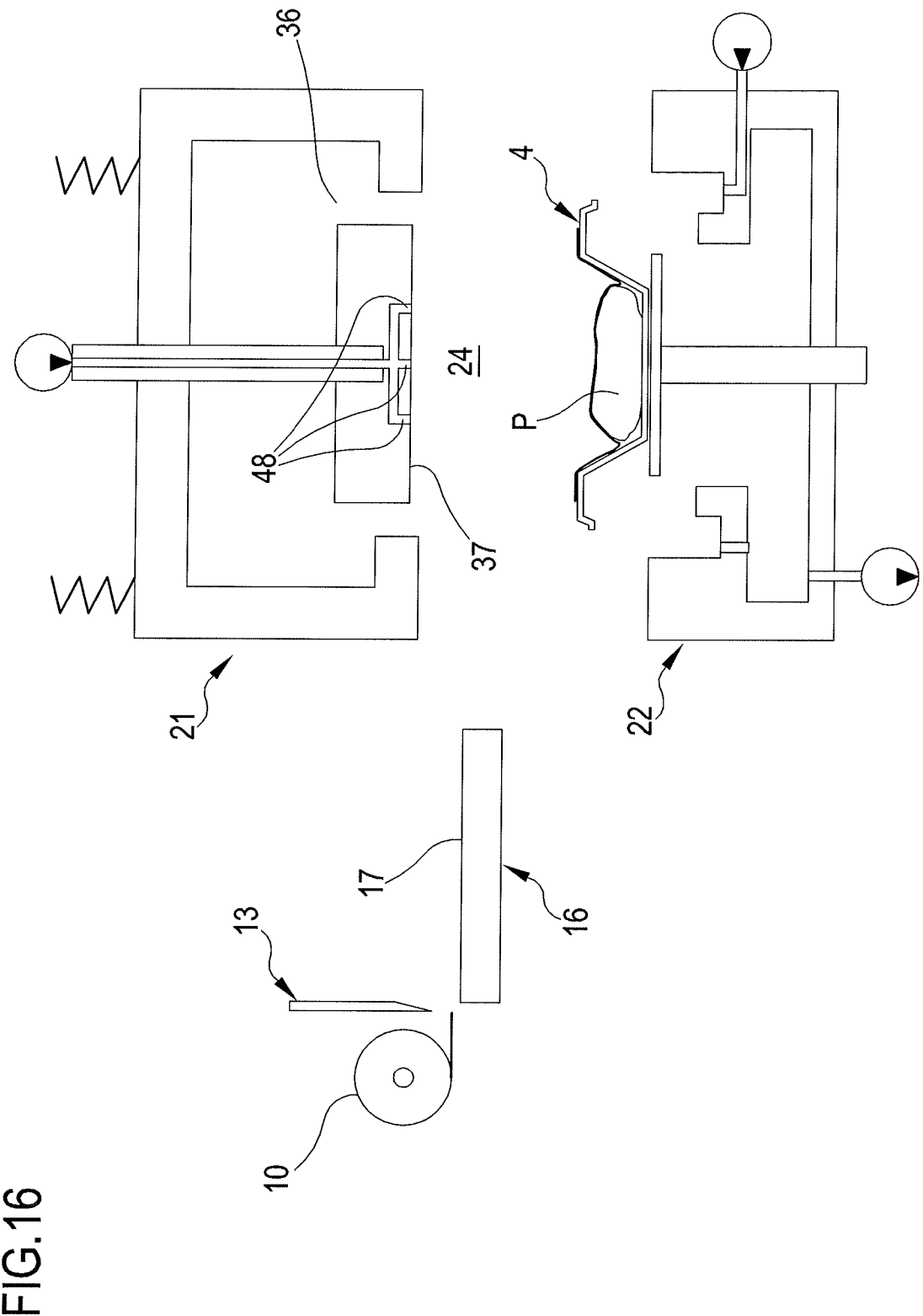

In the apparatus 1 of FIGS. 12-16 after the transfer device 7 has moved the cut film sheet 18 into the packaging chamber 24 and the holding plate 36 has received the cut film sheet (see FIG. 12), the control unit 100 controls the main actuator 33 to close the packaging chamber 24 (FIG. 13) by lifting the lower tool 22 such that inner wall 33 intercepts the support 4. At this point, the packaging chamber is hermetically closed and film sheet is hold by holding plate 36 at a certain distance from the mouth of the tray or support 4: as shown in FIG. 13 the vacuum arrangement may be activated and a certain degree of vacuum created. A further vertical movement imposed onto the lower tool 22 by main actuator 33 wins the reaction of the elastic elements 55

(see FIG. 14) and brings the film sheet hold by holding plate in contact to the rim 4c of the support 4. The heating means cause a heating of the film sheet 18 positioned above a support 4: the film sheet is selected to be adequate for vacuum packaging and the heating surface is heated to a temperature allowing facilitating subsequent deformation of the film sheet central portion 18a film. Then the control unit causes the pump 39 to pump gas (instead of operating as a vacuum source) and thereby cause the draping down of the film sheet onto the product. Note that alternatively the control unit may simply connect the suction holes 48 to the atmosphere as atmospheric pressure is in most of the case sufficient. Further heating generated by the heat means may facilitate sealing of the peripheral portion of the film sheet to rim 4c (see FIG. 15). The control unit 100 operates the main actuator to lower the lower tool 22, and thus the packaging chamber 24 may be opened to allow the tray to proceed downstream the packaging assembly. The cycle may then be repeated.

Further Variants

In the case of FIGS. 17-19 (which may be applied to any one of the embodiments described above or claimed), in which the lower tool 22 is provided with multiple seats 23b, the apparatus comprises a plurality of distinct backing structures 16 each comprising a flat holding surface 17 adapted for receiving one respective of said film sheets 18; each of the backing structures 16 is movable between at least the cutting assembly 6, to pick up the respective film sheet 18, and the inside of the chamber 24, to position the cut film sheet 18 in correspondence of the respective upper tool 21 holding plate 36. In this case, one or more transfer actuators 47 would be active on the backing structures 16: there may be one transfer actuator dedicated to each structure 16 or one actuator dedicated to a move a set of said structures (e.g. all structures on the same row) or one single transfer actuator configured for contemporaneously move all structures 16. The transfer actuator or actuators 47 are configured for allowing movement of the backing structures 16 and thus of cut film sheets 18 from the cutting assembly 6 to inside of the packaging chamber 24. The transfer actuator or actuators 47 is/are controlled by the control unit 100 such that to mutually space apart the backing structures 16 before, when or subsequent to moving the backing structures 16 from the cutting assembly 6 to the inside the packaging chamber 24. This is shown in FIGS. 18 and 19 schematically representing an example where a plurality of backing structures 16—before, or when moving into the chamber, or subsequent to movement into the chamber, are further spaced apart in both X and Y directions (X and Y directions are two mutually perpendicular and reference directions parallel to the lying plane of the cut film sheets in correspondence of the cutting station). The transfer actuators may in this case include one or more pistons: any combination of electric, pneumatic or hydraulic actuators may be adopted.

Finally, as shown in the figure from 23 to 31, the packaging assembly 8 may include a number of pusher elements 44 useful to support the means 38 for fixing sheet 18 on the active surface 37. This aspect too may be applied to any one of the embodiments described above or claimed.

In particular, pusher elements 44 are adapted to move from a release position, where active portions 45 of the pusher elements 44 are spaced from the active surface 37 (see FIGS. 25 and 31) of the holding plate 36, to an engage position (see FIGS. 24, 27, and 30), where active portions 45 of the pusher elements 44 press the cut film sheet 18 border portions against said active surface 37 of the holding plate 36.

Pusher elements 44 may include one selected in the group of:
finger shaped stoppers pivotally mounted to the upper tool 21 and active in correspondence of corners of said seats 23 (FIGS. 24 and 25) in order to act on the corners of the film sheet 18 without interfering with the tray rounded corners,
finger shaped stoppers mounted to the lower tool 22, configured to be vertically moved and active in correspondence of corners of said seats in order to act on the corners of the film sheet 18 without interfering with the tray rounded corners,
oscillating bars pivotally mounted to the upper tool 21 and active in correspondence of side borders of said seats 33 (FIGS. 29-31);
oscillating bars mounted to the lower tool 22, and active in correspondence of side borders of said seats.

Optionally, at least one actuator is active on said pusher elements 44 under the control of said control unit 100 which is configured to activate the said actuator and move the pusher elements 44 from said release to said engage position and vice versa.

Control Unit of Apparatus 1

The apparatus according to the invention has of at least one control unit.

The control unit 100 (schematically represented in FIG. 1) may comprise a digital processor (CPU) with memory (or memories), an analogical type circuit, or a combination of one or more digital processing units with one or more analogical processing circuits. In the present description and in the claims it is indicated that the control unit 100 is "configured" or "programmed" to execute certain steps: this may be achieved in practice by any means which allow configuring or programming the control unit. For instance, in case of a control unit 100 comprising one or more CPUs, one or more programs are stored in an appropriate memory: the program or programs containing instructions which, when executed by the control unit, cause the control unit 100 to execute the steps described and/or claimed in connection with the control unit. Alternatively, if the control unit 100 is of an analogical type, then the circuitry of the control unit is designed to include circuitry configured, in use, to process electric signals such as to execute the control unit steps herein disclosed.

In general terms the control unit 100 acts on and controls the transport assembly 3, the film cutting assembly 6, the transfer device 7, packaging assembly 8 and particularly the upper and/or lower tools 21, 22, the vacuum arrangement 27, the controlled atmosphere 30. In particular the control unit 100 may be configured for controlling execution of the following cycle:
commanding the transport assembly 3 to displace said support along the predefined path into said packaging chamber 24 so that each support 4 to be packaged is housed in the respective seat 23b;
commanding the film cutting assembly 6 to cut at least one film sheet 18 exactly sized to cover the mouth of the support 4 delimited by said rim 4c and at least part or all the top surface of the rim,
commanding the transfer device 7 to position the cut film sheet 18 inside the packaging chamber 24 and above the respective support 4,
commanding the upper tool 21 to hold the cut film sheet 18 above and at a distance from said support 4,
commanding the packaging assembly 8 to pass from the first to the second operating condition so as to hermetically close the packaging chamber 24, commanding the vacuum arrangement 27 to remove air from within said hermetically closed packaging chamber, commanding the controlled atmosphere arrangement 30 to inject a gas or a gas mixture in the packaging chamber, commanding the packaging assembly 8 to tightly fix the film sheet 18 to said support 4, commanding the packaging assembly 8 from the second to the first operating condition, commanding the transport assembly 3 to move the support 4 with the tightly fixed film sheet 18 out of the packaging chamber 24 and then repeating the above cycle.

The control unit may also be configured for controlling the apparatus 1 in order to execute any one of the packaging processes described below or claimed in the appended claims.

Processes of Packaging

Processes of packaging in accordance with aspects of the invention are now described.

The following processes may be executed by the apparatus according to any one of the above embodiments and variants under the supervision of control unit 100. In accordance with an aspect of the invention it is the control unit 100 which is controlled and programmed to execute below described processes using an apparatus 1 as described in one of the above embodiments or as claimed in any one of the appended claims.

The trays (or supports) 4 are progressively moved to the packaging assembly 8, e.g. by transport assembly 3. At the same time the film 10a is unrolled from roll 10 and the cutting assembly 6 acting outside packaging chamber 8 prepares the cut film sheets 18 in number and size corresponding exactly to the trays to be closed. In practice the film sheets may be cut to a size copying that of the outer border of the rim 4c (e.g. exactly identical or slightly larger than that of the outer border of rim 4c) or they may be cut to a size radially smaller than the outer edge of rim 4c but sufficient to tightly close the mouth of the tray 4 and sealingly engage the rim 4c top surface. In other words the radial width of the cut film sheets may be comprised between the maximum radial width and the minimum radial width of the rim 4c of tray or support 4.

The tray preparation may be made beforehand or the trays may be formed online at a forming station during the cutting of film sheets. The cutting of the film 10a into film sheets 18 takes place at a station remote from the location where the film sheets are coupled to the tray. The cut film sheet or—in case a plurality of trays are treated at a time—a plurality of cut film sheets are moved to the packaging assembly 8. As just described the film sheet(s) are/is cut from the continuous film before being moved inside the packaging chamber. The packaging assembly 8 is left open for a time sufficient for a number of trays 4 and for a corresponding number of film sheets 18 to properly position inside the packaging chamber 24 defined in the packaging assembly. The transfer device 7 may be used as described above in order to move inside the packaging chamber 24 the film sheets which have been cut outside the packaging assembly 8. Basically the film sheet laying on the backing structure 16, once cut, is carried by the backing structure inside the chamber 24 in front of the upper tool which is configured to pick the cut film sheet 8s) from the backing structure 16. The backing structure 16 releases the cut film sheet to the upper tool and returns back outside the packaging chamber. Then the packaging assembly 8 is closed and the film sheets are held above the respective tray but at a distance sufficient to allow gas circulation inside the tray. The packaging chamber is hermetically closed in the sense that only controlled streams of gas may be withdrawn and/or injected into the chamber 24 under the supervision of apparatus 1 (note that in case the closure of the tray need no vacuum and or no controlled atmosphere then the packaging chamber may be simply closed without an hermetical closure). At this point, the packaging process may vary depending upon the type of packaging and depending upon the type of film sheet available.

If, e.g. a non heat shrinkable film sheet is being used as tray lid, and if it is intended to create a modified atmosphere packaging, then a partial vacuum is created inside the packaging chamber and a gas for modified atmosphere contemporaneously or subsequently injected. When a partial vacuum is formed in the packaging chamber 24 (e.g. by the control unit 100 controlling the vacuum pump 28 to withdraw gas from said packaging chamber 24) gas is withdrawn until a pressure comprised between 100 and 300 mbar, optionally between 150 and 250 mbar, is reached inside the packaging chamber 24. This pressure level is sufficiently low but not too low, so that detachment of the film sheet from the holding plate 36 is avoided as a pressure level is formed in correspondence of the suction holes 48 which is below the pressure level in the packaging chamber. In this phase the film sheet(s) is kept by the holding plate which may be provided with means for holding the film in proper position as described above. Then, after a prefixed delay from start of gas withdrawal (e.g. after a prefixed delay from activation of said vacuum pump 28) or after a prefixed level of vacuum has been reached inside said packaging chamber 24, a modified atmosphere gas in injected into the packaging chamber 8. The injecting of said stream of gas for creating a modified atmosphere may be started even while gas withdrawal is still ongoing so as to shorten the time for creating the modified atmosphere. Moreover as it is preferable to avoid having very strong vacuum in the packaging chamber and at the same time it is desirable to ensure a proper atmosphere inside the chamber it is advantageous stopping the vacuum generation after the gas injection has already started. In this way pressure inside the chamber never goes below a desired value. During the overlap, the gas injected is mixed with residual air and continuing to pull vacuum the mix air-modified atmosphere gas continues to be removed so that the amount of initial air is in any case decreased.

The film sheet 18 may be uniformly heated or it may be heated at least in correspondence of its periphery 18b. This operation may take place using the heating structure 40 and/or the heating means associated to the holding plate 36. At least one of the peripheral film portion 18b and of the rim 4c is brought to a temperature allowing the heat bonding of the film peripheral portion 18b to the tray 7 rim and a tight closure of the tray 7. Then, or contemporaneously to heating, the film sheet is lowered and tightly bond to the tray. In case ultrasonic or microwave based heaters are used they are operated at this stage and also the tray rim 4c may be contemporaneously heated. Once the bonding has been completed, the packaging chamber may be opened and the tray provide with a tight lid formed by the cut film sheet 18 may proceed out of the packaging chamber.

If, e.g. a heat shrinkable film sheet is being used as tray lid, and if it is intended to create a modified atmosphere packaging, then a partial vacuum is created inside the packaging chamber and a gas for modified atmosphere contemporaneously or subsequently injected. When a partial vacuum is formed in the packaging chamber 24 (e.g. by the control unit 100 controlling the vacuum pump 28 to withdraw gas from said packaging chamber 24) gas is withdrawn until a pressure comprised between 100 and 300 mbar, optionally between 150 and 250 mbar, is reached inside the packaging chamber 24. This pressure level is sufficiently low but not too low, so that detachment of the film sheet from the holding plate 36 is avoided as a pressure level is formed in correspondence of the suction holes 48 which is below the pressure level in the packaging chamber. In this phase the film sheet(s) is kept by the holding plate which may be provided with means for holding the film in proper position as described above. Heat shrinkable films may be very thin (e.g. the thickness may go down to a range of 20-40 micron) and their handling after cutting is difficult so it is relevant that the pressure levels in the packaging chamber and at the holding plate are properly controlled. After a prefixed delay from start of gas withdrawal (e.g. after a prefixed delay from activation of said vacuum pump 28) or after a prefixed level of vacuum has been reached inside said packaging chamber 24, a modified atmosphere gas in injected into the packaging chamber 8. The injecting of said stream of gas for creating a modified atmosphere may be started even while gas withdrawal is still ongoing so as to shorten the time for creating the modified atmosphere. Moreover as it is preferable to avoid having very strong vacuum in the packaging chamber and at the same time it is desirable to ensure a proper atmosphere inside the chamber it is advantageous stopping the vacuum generation after the gas injection has already started. In this way pressure inside the chamber never goes below a desired value. During the overlap, the gas injected is mixed with residual air and continuing to pull vacuum the mix air-modified atmosphere gas continues to be removed so that the amount of initial air is in any case decreased. The film sheet 18 may be heated in correspondence of its periphery 18b. This operation may take place using the heating structure 40. At least one of the peripheral film portion 18b and of the rim 4c is brought to a temperature allowing the heat bonding of the film peripheral portion 18b to the tray 7 rim and a tight closure of the tray 7. Then the film sheet is lowered and tightly bond to the tray. In case ultrasonic or microwave based heaters are used they are operated at this stage and also the tray rim 4c may be contemporaneously heated. Once the bonding has been, completed the packaging chamber may be opened and the tray provide with a tight lid formed by the cut film sheet 18 may proceed out of the packaging chamber.

If e.g. a non heat shrinkable film sheet is being used and if it is intended to create a vacuum skin packaging, then a vacuum is created inside the packaging chamber. Then, the film sheet 18 may be uniformly heated or it may be heated at least in correspondence of its periphery 18b to a first temperature adequate for heat sealing and it may be heated in correspondence of its central portion at a second temperature, e.g. equal to or above the first temperature, adequate for rendering the film sheet highly deformable. This operation may take place using the heating structure 40 and/or the heating means associated to the holding plate 36. Then, once a vacuum level adequate for skin packaging has been reached, the film sheet is lowered such that the peripheral portion 18b of the film sheet 18 contacts the rim 3c of the tray 7. In case ultrasonic or microwave based heaters are used they are operated at this stage and also the tray rim 4c may be contemporaneously heated. The holding plate releases the film sheet and normal atmosphere pressure is created above the film sheet which thus drapes down and matches the shape of the product P and of the inside walls of the tray crating a plastic film skin around the product and on the surfaces of the tray not occupied by product P. In other words, when a predefined low pressure is reached within packaging chamber and thus within the tray or support 4 underneath the film sheet 18, the film sheet 18 is released and is drawn downwardly by the vacuum within the support 4. Since the film sheet 4 is heated (and then softened), under effect of the vacuum within the support 4 it deforms so as to adhere to the product P and to the inner surface of the support 4 (see FIGS. 15 and 16). In practice the film is at least bonded to the rim 4c and to portions of the inner surface of the support 4. Once the bonding has been completed the packaging chamber may be opened and the tray provided with a tightly associate skin formed by film sheet 18 may move out of the packaging chamber.

Alternatively, no vacuum may be created and the film is bonded to the tray thus creating a sealed tray with ambient atmosphere at the inside.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

For instance, the elastic elements 55, 60, 80 may be substituted by linear actuators controlled by control unit 100.

The specific nature of the actuators described is exemplificative and alternative types of actuators may be used provided the type of motion imposed to the mobile parts on which said actuators are operating is the same.

Also note that although the described embodiments show a single packaging assembly 8, multiple packaging assemblies may be used in parallel together with multiple transfer devices 7, in order to optimize productivity.

The invention claimed is:
1. An apparatus for packaging a product arranged on a support, said apparatus comprising:
   a packaging assembly including:
      a lower tool configured to hold one or more supports and the product arranged thereon, and
      an upper tool facing the lower tool and configured to hold one or more film sheets, the upper and lower tools configured to cooperate to define a packaging chamber therebetween;
   wherein said packaging assembly is movable between a first operating condition, where the upper and lower tools are spaced apart so that said packaging chamber is open to receive one or more film sheets and one or more supports, and a second operating condition, where the upper and lower tools engage to close said packaging chamber;
   a film supplying assembly configured to supply a continuous film outside of the packaging chamber, wherein the continuous film is a flexible film having a layer of a polymer component;
   a film cutting assembly located outside of the packaging chamber, wherein the film cutting assembly is configured to cut film sheets of prefixed length from said continuous film outside of the packaging chamber;
   at least one transfer device configured to position the cut film sheets inside the packaging chamber, said transfer device including:
      a backing structure having a holding surface adapted to receive the one or more cut film sheets from the cutting assembly, and a transfer actuator configured to engage the backing structure, wherein the transfer device is movable between a first actuated position, where the backing structure is positioned outside the packaging chamber at the cutting assembly to receive the one or more cut film sheets, and a second actuated position, where the backing structure is positioned inside said packaging chamber to place at least one film sheet above one or more supports held on the lower tool; and a control unit coupled to the packaging assembly and configured to cause:
  activation of the packaging assembly to move between the first and second operating conditions;
  activation of the film cutting assembly to cut film sheets from the continuous film into the cut film sheets outside the packaging chamber;
  activation of the transfer device to move between the first and second actuated positions; and
  synchronization of movements of the transfer device between the first and second actuated positions and the packaging system between the first and second operating conditions to seal a film sheet to a support within the packaging chamber.

2. The apparatus of claim 1, wherein the control unit is configured (i) to place the packaging assembly in the first operating condition for a time sufficient for the backing structure of the transfer device to position inside the packaging chamber one or more film sheets, and (ii) to move the backing structure from the packaging chamber before placing the packaging assembly in the second operating condition.

3. The apparatus of claim 1, wherein the transfer actuator is configured for pushing and pulling the backing structure to move the transfer device between said first and second actuated positions.

4. The apparatus of claim 1 further comprising a transport assembly configured to displace one or more supports along a predefined path to the packaging assembly, the transport assembly including a conveyor configured to displace a prefixed number of supports per time, wherein the control unit is configured for:
  controlling the conveyor to displace the prefixed number of supports from a region outside the packaging chamber, to a region inside the packaging chamber where the supports of said prefixed number are in vertical alignment to respective film sheets; and
  synchronizing the conveyor such that movement of the prefixed number of supports from the region outside the packaging chamber to the region inside the packaging chamber is caused to take place when the packaging chamber is open in the first operating condition.

5. The apparatus of claim 1 further comprising at least one frame carrying:
  the transport assembly,
  the packaging assembly,
  the film supplying assembly, and
  the film cutting assembly, which comprises at least one blade to cut the continuous film and located between said packaging assembly and said film supply assembly, wherein the control unit is configured to execute the following cycle:
    commanding the transport assembly to displace said support into said packaging chamber;
    commanding the film cutting assembly to cut, from the continuous film, at least one film sheet, the cutting separating the cut film sheet from the continuous film outside the packaging chamber and taking place before displacing said cut film sheet inside the packaging chamber,
    commanding the transfer device to displace the cut film sheet from outside to inside the packaging chamber and above the respective support,
    commanding the upper tool to hold the cut film sheet above, and at a distance from, said support,
    commanding the packaging assembly to pass from the first to the second operating condition, and
    commanding the packaging assembly to seal the film sheet to said support, wherein said step of commanding the transfer device comprises the following which the control unit is configured to execute:
      controlling the transfer device to move the backing structure between said first actuated position, where the backing structure is positioned outside the packaging chamber at the cutting assembly to receive the cut film sheet, and said second actuated position, where the backing structure is positioned inside said packaging chamber to place the cut film sheet above said support.

6. The apparatus of claim 1 further comprising at least one of:
  (i) a vacuum arrangement connected to the packaging chamber and configured to remove gas from said packaging chamber, wherein said control unit is further configured to control the vacuum arrangement to withdraw gas from said packaging chamber at least when the packaging assembly is in said second operating condition with said packaging chamber closed; and
  (ii) a controlled atmosphere arrangement connected to the packaging chamber and configured to inject a gas stream into said packaging chamber, wherein said control unit is further configured to control said controlled atmosphere arrangement to inject said stream of gas at least when the packaging assembly is in said second operating condition with said packaging chamber closed, wherein the controlled atmosphere arrangement is configured to inject gas into the packaging chamber including a quantity of one or more of $N_2$, $O_2$ and $CO_2$ which is different from the quantity of these same gases as present in the atmosphere at 20° C. and sea level (1 atmosphere pressure).

7. The apparatus of claim 6, wherein:
  the apparatus includes both the vacuum arrangement and the controlled atmosphere arrangement; and
  the control unit is configured to control said controlled atmosphere arrangement to start injecting said stream of gas either after a prefixed delay from activation of said vacuum arrangement or after a prefixed level of vacuum has been reached inside said packaging chamber.

8. The apparatus of claim 7 wherein the control unit is configured to operate the vacuum arrangement to remove gas from said packaging chamber and create in the packaging chamber a vacuum level with pressure comprised between 100 and 300 mbar.

9. The apparatus of claim 1 wherein the packaging assembly further comprises:
  a main actuator active on at least one of said upper and lower tools, the main actuator being controlled by the control unit,
  the control unit being configured to act on the main actuator and causing relative movement of the upper and lower tools, along a main direction, between said first operating condition, where the upper tool is spaced apart from the lower tool and said packaging chamber is open to receive one or more of said film sheets, and said second operating condition, where a closure surface of the upper tool tightly abuts against a closure surface of the lower tool to hermetically close said packaging chamber with respect to an atmosphere outside the apparatus.

10. The apparatus of claim 9 wherein:
the packaging assembly further comprises a side wall movably associated to one of the upper tool or the lower tool;
the side wall has a front surface configured to abut against an abutment surface of the other of said upper tool or lower tool,
the side wall is mounted to the packaging assembly such that when the packaging assembly moves from said first to said second operating conditions, the side wall correspondingly moves from a first position, where the side wall front surface is spaced from said abutment surface so that the packaging chamber is left open to receive one or more of said film sheets, to a second position, where the side wall front surface tightly closes against said abutment surface such that said packaging chamber is hermetically closed with respect to an atmosphere outside the apparatus;
the control unit is configured to act on the main actuator after the packaging assembly has reached the second operating condition and causing a further relative movement of the upper and lower tool, along the main direction; and
the further relative movement causes a retraction of the side wall against the reaction of an elastic element.

11. The apparatus of claim 1 wherein the packaging assembly upper tool comprises:
a film holding plate having an active surface configured to receive and holding the one or more film sheets, the active surface provided by one or more of:
a vacuum source controlled by the control unit, the control unit being configured to activate the vacuum source and causing the film holding plate to receive and hold said one or more film sheets in correspondence of the active surface,
mechanical holders associated to the active surface,
adhesive portions associated to the active surface,
heatable portions associated to the holding plate and controlled by control unit to cause heating of the active surface and thus of the film sheet in order to increase stickiness of the film sheet to the active surface, or
electric systems associated to the holding plate and controlled by the control unit to charge the active surface with a predetermined polarity.

12. The apparatus of claim 11 wherein:
the upper tool further comprises a heating structure peripherally associated to the film holding plate and having a heating surface which extends radially outside with respect to the active surface of the holding plate,
the lower tool further comprises an inner wall defining one or more seats (i) adapted to bear at least a portion of the one or more supports and (ii) opposing the heating surface of the heating structure of the upper tool at least when the packaging assembly is in said second operating condition,
the heating structure and film holding plate are movable relative each other from a non-engaged position, in which the heating surface is spaced apart from the active surface of the holding plate so that the heating surface does not contact a film sheet held by the active surface, and an engaged position, in which the heating surface is proximate the active surface of the holding plate so that the heating surface can contact a film sheet held by the active surface, and
the control unit is configured to control heating of the heating surface of the heating structure.

13. The apparatus of claim 12 further comprising a heater integrated in the film holding plate, wherein the control unit is configured to control the heater to provide such that the active surface of the film holding plate at a desired temperature.

14. The apparatus of claim 13 wherein the control unit is configured to independently control the heater and the heating structure.

15. The apparatus of claim 12 wherein the heating structure comprises one or more of:
a metallic body embedding one or more of a resistive element and an inductive element connected to a power supply and to the control unit which is configured to control the power supply to supply current to the resistive or inductive element such as to keep the temperature of the heating surface within a prefixed range,
a metallic wire directly carried by the heating surface of the heating structure, the metallic wire being connected to a power supply and to the control unit which is configured to control the power supply to supply current to the metallic wire during discrete time intervals followed by time intervals where no current supply to the metallic wire takes place, and
a printed circuit formed onto said heating surface of the heating structure, the printed circuit being connected to a power supply and to the control unit which is configured to control the power supply to supply current to the printed circuit during discrete time intervals followed by time intervals where no current supply to printed circuit takes place.

16. The apparatus of claim 12, wherein said active surface of the holding plate of the upper tool overlaps the one or more seats of the lower tool when the packaging assembly is in the second operating condition.

17. The apparatus of claim 1 wherein the upper tool is provided with a plurality of holding plates each to hold a respective film sheet, the apparatus further comprising:
a plurality of distinct backing structures, each comprising a flat holding surface adapted to receive one respective of said film sheets, each of the backing structures being movable between at least the cutting assembly, to pick up the respective film sheet, and the inside of the chamber, to position the cut film sheet in correspondence of the respective upper tool holding plate, and
the transfer actuator comprising one or more transfer actuators being active on the backing structures to allow movement of the backing structures and thus of cut film sheets from the cutting assembly to inside of the packaging chamber, the one or more transfer actuators being controlled by the control unit such that to increase a mutually spacing among the backing structures before, when or subsequent to moving the backing structures from the cutting assembly to the inside the packaging chamber.

18. The apparatus of claim 1 wherein the packaging assembly comprises:
pusher elements adapted to move from a release position, where active portions of the pusher elements are spaced from an active surface of a holding plate, to an engage position, where active portions of the pusher elements press the cut film sheet border portions against said active surface of the holding plate, wherein said pusher elements include one or more selected from:
- finger shaped stoppers pivotally mounted to the upper tool and active in correspondence of corners of one or more seats,
- finger shaped stoppers mounted to the lower tool, configured to be vertically moved, and active in correspondence of corners of said one or more seats,
- oscillating bars pivotally mounted to the upper tool and active in correspondence of side borders of said one or more seats, or
- oscillating bars mounted to the lower tool, configured to be vertically moved, and active in correspondence of side borders of said one or more seats.

19. The apparatus of claim 18 further comprising at least one pusher actuator actable on the pusher elements under the control of the control unit, wherein the control unit is configured to activate the at least one pusher actuator and move the pusher elements from the release to the engage position and vice versa.

20. The apparatus of claim 1 wherein the holding surface of the backing structure is flat.

21. A process of packaging a product arranged on a support, the process comprising the following steps:
- providing the apparatus of claim 1;
- unrolling a film from a roll installed in the film supplying assembly to provide an unrolled portion of continuous film;
- transversely cutting the unrolled portion of continuous film to prepare one or more cut film sheets, the cutting separating the one or more cut film sheets from the continuous film outside the packaging chamber;
- subsequently moving the one or more cut film sheets inside the packaging chamber;
- progressively moving a number of supports inside the packaging chamber of the packaging assembly;
- keeping the packaging chamber open for a time sufficient for a number of supports and for a corresponding number of film sheets to position inside said packaging chamber;
- closing the packaging chamber with each film sheet held above a respective support; and
- sealing the film sheet to said respective support.

22. The process of claim 21 wherein closing the packaging chamber comprises hermetically closing the packaging chamber, and subsequently causing one or both of:
- a gas withdrawal from the hermetically closed packaging chamber; or
- a gas injection of a gas mixture of controlled composition.

23. The process of claim 21 wherein the cutting of the film into cut film sheets takes place at the cutting assembly, outside the packaging chamber and remote from the packaging chamber where the film sheets are coupled to the supports.

24. The process of claim 23 wherein:
- each support comprises a base wall, a side wall extending from the base wall, and a horizontal rim radially emerging from the side wall;
- each film sheet is cut to a radial size equal to or less than the outer border of the rim of the corresponding support; and
- each film sheet is heat sealed to the rim of the corresponding support to sealingly engage the rim top surface and close a mouth of the support.

25. The process of claim 24 comprising the steps of:
- withdrawing gas from the hermetically closed packaging chamber until a pressure comprised between 100 and 300 mbar is reached inside the packaging chamber;
- injecting a modified atmosphere gas into the packaging chamber while the film is distanced from the mouth of the support; and
- subsequently heating at least a peripheral portion of the film sheet before heat sealing the film sheet to the rim top surface.

26. The process of claim 25 wherein the film sheet is not heat shrinkable and the film sheet is uniformly heated during the subsequent heating step.

27. The process of claim 25 wherein the film sheet is heat shrinkable and the subsequent heating step heats at least a peripheral portion of the film sheet.

28. The process of claim 25 wherein the injecting step occurs at least partially during the gas withdrawal step.

* * * * *